(12) United States Patent
Beistle et al.

(10) Patent No.: US 11,510,290 B2
(45) Date of Patent: Nov. 22, 2022

(54) INDUCTION HEATING SYSTEM

(71) Applicant: ILLINOIS TOOL WORKS INC., Glenview, IL (US)

(72) Inventors: Edward G. Beistle, Appleton, WI (US); Kevin John Mlnarik, De Pere, WI (US); Paul David Verhagen, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 359 days.

(21) Appl. No.: 14/280,164

(22) Filed: May 16, 2014

(65) Prior Publication Data

US 2015/0334780 A1 Nov. 19, 2015

(51) Int. Cl.
*H05B 6/06* (2006.01)
*H05B 6/10* (2006.01)
*H05B 6/14* (2006.01)

(52) U.S. Cl.
CPC ............... *H05B 6/06* (2013.01); *H05B 6/101* (2013.01); *H05B 6/14* (2013.01)

(58) Field of Classification Search
CPC . H05B 6/06; H05B 6/14; H05B 6/101; B23K 1/002
(Continued)

(56) References Cited

U.S. PATENT DOCUMENTS 1,391,085 A 9/1921 Wendell
2,416,047 A 2/1947 Dolan
(Continued)

FOREIGN PATENT DOCUMENTS

CN 1407931 4/2003
CN 1917970 2/2007
(Continued)

OTHER PUBLICATIONS

International Search Report for application No. PCT/US2011/024577 dated Aug. 18, 2011.
(Continued)

*Primary Examiner* — Ibrahime A Abraham
*Assistant Examiner* — Frederick F Calvetti
(74) *Attorney, Agent, or Firm* — McAndrews, Held & Malloy, Ltd.

(57) ABSTRACT

An induction heating system includes an induction heating head assembly configured to move relative to a workpiece. The induction heating system may also include a temperature sensor assembly configured to detect a temperature of the workpiece and/or a travel sensor assembly configured to detect a position, movement, or direction of movement of the induction heating head assembly relative to the workpiece, and to transmit feedback signals to a controller configured to adjust the power provided to the induction heating head assembly by a power source based at least in part on the feedback signals. In certain embodiments, the induction heating system may also include a connection box configured to receive the feedback signals, to perform certain conversions of the feedback signals, and to provide the feedback signals to the power source. Furthermore, in certain embodiments, the induction heating system may include an inductor stand assembly configured to hold the induction heating head assembly against the workpiece.

21 Claims, 24 Drawing Sheets

(58) Field of Classification Search
USPC ....... 219/660, 661, 602, 663, 666, 607, 608, 219/610, 614, 629, 635, 643, 650, 665, 219/667
See application file for complete search history.

(56) References Cited

U.S. PATENT DOCUMENTS

| | | | |
|---|---|---|---|
| 2,672,544 A | 3/1954 | Finchelstein | |
| 2,749,423 A | 6/1956 | Bisterfeld | |
| 2,829,229 A * | 4/1958 | Metz | H05B 6/06 |
| | | | 219/643 |
| 3,256,417 A | 6/1966 | Merrett | |
| 3,288,982 A | 11/1966 | Haruyoshi | |
| 3,414,698 A | 12/1968 | Bedford | |
| 3,520,053 A | 7/1970 | Hinton | |
| 3,612,806 A | 10/1971 | Lewis | |
| 3,619,548 A | 11/1971 | Cavagnero | |
| 3,659,069 A | 4/1972 | Balzer | |
| 3,842,234 A | 10/1974 | Seyfried | |
| 4,123,305 A | 10/1978 | Krzeszowski | |
| 4,523,269 A | 6/1985 | Baker | |
| 4,549,057 A | 10/1985 | Anderson | |
| 4,632,366 A | 12/1986 | Sprung | |
| 4,673,784 A | 6/1987 | Vickers | |
| 4,690,553 A | 9/1987 | Fukamizu | |
| 4,734,552 A * | 3/1988 | Brolin | B23K 13/02 |
| | | | 219/617 |
| 4,874,916 A | 10/1989 | Burke | |
| 5,025,125 A * | 6/1991 | Peterson | B23K 1/002 |
| | | | 219/615 |
| 5,266,764 A | 11/1993 | Fox | |
| 5,313,037 A | 5/1994 | Hansen | |
| 5,319,179 A | 6/1994 | Joecks | |
| 5,321,267 A * | 6/1994 | Song | G01M 11/04 |
| | | | 250/347 |
| 5,329,085 A | 7/1994 | Cowell | |
| 5,343,023 A | 8/1994 | Geissler | |
| 5,450,305 A | 9/1995 | Boys | |
| 5,461,215 A | 10/1995 | Haldeman | |
| 5,615,079 A * | 3/1997 | Eggert | H01R 9/2675 |
| | | | 361/601 |
| 5,630,958 A | 5/1997 | Stewart | |
| 5,686,006 A | 11/1997 | Gaspard | |
| 5,690,851 A | 11/1997 | Yoshioka | |
| 5,708,253 A * | 1/1998 | Bloch | B23K 9/0953 |
| | | | 219/130.01 |
| 5,821,504 A * | 10/1998 | Sprenger | F26B 3/347 |
| | | | 219/604 |
| 6,043,471 A | 3/2000 | Wiseman | |
| 6,137,093 A | 10/2000 | Johnson | |
| 6,147,336 A | 11/2000 | Ushijima | |
| 6,162,509 A | 12/2000 | Cherico | |
| 6,229,127 B1 | 5/2001 | Link | |
| 6,265,701 B1 * | 7/2001 | Bickel | B23K 9/00 |
| | | | 219/136 |
| 6,333,484 B1 | 12/2001 | Foster | |
| 6,509,555 B1 | 1/2003 | Riess | |
| 6,727,483 B2 | 4/2004 | Thomas | |
| 6,794,622 B1 | 9/2004 | Alveberg | |
| 6,858,083 B2 * | 2/2005 | Sterud | B29C 65/32 |
| | | | 156/380.2 |
| 6,861,617 B2 | 3/2005 | Dull | |
| 6,875,966 B1 | 4/2005 | Barber | |
| 6,987,240 B2 * | 1/2006 | Jennings | B23K 26/032 |
| | | | 219/121.8 |
| 7,012,439 B2 * | 3/2006 | Pinto | G01N 23/04 |
| | | | 324/754.22 |
| 7,015,439 B1 * | 3/2006 | Thomas | H05B 6/06 |
| | | | 266/87 |
| 7,156,277 B2 | 1/2007 | Ishikawa | |
| 7,202,450 B2 | 4/2007 | Barber | |
| 7,696,458 B2 | 4/2010 | Thomas | |
| 7,786,415 B2 * | 8/2010 | Thomas | H05B 6/101 |
| | | | 219/677 |
| 7,922,812 B2 | 4/2011 | Ciulik | |
| 8,115,147 B2 | 2/2012 | Thomas | |
| 9,839,976 B2 * | 12/2017 | Jennings | B23K 26/0738 |
| 9,913,320 B2 * | 3/2018 | Garvey | H05B 6/14 |
| 10,462,853 B2 * | 10/2019 | Fanetti | B23K 9/235 |
| 10,857,623 B2 * | 12/2020 | Jennings | B23K 26/0613 |
| 10,863,591 B2 * | 12/2020 | Carter | H05B 6/101 |
| 11,072,035 B2 * | 7/2021 | Holverson | B23K 9/235 |
| 2001/0024152 A1 | 9/2001 | Miyazaki | |
| 2003/0038130 A1 | 2/2003 | Thomas | |
| 2003/0196996 A1 * | 10/2003 | Jennings | B23K 26/0665 |
| | | | 219/121.73 |
| 2003/0226631 A1 * | 12/2003 | Sterud | B29C 66/91951 |
| | | | 156/64 |
| 2004/0069774 A1 | 4/2004 | Markegard | |
| 2004/0226940 A1 | 11/2004 | Monda | |
| 2005/0000959 A1 | 1/2005 | Kagan | |
| 2005/0103437 A1 * | 5/2005 | Carroll | B29C 65/20 |
| | | | 156/304.4 |
| 2006/0237448 A1 | 10/2006 | Barber | |
| 2006/0289492 A1 | 12/2006 | Thomas | |
| 2006/0289493 A1 * | 12/2006 | Thomas | H05B 6/06 |
| | | | 219/660 |
| 2006/0289495 A1 * | 12/2006 | Thomas | H05B 6/06 |
| | | | 219/677 |
| 2006/0289498 A1 | 12/2006 | Chun | |
| 2007/0023422 A1 | 2/2007 | Obata | |
| 2007/0284419 A1 | 12/2007 | Matlack | |
| 2008/0029507 A1 | 2/2008 | Barber | |
| 2008/0251642 A1 | 10/2008 | Boschet | |
| 2009/0072143 A1 | 3/2009 | Ishida | |
| 2009/0107991 A1 | 4/2009 | Mortimer | |
| 2009/0188910 A1 | 7/2009 | McDonnell | |
| 2009/0255925 A1 | 10/2009 | Chirico | |
| 2009/0256349 A1 | 10/2009 | Strubin | |
| 2010/0086465 A1 * | 4/2010 | Kojima | C30B 15/30 |
| | | | 423/348 |
| 2010/0295412 A1 | 11/2010 | Matsumoto | |
| 2011/0011750 A1 | 1/2011 | Lovens | |
| 2011/0210110 A1 * | 9/2011 | Dearman | B23K 37/0282 |
| | | | 219/137 R |
| 2011/0284527 A1 * | 11/2011 | Holverson | B23K 9/1006 |
| | | | 219/660 |
| 2012/0154101 A1 | 6/2012 | Miyashita | |
| 2013/0134153 A1 * | 5/2013 | Schmitt | B29C 66/9231 |
| | | | 228/49.1 |
| 2013/0343025 A1 * | 12/2013 | Bdeir | A63H 33/26 |
| | | | 361/803 |
| 2014/0052832 A1 | 2/2014 | Dina | |
| 2014/0190629 A1 * | 7/2014 | Benson | B29C 70/388 |
| | | | 156/272.2 |
| 2014/0231415 A1 * | 8/2014 | Verhagen | H05B 6/101 |
| | | | 219/660 |
| 2014/0299595 A1 * | 10/2014 | Sherrill | H05B 6/06 |
| | | | 219/676 |
| 2015/0334781 A1 * | 11/2015 | Verhagen | H05B 6/102 |
| | | | 219/667 |
| 2015/0334782 A1 * | 11/2015 | Garvey | B23K 9/0282 |
| | | | 73/514.01 |
| 2015/0334783 A1 * | 11/2015 | Mlnarik | H05B 6/14 |
| | | | 219/667 |
| 2015/0334784 A1 * | 11/2015 | Carter | C21D 1/42 |
| | | | 219/676 |
| 2016/0014850 A1 * | 1/2016 | Verhagen | H05B 1/023 |
| | | | 392/407 |
| 2016/0073452 A1 * | 3/2016 | Fanetti | B23K 26/60 |
| | | | 219/601 |
| 2018/0192478 A1 * | 7/2018 | Garvey | G01P 15/02 |
| 2022/0125115 A1 * | 4/2022 | Liu | A24F 1/30 |

FOREIGN PATENT DOCUMENTS

| | | |
|---|---|---|
| CN | 101213318 | 7/2008 |
| CN | 101491856 | 7/2009 |
| DE | 2544790 | 4/1977 |
| DE | 10047492 A1 | 4/2002 |

(56) References Cited

FOREIGN PATENT DOCUMENTS

| | | |
|---|---|---|
| DE | 20319657 | 4/2005 |
| DE | 102005057476 | 8/2007 |
| DE | 102012007959 | 10/2013 |
| EP | 0525621 | 2/1993 |
| EP | 2210695 | 7/2010 |
| EP | 2620512 | 7/2013 |
| FR | 1530308 | 6/1968 |
| FR | 2823459 | 10/2002 |
| GB | 2192294 * | 1/1988 |
| GB | 2325982 | 12/1998 |
| GB | 2463694 A | 3/2010 |
| JP | 06015447 | 1/1994 |
| JP | 2001242015 | 9/2001 |
| RU | 2077415 | 4/1997 |
| RU | 2098247 | 12/1997 |
| RU | 2125310 | 1/1999 |
| WO | 0130117 | 4/2001 |
| WO | 2008010833 | 1/2008 |
| WO | 2010002269 | 1/2010 |
| WO | 2012006674 | 1/2012 |

OTHER PUBLICATIONS

International Search Report from PCT application No. PCT/US2015/016510, dated May 11, 2015, 12 pgs.
International Search Report from PCT application No. PCT/US2015/016511, dated Jul. 20, 2015, 19 pgs.
International Search Report from PCT application No. PCT/US2015/016522, dated May 11, 2015, 11 pgs.
International Search Report from PCT application No. PCT/US2015/016528, dated May 11, 2015, 11 pgs.
International Search Report from PCT application No. PCT/US2015/016531, dated May 18, 2015, 12 pgs.
International Search Report from PCT application No. PCT/US2015/036491, dated Sep. 22, 2015, 12 pgs.
Communication EP Appln No. 15710027.2 dated May 10, 2019.
Communication EP Appln No. 15710026.4 dated May 10, 2019.
Communication EP Appln No. 15707230.7 dated May 10, 2019.
Canadian Patent Office, Requisition in Application No. 2,948,473 dated Aug. 2, 2019 (6 pages).
Canadian Patent Office, Requisition in Application No. 2,948,473 dated Jul. 21, 2020 (5 pages).
Canadian Patent Office, Requisition in Application No. 2,948,474 dated Jun. 29, 2021.

* cited by examiner

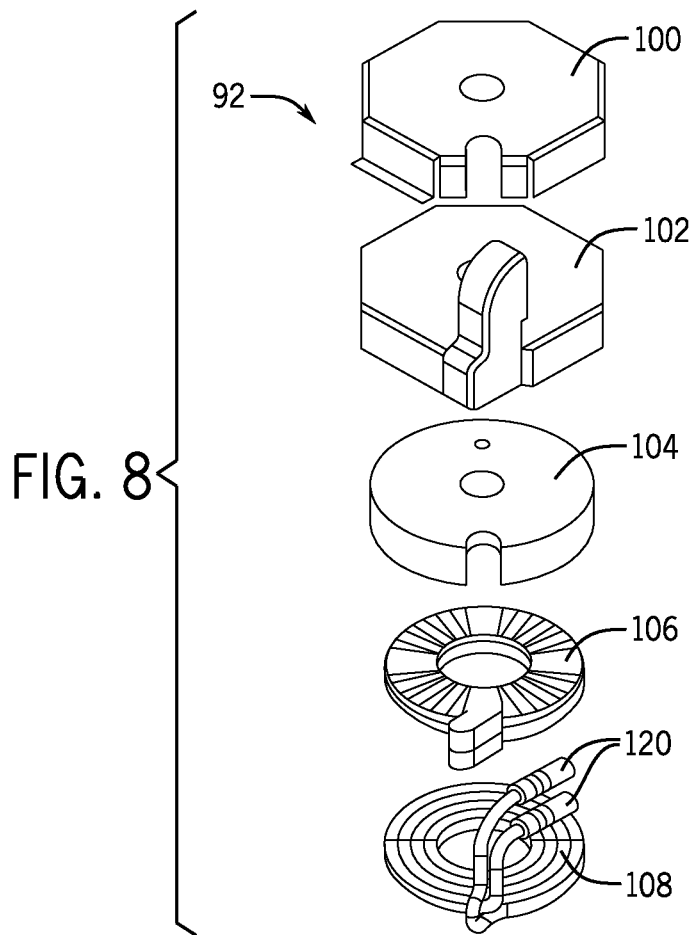
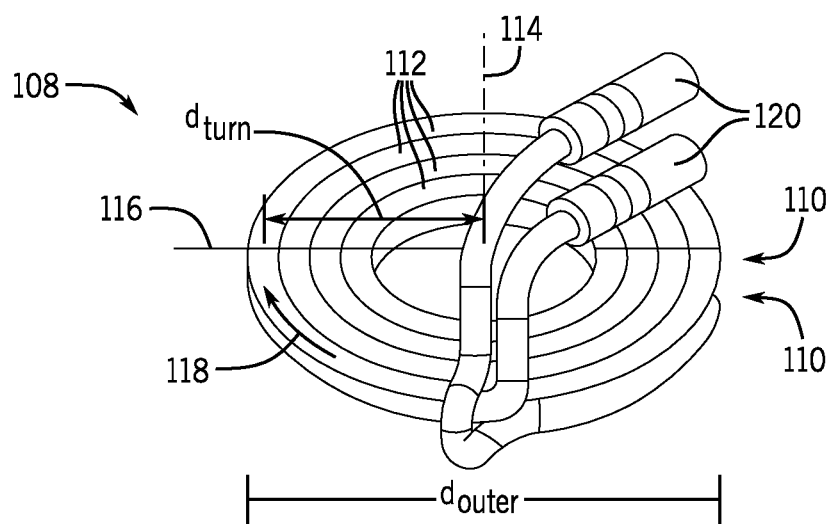

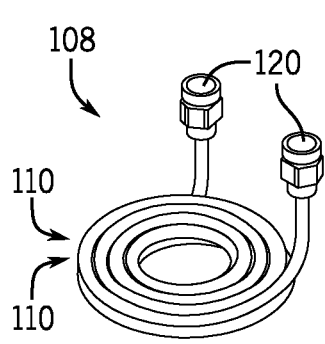 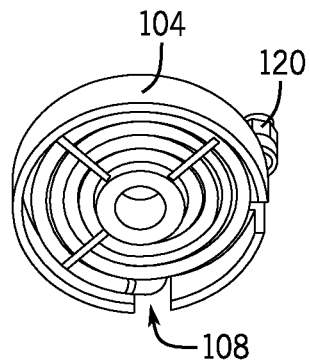 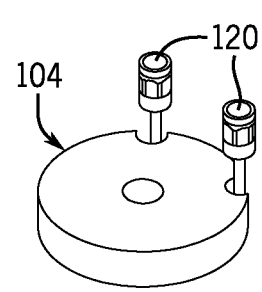
FIG. 10A  FIG. 10B  FIG. 10C
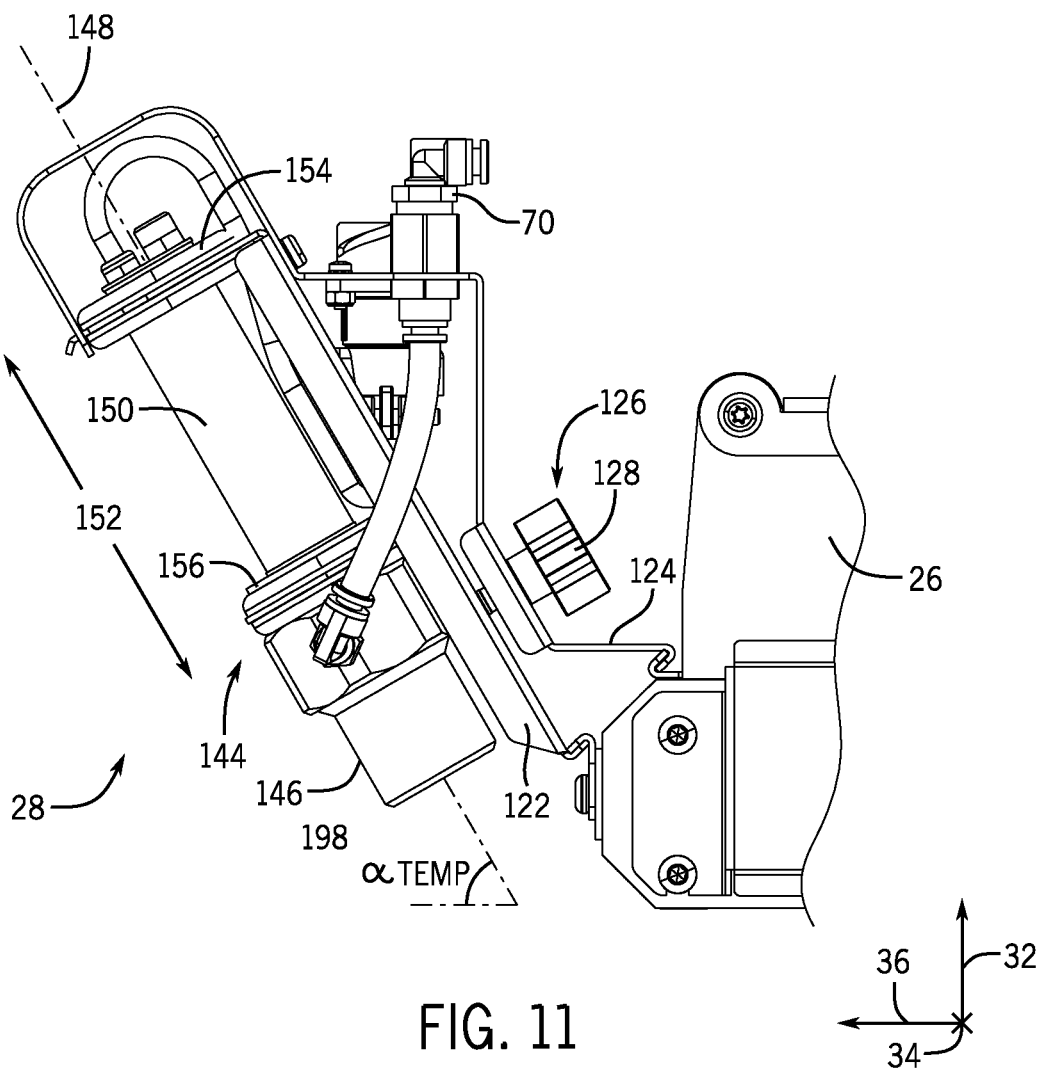
FIG. 11

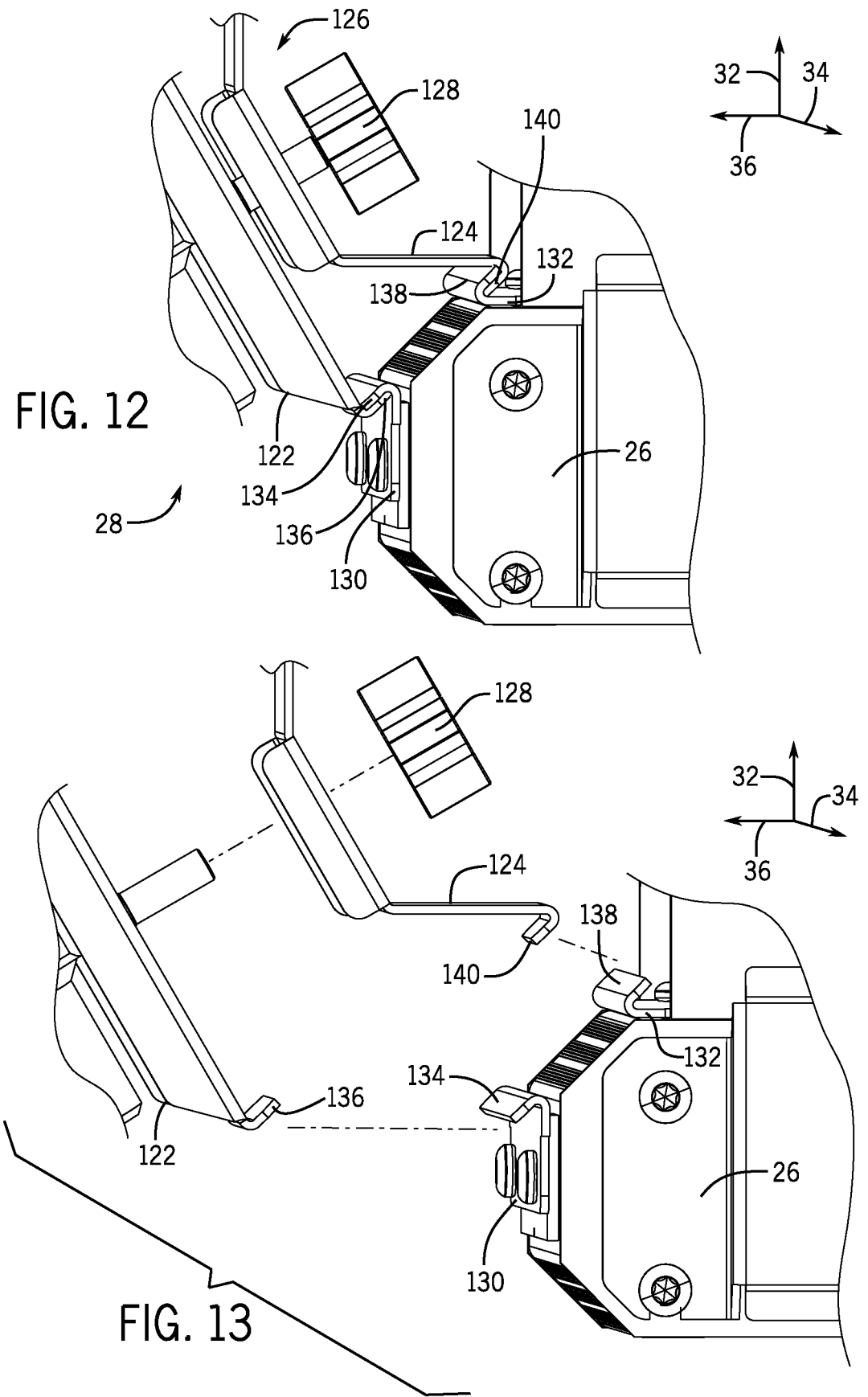

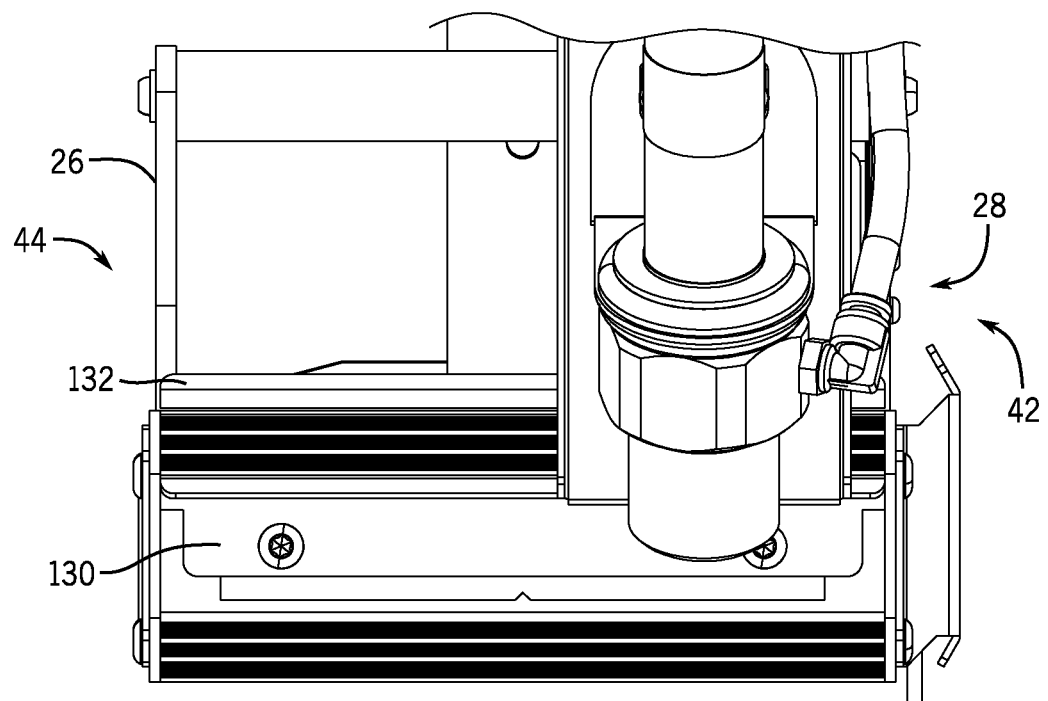
FIG. 14
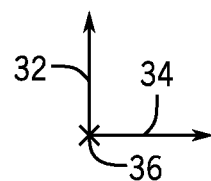
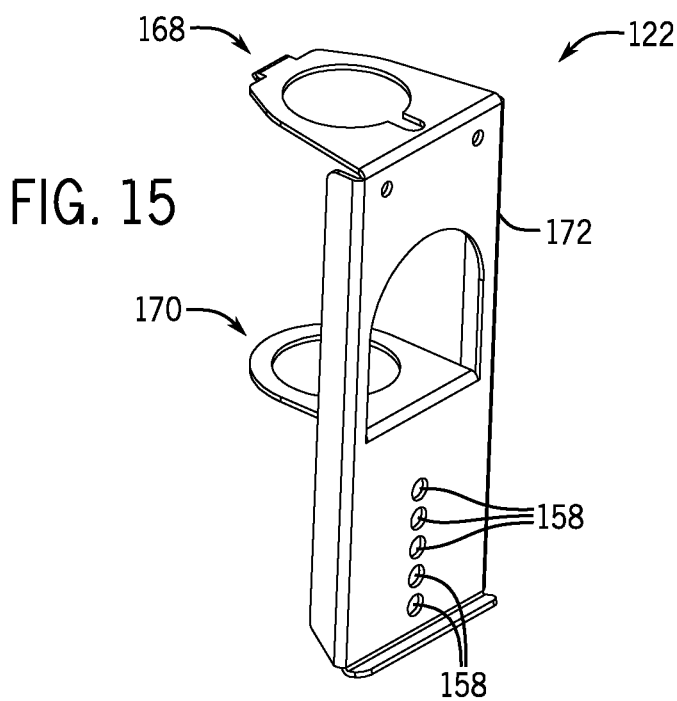
FIG. 15

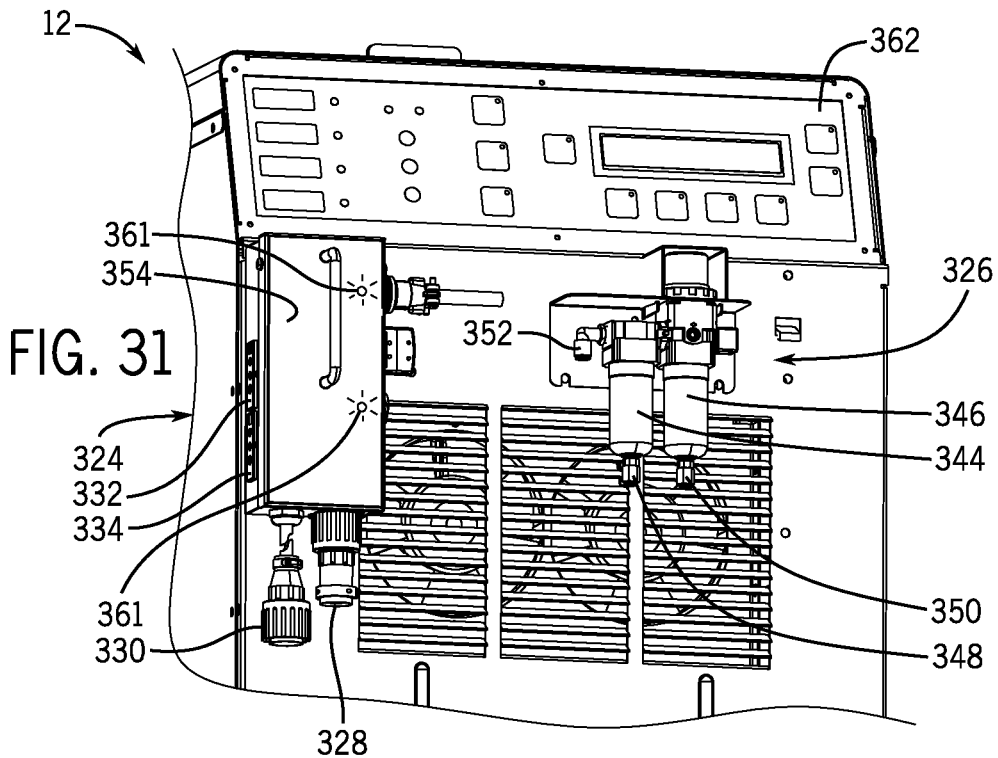
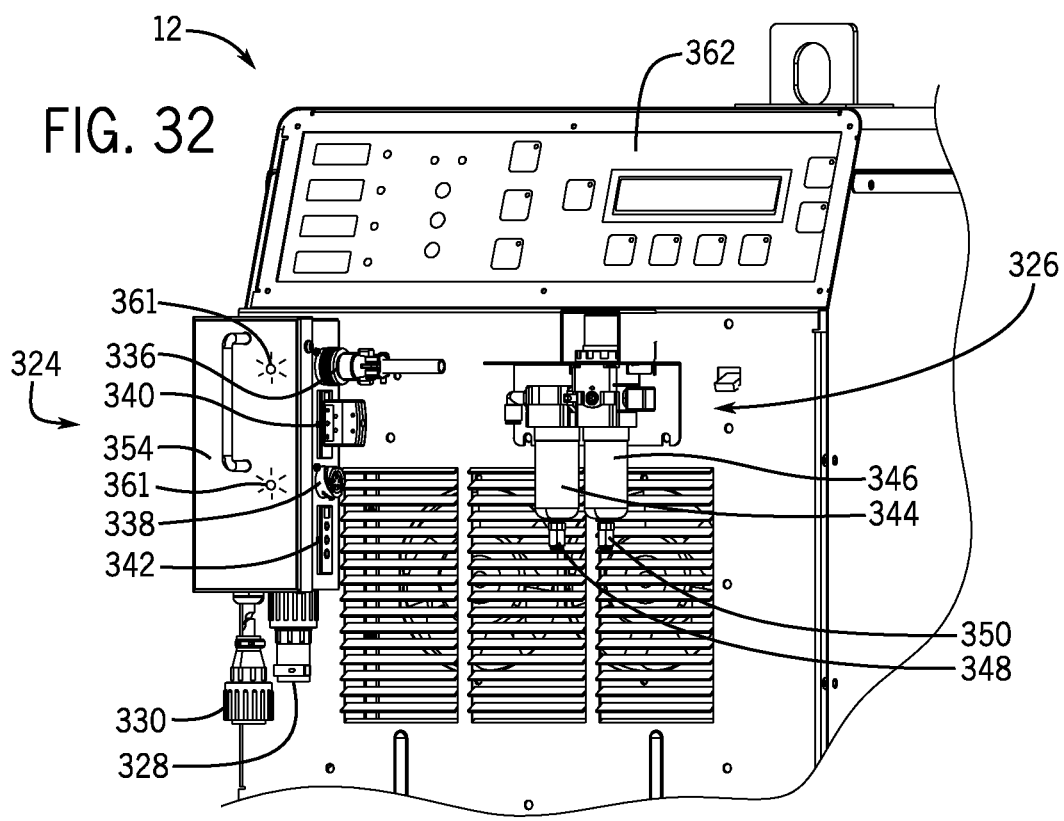

INDUCTION HEATING SYSTEM

BACKGROUND

The present disclosure relates generally to the art of induction heating. More specifically, it relates to using a moveable induction heating head assembly, a temperature sensor assembly, and a travel sensor assembly.

Induction heating may be used to pre-heat metal before welding or post-heat the metal after welding. It is well known to weld pieces of steel (or other material) together. For example, pipes are often formed by taking a flat piece of steel and rolling the steel. A longitudinal weld is then made along the ends of the rolled steel, thus forming a section of pipe. A pipeline may be formed by circumferential welding adjacent sections of pipe together. Other applications of welding steel (or other material) include ship building, railroad yards, tanker trucks, or other higher strength alloy welding.

When welding steel (or other material), it is generally desirable to pre-heat the workpiece along the weld path. Pre-heating is used to raise the temperature of the workpiece along the weld path because the filler metal binds to the workpiece better when the weld path is pre-heated, particularly when high-alloy steel is being welded. Without pre-heating, there is a greater likelihood that the filler metal will not properly bind with the workpiece, and a crack may form, for example. Generally, the steel is preheated to about 300° F. prior to welding.

Conventional pre-heating techniques use "rose buds" (gas-fired flame torches), resistance "chicklets", or induction heating blankets to pre-heat the steel. For example, rosebuds may be placed along the weld path, typically one rosebud on each side of the weld path, or one covering both sides of the weld path, for every 3 to 6 feet. The rosebuds are left in place a relatively long period of time (e.g., up to two hours for 3" thick steel). After the weld path has been pre-heated, the rose buds are removed and the weld is performed before the weld path cools.

Induction heating blankets are used to pre-heat a weld by wrapping an induction blanket (e.g., an induction cable inside a thermally safe material), and inducing current in the workpiece. Induction heating can be a fast and reliable way to pre-heat, particularly on stationary workpieces. However, induction blankets have certain challenges when used with moving workpieces, and some pipe welding applications have a fixed position welder with a pipe that moves or rotates past the weld location. Liquid-cooled cables offer flexibility in coil configurations, but have similar issues with rotating pipes rolling up cables or wearing through the insulation.

Other methods of pre-heating a weld path include placing the entire workpiece in an oven (which takes as long as using a rosebud), induction heating, or resistance heating wires. When pre-heating with these conventional techniques, the heating device is placed at one location on the weld path until that location is heated. Then, the weld is performed and the heating device is moved.

Often, these conventional approaches for pre-heating workpieces use various methods (e.g., temperature sensitive crayons) for monitoring the temperature of the workpieces, but do not have temperature feedback for controlling the power source. Accordingly, a system for pre-heating a weld path and for incorporating temperature and/or travel feedback into the control of the pre-heating is desirable.

BRIEF DESCRIPTION

Embodiments described herein include an induction heating system having an induction heating head assembly configured to move relative to a workpiece. The induction heating system may also include a temperature sensor assembly configured to detect a temperature of the workpiece and/or a travel sensor assembly configured to detect a position, movement, or direction of movement of the induction heating head assembly relative to the workpiece, and to transmit feedback signals to a controller configured to adjust the power provided to the induction heating head assembly by a power source based at least in part on the feedback signals. In certain embodiments, the induction heating system may also include a connection box configured to receive the feedback signals, to perform certain conversions of the feedback signals, and to provide the feedback signals to the power source. Furthermore, in certain embodiments, the induction heating system may include an inductor stand assembly configured to hold the induction heating head assembly against the workpiece.

DRAWINGS

These and other features, aspects, and advantages of the present invention will become better understood when the following detailed description is read with reference to the accompanying drawings in which like characters represent like parts throughout the drawings, wherein:

FIG. 8 is an exploded view of an induction head of the induction heating head assembly in accordance with embodiments of the present disclosure;

FIG. 9 is a perspective view of a conductive coil of the induction head of FIG. 8 in accordance with embodiments of the present disclosure;

FIGS. 10A through 10C are perspective views of an alternative embodiment of the conductive coil of FIG. 9;

FIG. 11 is a side view of a main housing and temperature sensor assembly of an embodiment of the induction heating head assembly in accordance with embodiments of the present disclosure;

FIG. 12 is a zoomed in perspective view of first and second brackets of the temperature sensor assembly, an adjustable connection mechanism of the temperature sensor assembly, and the main housing of the induction heating head assembly in accordance with embodiments of the present disclosure;

FIG. 13 is an exploded perspective view of the first and second brackets of the temperature sensor assembly, the adjustable connection mechanism of the temperature sensor assembly, and the main housing of the induction heating head assembly in accordance with embodiments of the present disclosure;

FIG. 14 is front view of the temperature sensor assembly and the main housing of the induction heating head assembly in accordance with embodiments of the present disclosure;

FIG. 15 is a perspective view of a bracket of the temperature sensor assembly in accordance with embodiments of the present disclosure;

FIG. 31 is a partial perspective view of the removable connection box and the removable air filter assembly of FIG. 30;

FIG. 32 is another partial perspective view of the removable connection box and the removable air filter assembly of FIG. 30;

DETAILED DESCRIPTION

Embodiments described herein include an induction heating system including a power source and an induction head system having a coil that is controlled by the power source. The power source is configured to provide power for induction heating, and the induction heating head assembly is configured to induce heat in a workpiece, such as pipe. A coil within the induction heating head assembly is tuned to the power source and is configured to deliver a sufficient amount of power to the workpiece to adequately pre-heat and/or post-heat the workpiece without using an impedance matching transformer while operating within working output parameters (voltage, amperage, frequency, and so forth) of the power source. Thus, the induction heating system described herein eliminates the need for a transformer disposed between the induction heating head assembly and the power source.

Figure 1:
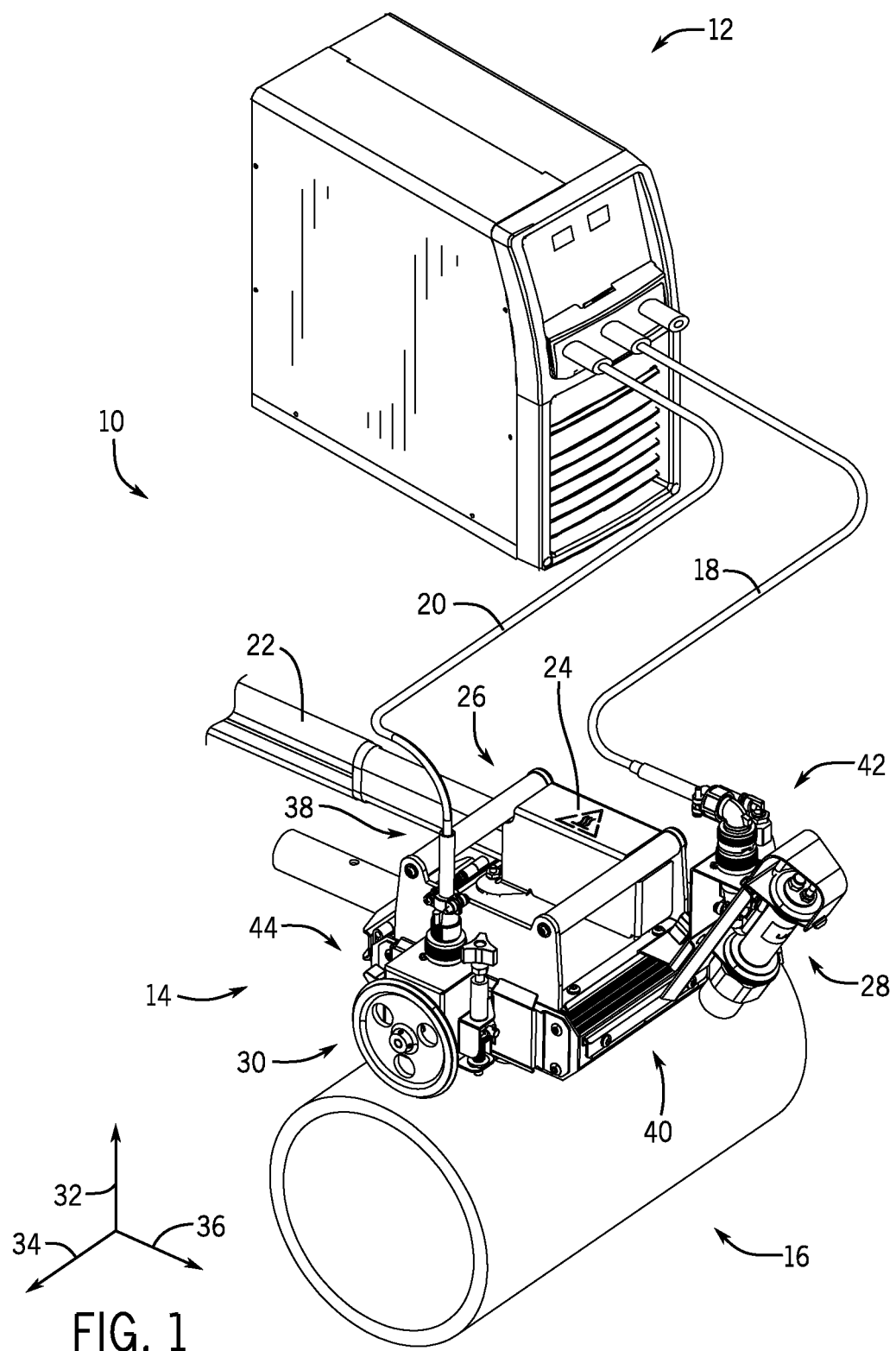
FIG. 1 is a perspective view of an induction heating system in accordance with embodiments of the present disclosure.

FIG. 1 is a perspective view of an embodiment of an induction heating system 10 in accordance with the present disclosure. As illustrated in FIG. 1, the induction heating system 10 includes a power source 12 and an induction heating head assembly 14 that function together to pre-heat and/or post-heat a workpiece 16, such as the pipe illustrated in FIG. 1. As described in greater detail herein, the induction heating head assembly 14 is configured to move relative to surfaces of workpieces 16 to enable induction heating to be performed efficiently across a variety of workpieces 16. For example, in certain embodiments, the induction heating head assembly 14 includes wheels (or some other contacting feature), and is capable of moving with respect to the workpiece 16 (or, alternatively, remaining relatively stationary while the workpiece 16 moves with respect to it), while the wheels roll across a surface of the workpiece 16. In other embodiments, the induction heating head assembly 14 may be moved with respect to the workpiece 16 (or, alternatively, remain relatively stationary while the workpiece 16 moves with respect to it) without contacting the workpiece 16. The induction heating head assembly 14 may be moveable in many different ways with respect to the workpiece 16. For example, when the workpiece 16 is a relatively flat plate, the induction heating head assembly 14 may translate along a plane generally parallel to a surface of the flat plate or, alternatively, remain relatively stationary while the flat plate translates with respect to the induction heating head assembly 14. However, when the workpiece 16 is pipe, as illustrated in FIG. 1, the induction heating head assembly 14 may move in a generally circular pattern along the outer circumference of the pipe or, alternatively, remain relatively stationary while the pipe is rotated and the outer circumference of the pipe moves with respect to the induction heating head assembly 14.

As illustrated in FIG. 1, the power source 12 and the induction heating head assembly 14 are connected together via cable 22 to enable the transmission of power from the power source 12 to the induction heating head assembly 14. In certain embodiments, the cable 22 also facilitates feedback to be sent from the induction heating head assembly 14 to the power source 12, wherein the feedback is used by the power source 12 to adjust the power provided to the induction heating head assembly 14.

As described in greater detail herein, the induction heating head assembly 14 generally includes a cable strain relief cover 24, a main housing 26, a temperature sensor assembly 28, and a travel sensor assembly 30. Although illustrated in figures and described herein as being part of the induction heating head assembly 14, in certain embodiments, the temperature sensor assembly 28 and/or the travel sensor assembly 30 may function separate from the induction heating head assembly 14 (i.e., not be attached to the main housing 26 of the induction heating head assembly 14). In general, feedback from the temperature sensor assembly 28 and the travel sensor assembly 30 are sent to the power source 12 via first and second control cables 18 and 20, respectively, and the cable strain relief cover 24 receives the power from the power source 12 via a third cable bundle 22. In particular, the temperature sensor assembly 28 includes a temperature sensor for detecting temperature at a location on the workpiece 16, and the temperature sensor assembly 28 is configured to send feedback signals relating to the temperature of the workpiece 16 to the power source 12, which uses these temperature feedback signals to adjust the power that is sent to the cable strain relief cover 24. In addition, the travel sensor assembly 30 includes a travel sensor for detecting position and/or movement (e.g., speed, acceleration, direction, distance, and so forth) of the induction heating head assembly 14 with respect to the workpiece 16, and the travel sensor assembly 30 is configured to send feedback signals relating to the detected position and/or movement of the induction heating head assembly 14 to the power source 12, which uses these position and/or movement feedback signals to adjust the power that is sent to the cable strain relief cover 24. In general, the feedback from the temperature sensor assembly 28 and the travel sensor assembly 30 may enable a number of control techniques that a controller of the power source 12 may implement, such as maintaining certain temperatures of the workpiece 16, increasing or decreasing the temperature of the workpiece 16, maintaining a given amount of heat input to a desired target location on the workpiece 16, varying an amount of heat input among various locations on the workpiece 16, varying an amount of heat input based on operating parameters (e.g., heating parameters, and so forth), and other control objectives.

In certain embodiments, the power source 12 provides alternating current (AC) power to the induction heating head assembly 14 via the cable bundle 22. The AC power provided to the induction heating head assembly 14 produces an AC magnetic field that induces an electromagnetic field into the workpiece 16, thereby causing the workpiece 16 to be heated. As described in greater detail herein, in certain embodiments, the induction heating head assembly 14 includes a coil with an optional flux concentrator mounted in an enclosure. In certain embodiments, the coil has a compact, multi-turn design and may accommodate a range of pipe diameters while providing a wide, consistent heat zone. In certain embodiments, the induction heating head assembly 14 may enable induction heating to be intensified at various locations with respect to orthogonal axes (e.g., a vertical axis 32 and perpendicular horizontal axes 34, 36) of the induction heating head assembly 14. For example, in certain embodiments, the induction heating may be intensified more at a leading side 38 (i.e., a side ahead of a direction of movement) or at a trailing side 40 (i.e., a side behind a direction of movement) of the induction heating head assembly 14, and/or intensified more at lateral sides 42, 44 (i.e., sides generally parallel to a direction of movement) of the induction heating head assembly 14.

Figure 2:
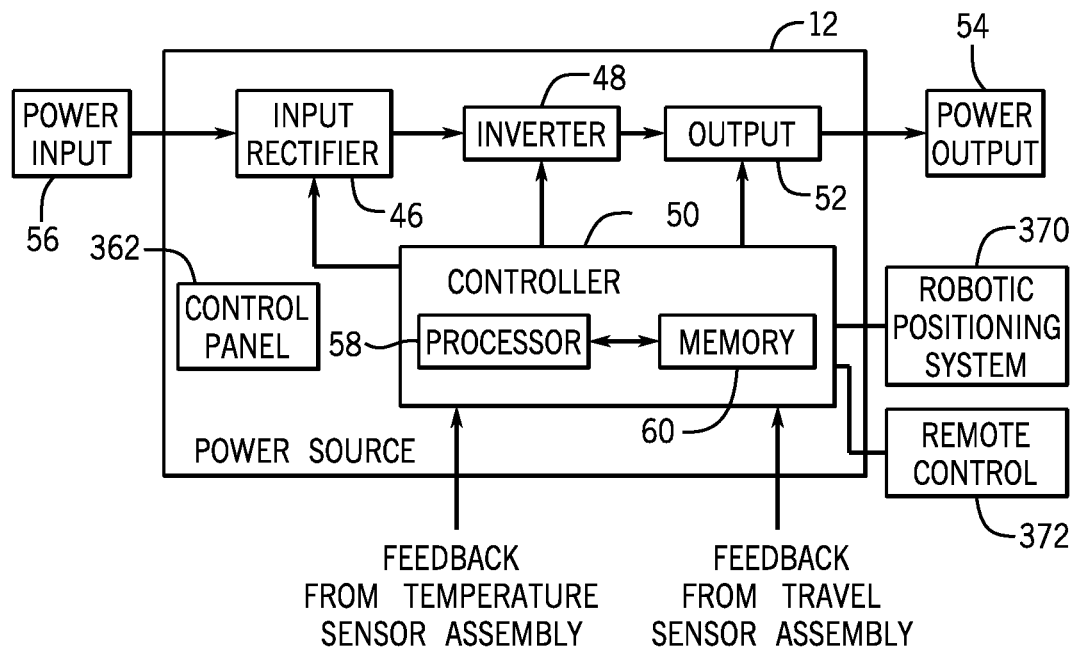
FIG. 2 is a block diagram of a power source of the induction heating system in accordance with embodiments of the present disclosure.

As described above, the power source 12 may be any power source capable of outputting sufficient power to the induction heating head assembly 14 to produce the induction heating of the workpiece 16. For example, in certain embodiments, the power source 12 may be capable of outputting power up to 300 amperes, however, other embodiments may be capable of generating greater output current (e.g., up to 350 amperes, or even greater). In certain embodiments, the power source 12 includes converter circuitry as described herein, which provides an AC output that is applied to the induction heating head assembly 14. FIG. 2 illustrates the internal components of an exemplary switched power source 12 in accordance with the present disclosure. As illustrated in FIG. 2, the power source 12 includes rectifier circuitry 46, inverter circuitry 48, controller circuitry 50, and output circuitry 52. The embodiment of the power source 12 illustrated in FIG. 2 is merely exemplary and not intended to be limiting as other topologies and circuitry may be used in other embodiments. In certain embodiments, the output circuitry 52 does not include a matching transformer. Furthermore, in certain embodiments, the controller circuitry 50 may be located in a box (e.g., separate housing) external to a housing of the power source 12.

In certain embodiments, the power source 12 may provide approximately 35 kilowatts (kW) of output power 54 at approximately 700 volts and approximately 5-30 kilohertz (kHz) (at approximately 350 amps per output). The power source 12 is capable of delivering partial power output 54 to the workpiece 16 if an output voltage or current limit, power limit, or power factor limit is reached. In certain embodiments, the input power 56 may be in a range of approximately 400-575 volts. It will be appreciated that larger or smaller power supplies 12 may be used, such as power supplies 12 capable of producing approximately 50 kW or greater, between approximately 30 kW and approximately 40 kW, between approximately 40 kW and approximately 60 kW, and so forth, of output power 54. Similarly, power supplies 12 capable of producing lower than approximately 20 kW, between approximately 10 kW and approximately 30 kW, less than approximately 10 kW, less than approximately 5 kW, or even lower, of output power 54 may be used. In general, in most embodiments, the power output 54 produced by the power source 12 is greater than 1 kW. In certain embodiments, the power source 12 includes connections for multiple power outputs 54, with each power output 54 being coupled (e.g., via cable(s) 22 illustrated in FIG. 1) to a respective induction heating head assembly 14. In other embodiments, multiple power sources 12 may be used, with the power outputs 54 of the power sources 12 being coupled to a respective induction heating head assembly 14.

It will be appreciated that, in certain embodiments, the controller circuitry 50 of the power source 12 may include a processor 58 configured to execute instructions and/or operate on data stored in a memory 60. The memory 60 may be any suitable article of manufacture that includes tangible, non-transitory computer-readable media to store the instructions or data, such as random-access memory, read-only memory, rewritable flash memory, hard drives, optical discs, and so forth. By way of example, a computer program product containing the instructions may include an operating system or an application program. The controller circuitry 50 may, for example, include instructions for controlling the input rectifier circuitry 46, the inverter circuitry 48, the output circuitry 52, and other circuitry of the power source 12, to modify the output power 54 of the power source 12, thereby modifying the power delivered to the induction heating head assembly 14 for the purpose of induction heating the workpiece 16. As described in greater detail herein, the controller circuitry 50 may modify the output power 54 provided to the induction heating head assembly 14 based at least in part on feedback signals received from the temperature sensor assembly 28 and/or the travel sensor assembly 30. Although illustrated in FIG. 2 and described herein as being part of the power source 12, in other embodiments, the controller circuitry 50 may be part of a separate control module (i.e., having a separate housing or enclosure) that communicates with the power source 12 to control the power supplied to the induction heating head assembly 14.

Figure 3:
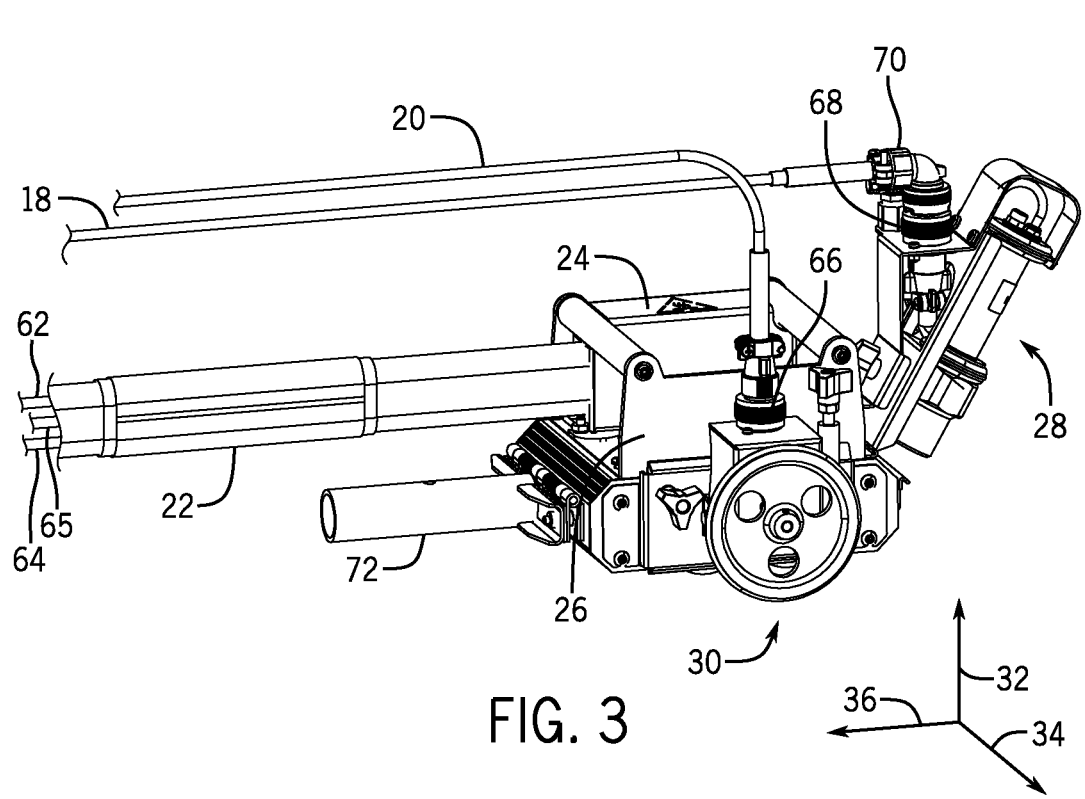
FIG. 3 is a top perspective view of an induction heating head assembly of the induction heating system in accordance with embodiments of the present disclosure.

FIG. 3 is a top perspective view of an embodiment of the induction heating head assembly 14, illustrating the main components of the induction heating head assembly 14, namely the cable strain relief cover 24, the main housing 26, the temperature sensor assembly 28, and the travel sensor assembly 30. Also illustrated in FIG. 3 are a power supply line 62 and a power return line 64 of the cable 22. The power lines 62, 64 of the cable bundle 22 provide the power that is used for induction heating to the cable strain relief cover 24. In certain embodiments, the power lines 62, 64 may be liquid cooled. In addition, in certain embodiments, the cable bundle 22 includes a thermocouple cable 65 that facilitates communication of thermocouple feedback to the controller circuitry 50 of the power source 12.

Also illustrated in FIG. 3 is the cable 20 connected to a connector 66 of the travel sensor assembly 30. The connector 66 may be any suitable connector, such as a multi-pin connector, for connecting to the cable 20 such that control feedback from the travel sensor assembly 30 may be communicated back to the controller circuitry 50 of the power source 12. FIG. 3 also illustrates the temperature sensor assembly 28 having a connector 68 that is substantially similar to the connector of the travel sensor assembly 30. Similarly, the connector 68 may be any suitable connector, such as a multi-pin connector, for connecting to the cable 18 such that control feedback from the temperature sensor assembly 28 may be communicated back to the controller circuitry 50 of the power source 12. FIG. 3 also illustrates that the temperature sensor assembly 28 includes a separate air cable connector 70 for connecting to an air cable (not shown) such that a supply of filtered air may be delivered to the temperature sensor assembly 28. In certain embodiments, the air delivered to the temperature sensor assembly 28 may be used to cool the temperature sensor(s) of the temperature sensor assembly 28, as well as being used by the temperature sensor assembly 28 to help prevent debris and smoke generated from the induction heating operation and/or a welding operation performed on the workpiece 16 from entering the temperature sensor assembly 28, thereby protecting and cleaning the internal components of the temperature sensor assembly 28. In certain embodiments, the cable 18 that is connected to the connector 68 of the temperature sensor assembly 28, an air cable (not shown) that is connected to the air cable connector 70, and any other cables connecting the temperature sensor assembly 28 to the controller circuitry 50 of the power source 12 may be assembled in a common cable cover assembly that, in certain embodiments, includes a zippered sheath such that the cables may be consolidated within the common cable cover assembly. Although illustrated as having connectors 66, 68, 70 that facilitate connecting the power source 12 to the assemblies 28, 30 with the cables 18, 20, 22, in other embodiments, the cabling connecting the power source 12 to the assemblies 28, 30 may be hard wired, obviating the need for connectors.

FIG. 3 also illustrates a handle 72 that is coupled to the main housing 26 of the induction heating head assembly 14. In general, the handle 72 is used to cause the induction heating head assembly 14 to move with respect to the workpiece 16. More specifically, forces may be imparted upon on the main housing 26 to cause the induction heating head assembly 14 to move across the workpiece 16. In certain embodiments, the handle 72 may be manipulated by (e.g., held in a hand of) a person. However, in other embodiments, the handle 72 may be attached to a robotic system (not shown) that is used to control the movement of the induction heating head assembly 14. In such an embodiment, the power source 12 may communicate control and feedback signals between the robotic system to enable the power source 12 and the robotic system to cooperate to control the movement (e.g., position, velocity, acceleration, and so forth) of the induction heating head assembly 14 in conjunction with other parameters of the induction heating head assembly 14, such as temperatures of the workpiece 16, rate of induction heating generated by the induction heating head assembly 14, and parameters of a welding operation being performed on the workpiece 16 (e.g., current, voltage, frequency, and so forth), among others.

In other embodiments, the induction heating head assembly 14 may remain relatively stationary while the workpiece 16 moves with respect to the induction heating head assembly 14. For example, in certain embodiments, the induction heating head assembly 14 may be attached to a fixed structure and a robotic system (not shown) may be used to move the workpiece 16 relative to the induction heating head assembly 14. For example, when the workpiece 16 is a flat plate, the workpiece 16 may be translated in a plane generally parallel to and proximate the induction heating head assembly 14, or when the workpiece 16 is a pipe, the workpiece 16 may be rotated such that an outer circumference remains proximate the induction heating head assembly 14.

Figure 4:
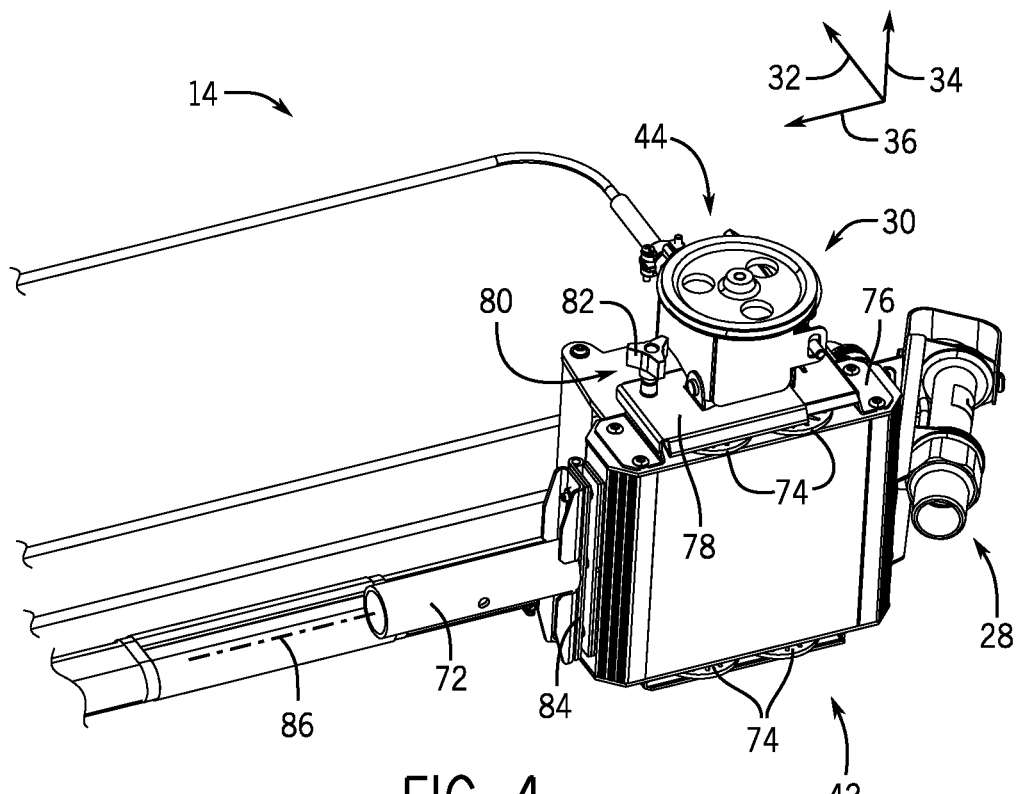
FIG. 4 is a bottom perspective view of the induction heating head assembly of FIG. 3 in accordance with embodiments of the present disclosure.

FIG. 4 is a bottom perspective view of the induction heating head assembly 14 of FIG. 3. As illustrated in FIG. 4, in certain embodiments, a plurality of wheels 74 are coupled to the main housing 26 of the induction heating head assembly 14. Although illustrated in FIG. 4 as including four wheels 74, in other embodiments, the induction heating head assembly 14 may include different numbers of wheels 74, such as two, three, five, six, and so forth. The wheels 74 are sized and positioned with respect to the induction heating head assembly 14 to provide a relatively consistent distance of the induction heating head assembly 14 with respect to the workpiece 16 being heated. The wheels 74 may be sized to accommodate a wide range of material diameters (e.g., when the workpiece 16 is pipe) including small to large outside diameters, as well as flat surfaces. Furthermore, certain embodiments may include a plurality of mounting hole locations in the main housing 26 corresponding to each wheel 74 such that different wheel positions and workpiece diameters may be accommodated. Indeed, in certain embodiments, wheel heights, wheel diameters, wheel placement, and so forth, may all be adjustable. In addition, in certain embodiments, spacers may be disposed on the bottom of the main housing 26 of the induction heating head assembly 14 that do not rotate like the wheels 74 but rather slide across the surface of the workpiece 16, thereby providing further stability of the distance between the induction heating head assembly 14 and the workpiece 16.

Although illustrated in the figures and described herein as including wheels 74 that facilitate the induction heating head assembly 14 rolling across the workpiece 16, in other embodiments where the induction heating head assembly 14 moves with respect to the workpiece 16 while remaining in contact with the workpiece 16, other contacting features (i.e., instead of the wheels 74) may be used to maintain contact with the workpiece 16 while the induction heating head assembly 14 moves with respect to the workpiece 16. For example, in certain embodiments, the induction heating head assembly 14 may include a continuous track that, for example, continuously moves around two or more wheels. Furthermore, again, in yet other embodiments, the induction heating head assembly 14 may move relative to the workpiece 16 without contacting the workpiece 16, the workpiece 16 may move relative to the induction heating head assembly 14 without contacting the induction heating head assembly 14, or both the induction heating head assembly 14 and the workpiece 16 may move relative to each other without contacting each other.

As illustrated in FIG. 4, in certain embodiments, the wheels 74 are disposed between the main housing 26 of the induction heating head assembly 14 and a bracket 76 that is attached to a lateral outer wall of the main housing 26 (e.g., on the second lateral side 44 of the induction heating head assembly 14). Although not fully illustrated in FIG. 4, in certain embodiments, a second bracket 76 may be attached to an opposite lateral wall of the main housing 26 of the induction heating head assembly 14 (e.g., on the first lateral side 42 of the induction heating head assembly 14). As described in greater detail herein, in certain embodiments, the travel sensor assembly 30 may be held in place with respect to the main housing 26 of the induction heating head assembly 14 via the bracket(s) 76.

Figure 5:
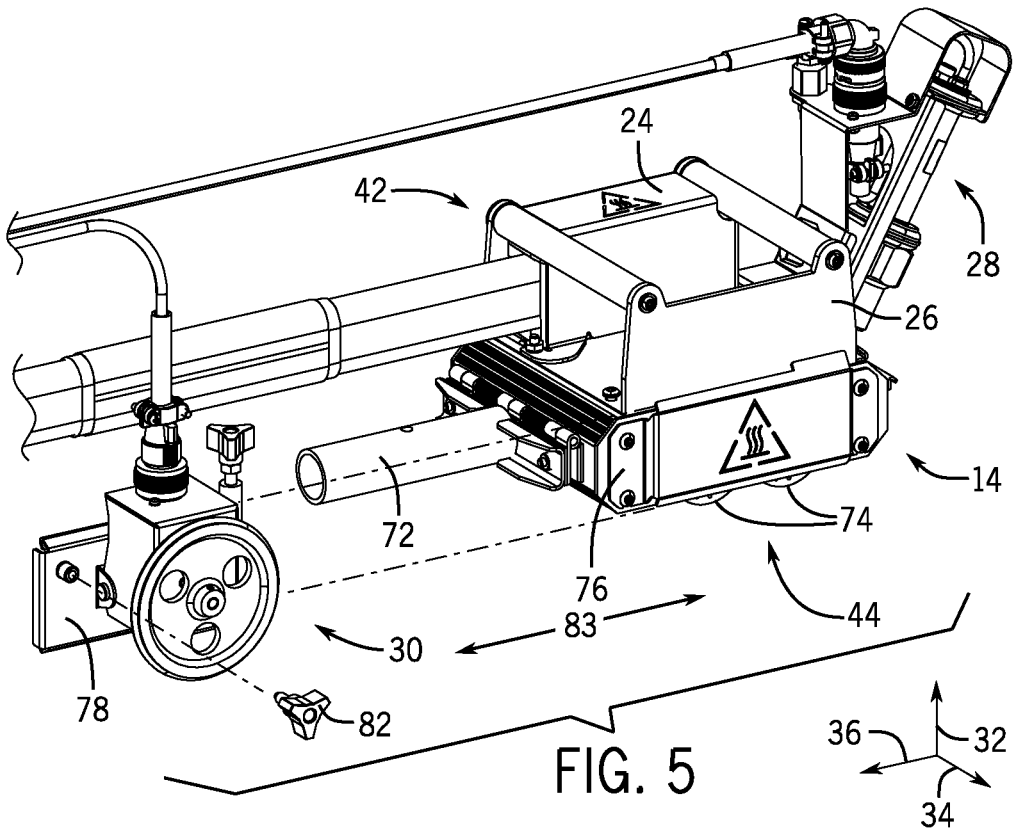
FIG. 5 is an exploded perspective view of the induction heating head assembly of FIG. 3, illustrating brackets and an adjustable connection mechanism, in accordance with embodiments of the present disclosure.

Furthermore, in certain embodiments, the travel sensor assembly 30 may be removably attached to the bracket(s) 76 such that the travel sensor assembly 30 may be selectively disposed on either lateral side 42, 44 of the induction heating head assembly 14, thereby enabling a broader range of induction heating applications and orientations. More specifically, as illustrated in FIG. 4, in certain embodiments, the travel sensor assembly 30 includes a mating bracket 78 that is configured to mate with the bracket(s) 76 that are attached to the main housing 26 of the induction heating head assembly 14. Once aligned with each other, the brackets 76, 78 are held in place with respect to each other via an adjustable connection mechanism 80, such as the knob assembly 82 illustrated in FIG. 4. In certain embodiments, the adjustable connection mechanism 80 includes a biasing member, such as a spring, against which the knob (or other connecting means) acts to hold the bracket 78 against the mating bracket 76, thereby holding the travel sensor assembly 30 in place with respect to the main housing 26 of the induction heating head assembly 14. FIG. 5 is an exploded perspective view of the induction heating head assembly 14, illustrating the brackets 76, 78 and the adjustable connection mechanism 80 when the brackets 76, 78 are not attached to each other via the adjustable connection mechanism 80.

In certain embodiments, the travel sensor assembly 30 may not only be removable from the main housing 26 of the induction heating head assembly 14, as described with respect to FIGS. 4 and 5, but a horizontal position of the travel sensor assembly 30 along the horizontal axis 36 with respect to the main housing 26 of the induction heating head assembly 14 (when attached to either lateral side 42, 44 of the induction heating head assembly 14) may be adjusted, as illustrated by arrow 83. More specifically, the brackets 76, 78 may collectively constitute a rail system upon which the travel sensor assembly 30 may slide along the horizontal axis 36 to adjust the horizontal position of the travel sensor assembly 30 along the horizontal axis 36 with respect to the main housing 26 of the induction heating head assembly 14. Once in a desired horizontal position, the adjustable connection mechanism 80 may ensure that the travel sensor assembly 30 remains in a fixed position with respect to the main housing 26 of the induction heating head assembly 14.

It should be noted that while illustrated in the figures and described herein as being removably detachable from the induction heating head assembly 14, in other embodiments, the travel sensor assembly 30 may instead be used completely separate from (i.e., not mounted to) the induction heating head assembly 14 during operation of the travel sensor assembly 30 and the induction heating head assembly 14. For example, in one non-limiting example, the travel sensor assembly 30 and the induction heating head assembly 14 may be attached to separate structures with the travel sensor assembly 30 detecting the relative position and/or movement (including direction of movement) of the induction heating head assembly 14 with respect to the workpiece 16 and the induction heating head assembly 14 separately providing induction heat to the workpiece 16.

Returning now to FIG. 4, as illustrated, the induction heating head assembly 14 also includes an adjustable handle mounting assembly 84 (e.g., a mounting bracket in the illustrated embodiment) to which the handle 72 is attached. In certain embodiments, the adjustable handle mounting assembly 84 is adjustable such that an orientation of the handle 72 with respect to the main housing 26 and, in turn, the induction heating head assembly 14 may be adjusted. For example, FIG. 4 illustrates the adjustable handle mounting assembly 84 and the attached handle 72 in a first orientation whereby a longitudinal axis 86 of the handle 72 is aligned generally parallel to the horizontal axis 36 of the induction heating head assembly 14. In contrast, FIG. 6 illustrates the adjustable handle mounting assembly 84 and the attached handle 72 in a second orientation whereby the longitudinal axis 86 of the handle 72 is at an angle with respect to the vertical axis 32 and the horizontal axis 36 of the induction heating head assembly 14.

Figure 6:
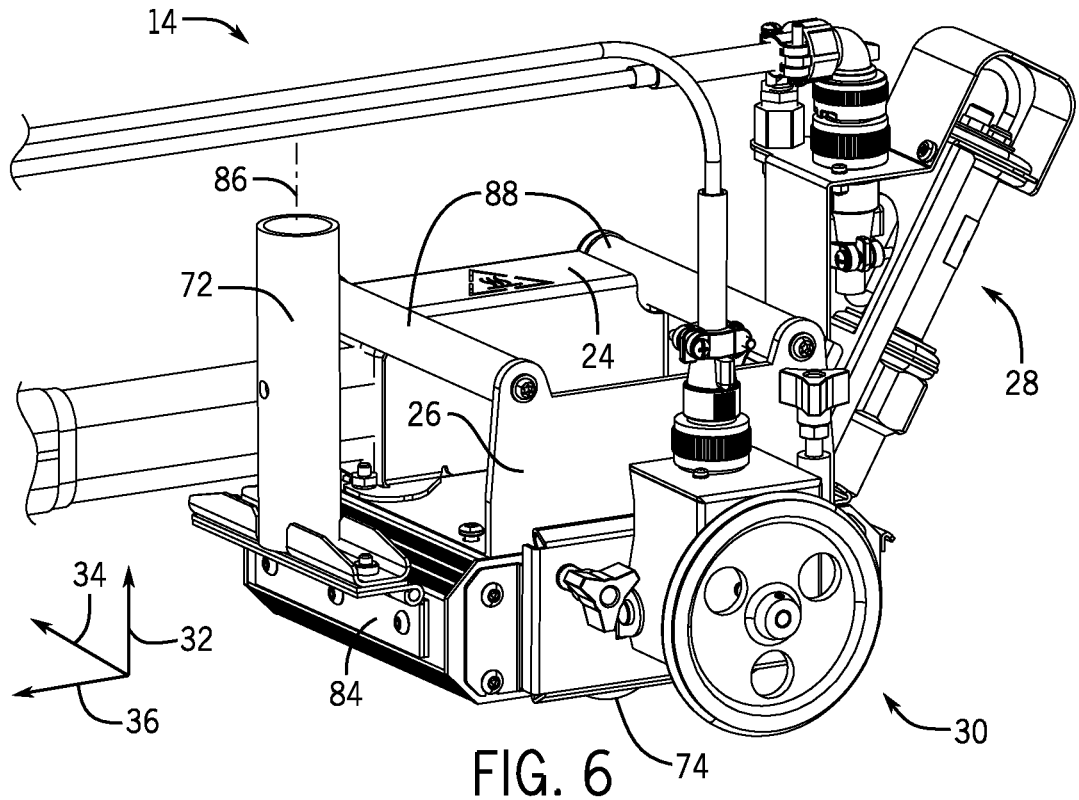
FIG. 6 is a perspective view of the induction heating head assembly of FIG. 3, illustrating an adjustable handle in an adjusted position, in accordance with embodiments of the present disclosure.

Although the adjustable handle mounting assembly 84 is illustrated in FIGS. 4 and 6 as facilitating different orientations of the handle 72 in a plane generally defined by the vertical axis 32 and the horizontal axis 36 of the induction heating head assembly 14, it will be appreciated that in other embodiments, the adjustable handle mounting assembly 84 may enable adjustment of the orientation of the handle 72 with respect to all three axes 32, 34, 36 of the induction heating head assembly 14. As a non-limiting example, although illustrated in FIGS. 4 and 6 as including a mounting bracket with opposing bracket portions connected by a common hinged edge, other embodiments of the adjustable handle mounting assembly 84 may include a ball and socket configuration (e.g., with either the ball being attached to the handle 72 and the socket being attached to the main housing 26 of the induction heating head assembly 14, or vice versa) that facilitates adjustment of the orientation of the handle 72 with respect to all three axes 32, 34, 36 of the induction heating head assembly 14.

As also illustrated in FIG. 6, in certain embodiments, the induction heating head assembly 14 may include one or more crossbars 88 that extend from opposite lateral sides 42, 44 of the main housing 26. The crossbars 88 may serve several functions, for example, facilitating manual manipulation of movement of the induction heating head assembly 14 by a person either during operation of the induction heating head assembly 14 or when the induction heating head assembly 14 is being manually transported from one location to another.

Figure 7A:
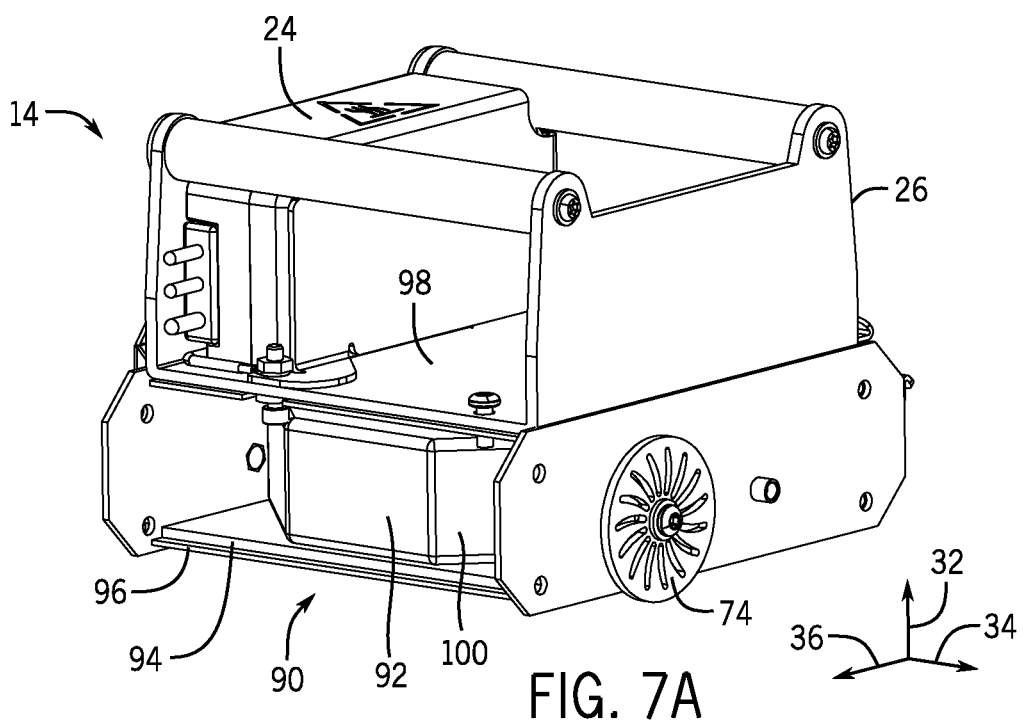
FIG. 7A is a partial cutaway perspective view of a main housing and an induction head control assembly of the induction heating head assembly in accordance with embodiments of the present disclosure.

FIG. 7A is a partial cutaway perspective view of the main housing 26 and the cable strain relief cover 24 of an exemplary embodiment of the induction heating head assembly 14 with certain components removed to facilitate illustration of certain features. As illustrated in FIG. 7A, an induction head assembly 90 includes an induction head 92, a thermal insulation layer 94, and an insulation and wear surface 96 that generally serves as the bottom side of the main housing 26 of the induction heating head assembly 14. As illustrated, the induction head 92 is disposed within an interior volume defined between the thermal insulation layer 94, which is disposed adjacent and internal to the insulation and wear surface 96, and an interior partition 98 of the main housing 26 to which the cable strain relief cover 24 is attached. The thermal insulation layer 94 may be comprised of any suitable insulating material. The insulation and wear surface 96 may be comprised of mica, ceramic, or any other insulating material that wears.

In certain embodiments, the insulation and wear surface 96 may provide sufficient thermal insulation that the separate thermal insulation layer 94 may be omitted. Conversely, in certain embodiments, the insulation and wear surface 96 may not be used at all. In such an embodiment, the thermal insulation layer 94 may be the externally facing surface of the induction heating head assembly 14. In other embodiments, the insulation and wear surface 96 may serve as only a wear surface that is comprised of a material that provides relatively less thermal insulation, with most of the thermal insulation be provided by the thermal insulation layer 94. In certain embodiments, multiple thermal insulation layers 94 may be used. In general, the insulation and wear surface 96 protects the thermal insulation layer(s) 94 and the induction coil of the induction head 92 from abrasion and possible thermal damage. In particular, the insulation and wear surface 96 is an externally facing surface that isolates the induction coil of the induction head, as well as the thermal insulation layer(s) 94, from an exterior of the induction heating head assembly 14. A wear surface such as the insulation and wear surface 96, as described herein, is a surface designed to protect a coil of the induction head assembly 90 from incidental contact with the workpiece 16, without unduly wearing the surface, by being the point of contact when inadvertent contact with the workpiece 16 is made. In certain embodiments, more than one insulation and wear surface 96 may be included, such as for heating two surfaces of a corner.

Figure 7B:
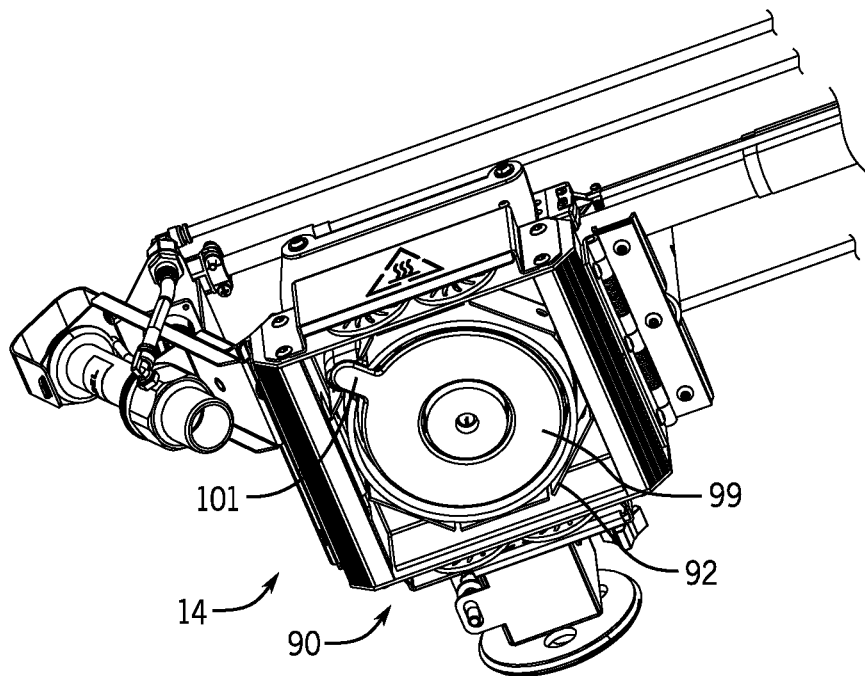
FIG. 7B is a perspective view of the induction heating head assembly in accordance with embodiments of the present disclosure.
Figure 7C:
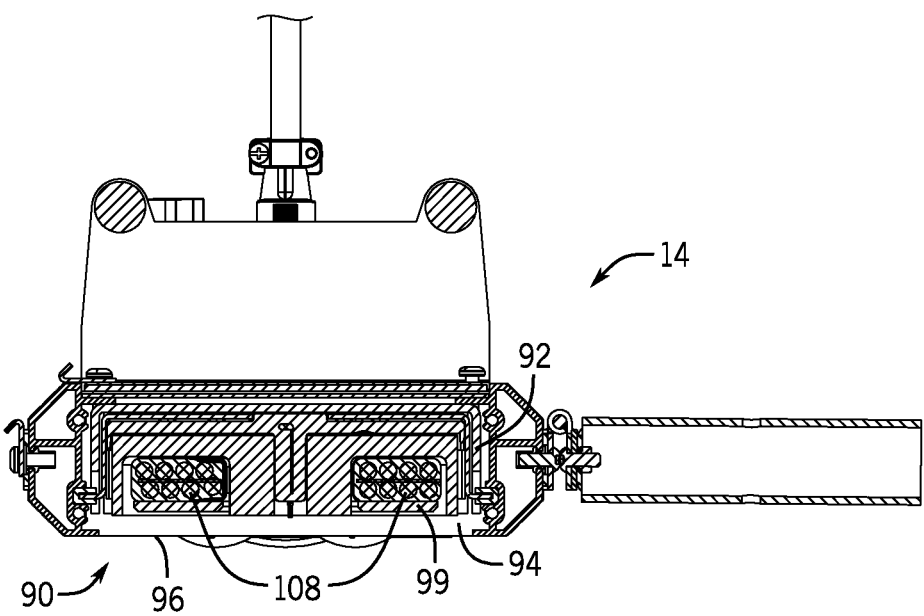
FIG. 7C is a cutaway side view of the induction heating head assembly in accordance with embodiments of the present disclosure.

In certain embodiments, the induction head assembly 90 includes an additional wear surface to prevent unwanted contact with the induction coil. For example, FIG. 7B is a perspective view of the induction heating head assembly 14 with the thermal insulation layer(s) 94 and the insulation and wear surface 96 removed for illustration purposes. In addition, FIG. 7C is a cutaway side view of the induction heating head assembly 14. FIGS. 7B and 7C illustrate a ceramic spacer 99 that is disposed between the one or more thermal insulation layer(s) 94 and the conductive coil 108 of the induction head 92 of the induction head assembly 90. As illustrated in FIG. 7B, the ceramic spacer 99 is shaped similarly to the conductive coil 108 (e.g., Q-shaped, having a generally circular portion with a tongue 101 extending radially outward from the circular portion) to generally align with the conductive coil 108 and its connections 120 (illustrated in FIGS. 8, 9, and 10A through 10C) to provide added protection for the conductive coil 108 and its connections 120.

FIG. 8 is an exploded view of an exemplary embodiment of the induction head 92, which includes an outer housing 100, a first layer of thermally conductive potting compound 102, a flux concentrator 104, a second layer of thermally conductive potting compound 106, and the conductive coil 108. The coil 108 may be comprised of copper, aluminum, or another relatively conductive material. In certain embodiments, the outer housing 100 may be comprised of aluminum, although other materials may be used. In certain embodiments, the layers of potting compounds 102, 106 may comprise a thermally conductive material such as silicone. In certain embodiments, the thermally conductive potting compounds 102, 106 may be any other media or devices that spatially secure the coil 108 with respect to the flux concentrator 104. In other words, the thermally conductive potting compounds help hold the coil 108 in a fixed position with respect to the flux concentrator 104. In certain embodiments, the flux concentrator 104 may be comprised of ferrite or a Fluxtrol® material, although other materials may be used. In general, the flux concentrator 104 redirects the magnetic field from the top and sides of the coil 108 toward the wear surface of the induction head 92 (i.e., the side of the induction head 92 that abuts the thermal insulation layer(s) 94 of the induction head assembly 90). In other words, the flux concentrator 104 concentrates a flux toward the insulation and wear surface 96. During operation of the induction heating head assembly 14, the coil 108 is held in proximity to the workpiece 16 being heated. In embodiments where two insulation and wear surfaces 96 are included, the coil 108 may be bent to be near both surfaces. Alternatively, in certain embodiments, parallel coils 108 may be used with two flux concentrators 104.

FIG. 9 is a perspective view of the conductive coil 108 of the induction head 92 of FIG. 8. As illustrated, in certain embodiments, the coil 108 is wound in a stacked pancake spiral pattern having at least two layers 110 with at least four turns 112 in each layer 110. However, in certain embodiments, fewer turns 112 (e.g., at least two turns 112) per layer 110 may be used such that less power is consumed by the coil 108. The stacked pancake spiral pattern of the coil 108, as described herein, means that the coil 108 is wound in multiple spirals (i.e., layers 110) with each spiral in a plane (e.g., generally perpendicular to a central axis 114 of the coil 108) that is different from each other. For example, the two layers 110 of turns 112 may each be arranged in generally parallel respective planes with the layers 110 of turns 112 abutting each other. The number of turns 112 in a spiral pattern, as described herein, is the number of times the coil 108 crosses a given line 116 extending radially outward in one direction from the central axis 114 of the spiral. The spiral pattern, as described herein, refers to the coil 108 having a pattern wound about the central axis 114, wherein a path 118 along the turns 112 taken from the outermost turn 112 to the innermost turn 112 results in a distance $d_{turn}$ from the path 118 to the central axis 114 decreasing on average. In certain embodiments, the spiral pattern of the coil 108 includes patterns where there are local variations from the decreasing distance $d_{turn}$, such as square spirals, oval spirals, distorted spirals, and so forth, as opposed to the generally constantly decreasing distance $d_{turn}$ of the generally circular spirals of the embodiment illustrated in FIG. 9.

Certain embodiments provide for the coil 108 having an outer diameter $d_{outer}$ that is approximately 4 inches, approximately 6 inches, or approximately 8 inches. However, coils 108 having other outer diameters $d_{outer}$ may be used. For example, in certain embodiments, even larger coils 108 may be used. The multi-turn design of the coil 108 helps distribute heat more evenly across the heat zone applied to the workpiece 16 and keeps the design of the coil 108 relatively compact. In particular, including multiple layers 110 in a stacked relationship keeps the footprint of the coil 108 and, in turn, the induction head assembly 90 relatively compact. As described herein, in certain embodiments, the turns 112 of the coil 108 may be a hollow tube to enable a coolant to flow through the turns 112, thereby providing internal cooling of the turns 112.

Certain embodiments provide for a single pancake spiral pattern coil 108 as opposed to the multiple layer embodiment illustrated in FIGS. 8 and 9. Other embodiments provide for other patterns and sizes of the coil 108, and for using conductive materials other than copper (e.g., aluminum) for the coil 108. For example, non-limiting examples of other embodiments include a coil 108 with a single layer spiral (i.e., not stacked), an eight turn 112 double-stacked coil 108, a coil 108 cooled by fluid in contact with (rather than through a hollow interior of the turns 112) the coil 108, such as fluid flowing within spaces in the potting compounds 102, 106, as well as other patterns, sizes, shapes and designs.

FIGS. 10A through 10C illustrate another embodiment of the coil 108. The coil 108 illustrated in FIG. 10A is a two-layer stacked spiral with four turns 112 per layer 110. However, the connections 120 at the opposite ends of the coil 108 that are configured to connect to the cable strain relief cover 24 are arranged differently than the connections 120 of the embodiment illustrated in FIGS. 8 and 9. FIGS. 10B and 10C are bottom and top perspective views of the coil 108 of FIG. 10A with the flux concentrator 104 disposed about the coil 108.

In general, the number and size of the layers 110 and the turns 112 of the coil 108 are selected to tune the coil 108 to the particular power source 12 that provides power to the coil 108. As such, as illustrated in FIG. 7A, in certain embodiments, the induction head assembly 90 may be removable and replaceable from the interior volume defined between the thermal insulation layer 94, which is disposed adjacent and internal to the insulation and wear surface 96, and an interior partition 98 of the main housing 26 of the induction heating head assembly 14. In other words, to ensure that the coil 108 is properly tuned to the power source 12 providing power to it, the particular induction head assembly 90 used in the induction heating head assembly 14 may be changed as needed. Alternatively, the entire induction heating head assembly 14, which includes the particular induction head assembly 90, may be matched to the power source 12 being used to provide power to the induction heating head assembly 14. When choosing the coil design, the diameter (e.g., when the workpiece 16 is a pipe), material type, thickness, and so forth, of the workpiece 16 to be heated should also be considered.

Because the coil 108 is tuned to the power source 12, the induction heating system 10 illustrated in FIG. 1 does not require a transformer between the induction heating head assembly 14 and the power source 12 that steps down or steps up the voltage provided by the power source 12. Rather, the induction heating head assembly 14 can connect directly to the power source 12 without the additional cost, size, and weight that would result from using a transformer. Furthermore, the voltage applied to the coil 108 is not less than the voltage from the output circuitry 52 of the power source 12.

FIG. 11 is a side view of the main housing 26 and the temperature sensor assembly 28 of an embodiment of the induction heating head assembly 14, illustrating how the temperature sensor assembly 28 attaches to the main housing 26. As illustrated, in certain embodiments, the temperature sensor assembly 28 includes a first bracket 122 and a smaller second bracket 124 that may be coupled to each other via an adjustable connection mechanism 126, such as the knob assembly 128 illustrated in FIG. 11, which is substantially similar to the adjustable connection mechanism 80 and the knob assembly 82 of the travel sensor assembly 30 described herein with respect to FIGS. 4 and 5. In certain embodiments, the adjustable connection mechanism 126 includes a biasing member, such as a spring, against which the knob (or other connecting means) acts to hold the smaller bracket 124 in a fixed position with respect to the larger bracket 122, thereby holding the temperature sensor assembly 28 in place with respect to the main housing 26 of the induction heating head assembly 14.

FIG. 12 is a zoomed in perspective view of the first and second brackets 122, 124 of the temperature sensor assembly 28, the adjustable connection mechanism 126 of the temperature sensor assembly 28, and the main housing 26 of the induction heating head assembly 14, illustrating in more detail how the first and second brackets 122, 124 of the temperature sensor assembly 28 may attach to the main housing 26. As illustrated, the main housing 26 includes first and second mating brackets 130, 132 that are configured to mate with the first and second brackets 122, 124 of the temperature sensor assembly 28. In particular, in certain embodiments, the first mating bracket 130 of the main housing 26 includes a first mating lip 134 configured to mate with a lip 136 of the first bracket 122 of the temperature sensor assembly 28, and the second mating bracket 132 of the main housing 26 includes a second mating lip 138 configured to mate with a lip 140 of the second bracket 124 of the temperature sensor assembly 28.

It will be appreciated that once the lip 136 of the first bracket 122 of the temperature sensor assembly 28 is brought into position with respect to the mating lip 134 of the first mating bracket 130 of the main housing 26, thereby engaging the first bracket 122 of the temperature sensor assembly 28 with the first mating bracket 130 of the main housing 26, and the lip 140 of the second bracket 124 of the temperature sensor assembly 28 is brought into position with respect to the mating lip 138 of the second mating bracket 132 of the main housing 26, thereby engaging the second bracket 124 of the temperature sensor assembly 28 with the second mating bracket 132 of the main housing 26, the adjustable connection mechanism 126 of the temperature sensor assembly 28 may be used to secure the first and second brackets 122, 124 to each other, thereby holding the temperature sensor assembly 28 in a fixed position with respect to the main housing. Furthermore, it will be appreciated that first and second brackets 122, 124 and the adjustable connection mechanism 126 enable the temperature sensor assembly 28 to be entirely removable from the main housing 26, which enables maintenance, repair, and replacement of the temperature sensor assembly 28. For example, in certain situations, a different type of temperature sensor assembly 28 (e.g., having temperature sensors better suited for detecting temperatures on certain workpiece materials, etc.) may be interchanged for the temperature sensor assembly 28 that is currently attached to the main housing 26 of the induction heating head assembly 14. Moreover, in certain embodiments, the temperature sensor assembly 28 may be completely separate from (i.e., not mounted to) the induction heating head assembly 14 during operation of the temperature sensor assembly 28 and the induction heating head assembly 14.

FIG. 13 is an exploded perspective view of the first and second brackets 122, 124 of the temperature sensor assembly 28, the adjustable connection mechanism 126 of the temperature sensor assembly 28, and the main housing 26 of the induction heating head assembly 14, illustrating the brackets 122, 124, 130, 132 and the adjustable connection mechanism 126 when the brackets 122, 124, 130, 132 are not attached to each other via the adjustable connection mechanism 126. It will be appreciated that the adjustable nature of the brackets 122, 124, 130, 132 and the adjustable connection mechanism 126 enables the temperature sensor assembly 28 to be selectively moved from side-to-side of the main housing 26 of the induction heating head assembly 14.

For example, FIG. 14 is front view of an embodiment of the temperature sensor assembly 28 and the main housing 26 of the induction heating head assembly 14, illustrating how a horizontal position of the temperature sensor assembly 28 with respect to the main housing 26 along the horizontal axis 34 is adjustable. As illustrated by arrow 142, the fixed position of the temperature sensor assembly 28 with respect to the lateral sides 42, 44 of the main housing 26 may be adjusted by, for example, loosening the knob 128 of the adjustable connection mechanism 126, adjusting the positioning of the first and second brackets 122, 124 of the temperature sensor assembly 28 (e.g., along the horizontal axis 34 of the induction heating head assembly 14) with respect to the fixed first and second mating brackets 130, 132 of the main housing 26, and re-tightening the knob 128 of the adjustable connection mechanism 126. In other words, the brackets 122, 124, 130, 132 may collectively constitute a rail system along which the temperature sensor assembly 28 may slide along the horizontal axis 34 of the induction heating head assembly 14. In certain embodiments, the rail system enables more than one temperature sensor assembly 28 to be mounted to the induction heating head assembly 14, for example, such that a first temperature sensor assembly 28 may be positioned on a first lateral side of a weld being performed and a second temperature sensor assembly 28 may be positioned on a second lateral side of the weld being performed.

Returning now to FIG. 11, as illustrated, in certain embodiments, the temperature sensor assembly 28 includes a generally cylindrical shaped body 144 within which a temperature sensor is disposed, as described herein. As illustrated, in certain embodiments, the body 144 is generally parallel with the first bracket 122 of the temperature sensor assembly 28. In general, the body 144 of the temperature sensor assembly 28 is oriented such that a lower air cup 146 disposed at an axial end of the cylindrical body 144 is pointed, along a central axis 148 of the body 144, toward an area of the workpiece 16 at which induction heating is occurring. In certain embodiments, the position of the lower air cup 146 of the body 144 with respect to the main housing 26 of the induction heating head assembly 14 remains fixed. However, in other embodiments, an inner cylinder 150 of the temperature sensor assembly 28, which includes a temperature sensor, may be configured to translate with respect to the central axis 148 of the body 144 such that the inner cylinder 150 may be moved closer to or farther away from the workpiece 16 along the central axis 148, as illustrated by arrow 152. For example, in certain embodiments, the inner cylinder 150 may be moved axially along the central axis 148 through first and second bumpers 154, 156, which are fixed to the first bracket 122 and provide protection of the inner cylinder 150 from unwanted contact during movement of the induction heating head assembly 14. As such, a height distance (i.e., vertical position) of the inner cylinder 150 along the vertical axis 32 of the induction heating head assembly 14 is adjustable, and an offset distance of the inner cylinder 150 along the horizontal axis 36 is also adjustable, thereby modifying the overall distance of the inner cylinder 150, and the components disposed within it (e.g., a temperature sensor and associated components), from the workpiece 16. Adjusting the position of the inner cylinder 150 along the central axis 148 in this manner enables tuning of the operation of the temperature sensor that is disposed in the inner cylinder 150. For example, if the sensitivity of the detected temperature needs to be increased, the inner cylinder 150 may be moved closer to the workpiece 16 along the central axis 148.

As illustrated in FIG. 11, in certain embodiments, the central axis 148 (e.g., along a path of detection) of the body 144 of the temperature sensor assembly 28 may be disposed at an angle $\alpha_{temp}$ with respect to the horizontal axis 36. The illustrated embodiment has the body 144 of the temperature sensor assembly 28 disposed at an angle $\alpha_{temp}$ of approximately 50°. However, it will be appreciated that the temperature sensor assembly 28 may be configured to utilize other angles $\alpha_{temp}$ such as approximately 30°, approximately 35°, approximately 40°, approximately 45°, approximately 55°, approximately 60°, and so forth. Furthermore, in certain embodiments, the temperature sensor assembly 28 may be configured to enable the angle $\alpha_{temp}$ at which the central axis 148 of the body 144 is disposed to be adjusted by a user.

For example, as illustrated in FIG. 12, the design of the lips 136, 140 of the first and second brackets 122, 124 of the temperature sensor assembly 28 and the mating lips 134, 138 of the first and second mating brackets 130, 132 of the main housing 26 may enable an angle between the first bracket 122 of the temperature sensor assembly 28 and the mating first bracket 130 of the main housing 26 to be adjusted, and an angle between the second bracket 124 of the temperature sensor assembly 28 and the mating second bracket 132 of the main housing 26 to also be adjusted while the adjustable connection mechanism 126 is not engaged with the first and second brackets 122, 124 of the temperature sensor assembly 28. Once the angular orientations between the first bracket 122 of the temperature sensor assembly 28 and the mating first bracket 130 of the main housing 26 and between the second bracket 124 of the temperature sensor assembly 28 and the mating second bracket 132 of the main housing 26 are re-adjusted, the adjustable connection mechanism 126 may re-engage the first and second brackets 122, 124 of the temperature sensor assembly 28.

However, in certain embodiments, to facilitate the re-adjusted angular orientations between the first bracket 122 of the temperature sensor assembly 28 and the mating first bracket 130 of the main housing 26 and between the second bracket 124 of the temperature sensor assembly 28 and the mating second bracket 132 of the main housing 26, the adjustable connection mechanism 126 may re-engage with different mating features in the first bracket 122 and/or the second bracket 124 of the temperature sensor assembly 28. For example, as a non-limiting example, in certain embodiments, the knob 128 of the adjustable connection mechanism 126 may engage with a sole mating hole in the second bracket 124 of the temperature sensor assembly 28, but mate with one of a plurality of different mating holes in the first bracket 122 of the temperature sensor assembly 28 at a plurality of different locations 158, as shown in the embodiment of the first bracket 122 illustrated in FIG. 15. The plurality of hole locations 158 in the first bracket 122 facilitate different angular orientations between the first bracket 122 of the temperature sensor assembly 28 and the mating first bracket 130 of the main housing 26 and between the second bracket 124 of the temperature sensor assembly 28 and the mating second bracket 132 of the main housing 26.

Figure 16:
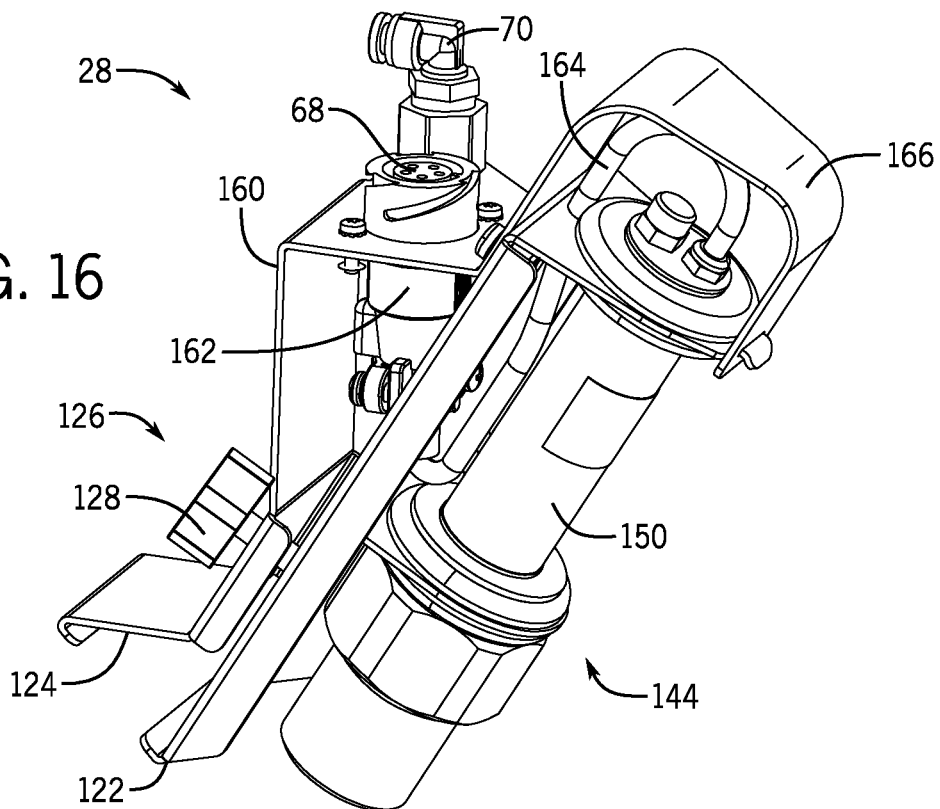
FIG. 16 is a perspective view of the temperature sensor assembly in accordance with embodiments of the present disclosure.

FIG. 16 is a perspective view of an embodiment of the temperature sensor assembly 28. As illustrated, in certain embodiments, the second bracket 124 of the temperature sensor assembly 28 includes a bracket section 160 that is configured to support a connector assembly 162 that includes the connector 68 that connects the cable 18 from the power source 12 to the temperature sensor assembly 28. As illustrated, in certain embodiments, the connector assembly 162 includes a flexible control cable 164 that couples to the inner cylinder 150 of the body 144 of the temperature sensor assembly 28 at an axial end opposite the lower air cup 146 that is at an axial end closest to the workpiece 16 during operation. In general, the flexible control cable 164 is used to transmit control signals received from the power source 12 to the working components (e.g., a temperature sensor and related components) of the temperature sensor assembly 28 residing within the inner cylinder 150, and to transmit feedback signals (e.g., relating to temperature data) from the working components of the temperature sensor assembly 28 residing within the inner cylinder 150 back to the power source 12. As will be appreciated, the flexible nature of the control cable 164 enables the inner cylinder 150 of the body 144 of the temperature sensor assembly 28 to be translated toward or away from the workpiece 16 without placing strain on the control cable 164, the connector assembly 162, the inner cylinder 150, or any other components of the temperature sensor assembly 28. As also illustrated in FIG. 16, in certain embodiments, the second bracket 124 of the temperature sensor assembly 28 also includes a bracket section 166 that generally protects the flexible control cable 164 from unwanted contact near the point of connection with the inner cylinder 150.

Figure 17A:
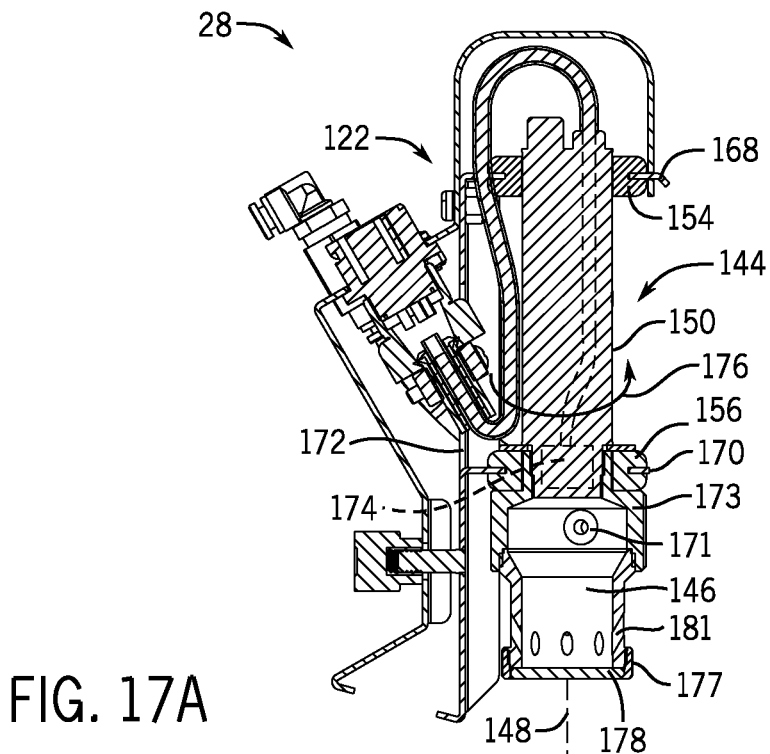
FIG. 17A is a partial cutaway side view of the temperature sensor assembly in accordance with embodiments of the present disclosure.

FIG. 17A is a partial cutaway side view of the temperature sensor assembly 28. The body 144 of the temperature sensor assembly 28 includes the first and second bumpers 154, 156 that are configured to hold the body 144 in place with respect to the first bracket 122 of the temperature sensor assembly 28 by attaching to first and second bracket sections 168, 170, respectively, that extend generally perpendicularly from a main surface 172 of the first bracket 122, and also protect the inner cylinder 150 from undesired contact during transport and/or operation. As described herein, in certain embodiments, the components of the body 144 (e.g., including the inner cylinder 150, the first and second bumpers 154, 156, the lower air cup 146, and so forth) may be translated along the central axis 148 of the body 144 such that the components of the body 144 are brought closer to or farther away from the workpiece 16.

As illustrated in FIG. 17A, in certain embodiments, a temperature sensor 174 is disposed within the inner cylinder 150 near a distal axial end (e.g., an axial end nearer the workpiece 16 during operation) of the inner cylinder 150. In certain embodiments, the temperature sensor 174 is an infrared (IR) sensor that does not contact the workpiece 16. However, in other embodiments, instead of being non-contacting, the temperature sensor 174 may contact the workpiece 16 during detection of the temperature of the workpiece 16. In certain embodiments, as illustrated by arrow 176, the temperature sensor 174 may be rotated (e.g., at least 180 degrees, or even a full 360 degrees) about the central axis 148 such that the temperature sensor 174 can focus detection of heat from the workpiece 16 in different ways.

In certain embodiments, more than one temperature sensor 174 may be used to more accurately read temperatures across a spectrum of emissivity levels because material surface preparation can result in a variety of surface emissivities from part to part or within a given part itself. For example, a first temperature sensor 174 may be used when a surface emissivity of the workpiece 16 falls within a first range, while a second temperature sensor 174 may be used when the surface emissivity of the workpiece 16 falls within a second range. As such, the first temperature sensor 174 may be better suited to detect temperatures from certain types of workpiece materials while the second temperature sensor 174 may be better suited to detect temperatures from other types of workpiece materials. In some situations, the first and second temperature sensors 174 are focused on the same location of the workpiece 16 being heated. However, in other situations, the first and second temperature sensors 174 may be focused on slightly or completely different locations. For example, in certain embodiments, the temperature sensor(s) 174 may have a field of vision "window" directly in line with a weld being performed on the workpiece 16. The plurality of temperature sensors 174 may either be disposed within the body 144 of the temperature sensor assembly 28 simultaneously (and, for example, be selectively used at any given time) or may be interchangeably removable from the temperature sensor assembly 28 for different operating conditions (e.g., different surface emissivities, different expected temperature ranges, and so forth).

Using a plurality of temperature sensors 174 enables the temperature sensor assembly 28 to detect temperatures in a plurality of wavelength ranges. For example, in certain embodiments, the temperature sensor 174 of the temperature sensor assembly 28 may be capable of using multiple wavelengths (or a range of wavelengths) to detect a temperature of the workpiece 16. Alternatively, in other embodiments, the temperature sensor assembly 28 may include multiple different temperature sensors 174, each capable of detecting a temperature of the workpiece 16 at different wavelengths (or ranges of wavelengths). In such an embodiment, the different temperature sensors 174 may be selectively used by a user of the temperature sensor assembly 28. For example, in certain embodiments, the temperature sensor assembly 28 may allow a user to manually select which of the different temperature sensors 174 are currently being used (e.g., by toggling a switch on an external surface of the inner cylinder 150 of the temperature sensor assembly 28, by rotating the inner cylinder 150 of the temperature sensor assembly 28 about its central axis 148 (e.g., along a path of detection of the temperature sensor assembly 28) such that a desired one of the temperature sensors 174 is optically aligned to detect the temperature of the workpiece 16, and so forth).

In certain embodiments, the temperature sensor(s) 174 of the temperature sensor assembly 28 are configured to detect the temperature of the workpiece 16 at a plurality of wavelengths relating to a plurality of surface emissivities, and to transmit a feedback signal relating to the detected temperature of the workpiece 16 to the controller circuitry 50 without compensation for the particular surface emissivity of the workpiece 16. In other words, the temperature sensor(s) 174 of the temperature sensor assembly 28 are specifically selected to be optimally used with certain workpiece materials that have certain expected surface emissitivities such that no additional processing of the detected temperature is required by the temperature sensor assembly 28 or the controller circuitry 50. For example, neither the temperature sensor assembly 28 nor the controller circuitry 50 needs to compensate for the type of workpiece material being heated (e.g., via a setting input by a user). In such embodiments, certain temperature sensor assemblies 28 will be known to work with certain workpiece materials without additional calibration, setup, input of workpiece properties, etc. In certain embodiments, the temperature sensor(s) 174 of the temperature sensor assembly 28 may be configured to detect temperatures at a plurality of different wavelengths less than approximately 8.0 micrometers, within a range of approximately 1.0 micrometers and approximately 5.0 micrometers, within a range of approximately 2.0 micrometers and approximately 2.4 micrometers, and so forth. These wavelength ranges are merely exemplary and not intended to be limiting. Other wavelength ranges may be used for certain embodiments of the temperature sensor assembly 28.

Figure 17B:
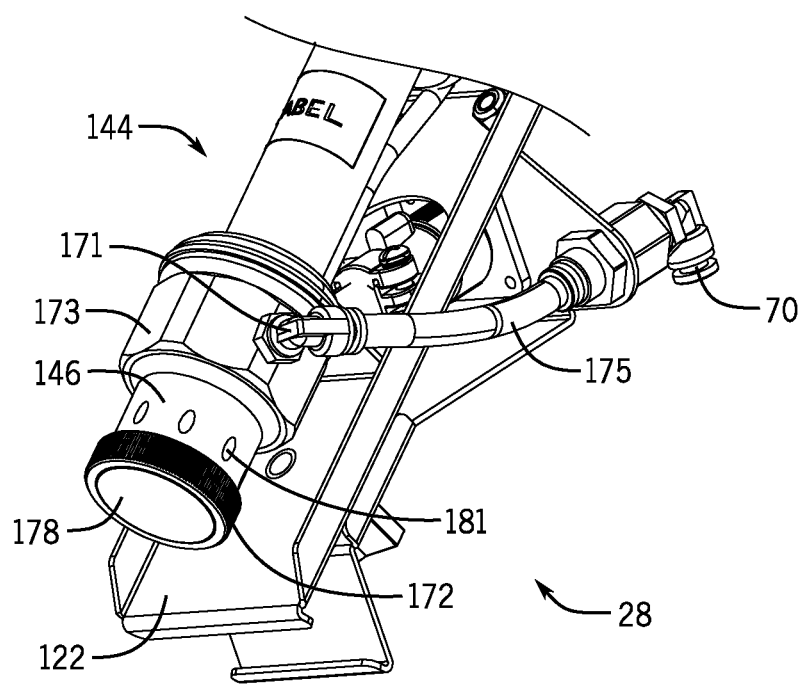
FIG. 17B is a perspective view of the temperature sensor assembly in accordance with embodiments of the present disclosure.
Figure 17C:
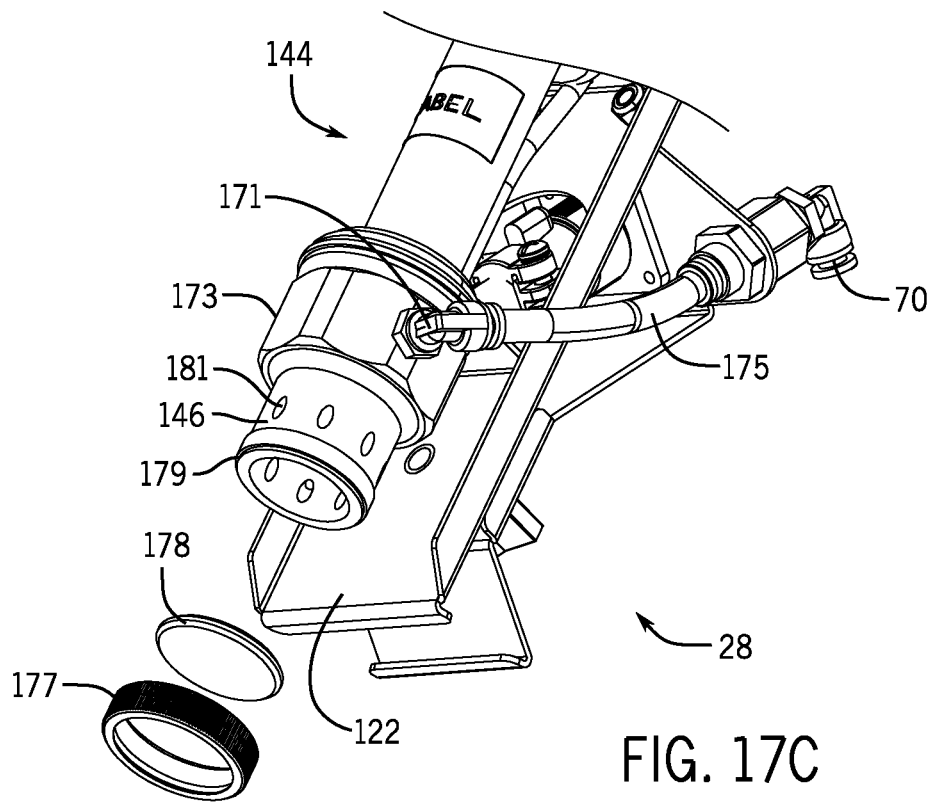
FIG. 17C is an exploded perspective view of the temperature sensor assembly in accordance with embodiments of the present disclosure.

FIGS. 17B and 17C are a perspective view and an exploded perspective view, respectively, of the temperature sensor assembly 28. As illustrated in FIGS. 17B and 17C, in certain embodiments, a protective window 178 may be disposed at an axial end of the lower air cup 146 along the central axis 148 (e.g., along a path of detection) of the temperature sensor assembly 28 and, in certain embodiments, may be held in place at the axial end of the lower air cup 146 using a retaining ring 177 that may, for example, be configured to attach to (e.g., screw onto, lock into place using a twist locking mechanism, and so forth) a mating attachment means 179 (e.g., threading, a mating twist locking mechanism, and so forth) disposed at the axial end of the lower air cup 146. In general, the protective window 178 may protect a lens of the temperature sensor 174 during operation of the induction heating head assembly 14. More specifically, the protective window 178 may protect the lens of the temperature sensor 174 from spatter from a weld being performed on the workpiece 16, from other debris that may be sucked or blown into the interior of the lower air cup 146 of the body 144, and so forth. In certain embodiments, the protective window 178 may be comprised of an IR-transparent material, such as quartz.

Air received by the temperature sensor assembly 28 via the air cable connector 70 is delivered through a port 171 of an upper air cup 173 via an air cable 175. In certain embodiments, the upper air cup 173 threads onto the inner cylinder 150, and retains the body 144 to the first bracket 122. In addition, in certain embodiments, the lower air cup 146 threads into the upper air cup 173 and, as such, is removable from the upper air cup 173 to facilitate access to the lens of the temperature sensor 174 if it needs cleaning. In certain embodiments, the air that flows through the air cup 146, 173 (which may collectively be referred to as "the air cup" when assembled together) escapes through one or more openings 181 that extend radially through an outer wall of the lower air cup 146. In other embodiments, the air may escape axially through the protective window 178 via openings (not shown) that may extend axially through the protective window 178. As such, positive pressure is provided from within the temperature sensor assembly 28 to clear debris, clean internal components, and so forth. In other embodiments where a protective window 178 is not used, the openings 181 may not be used in the lower air cup 146, and the air may instead escape through the open axial end of the lower air cup 146.

Figure 18:
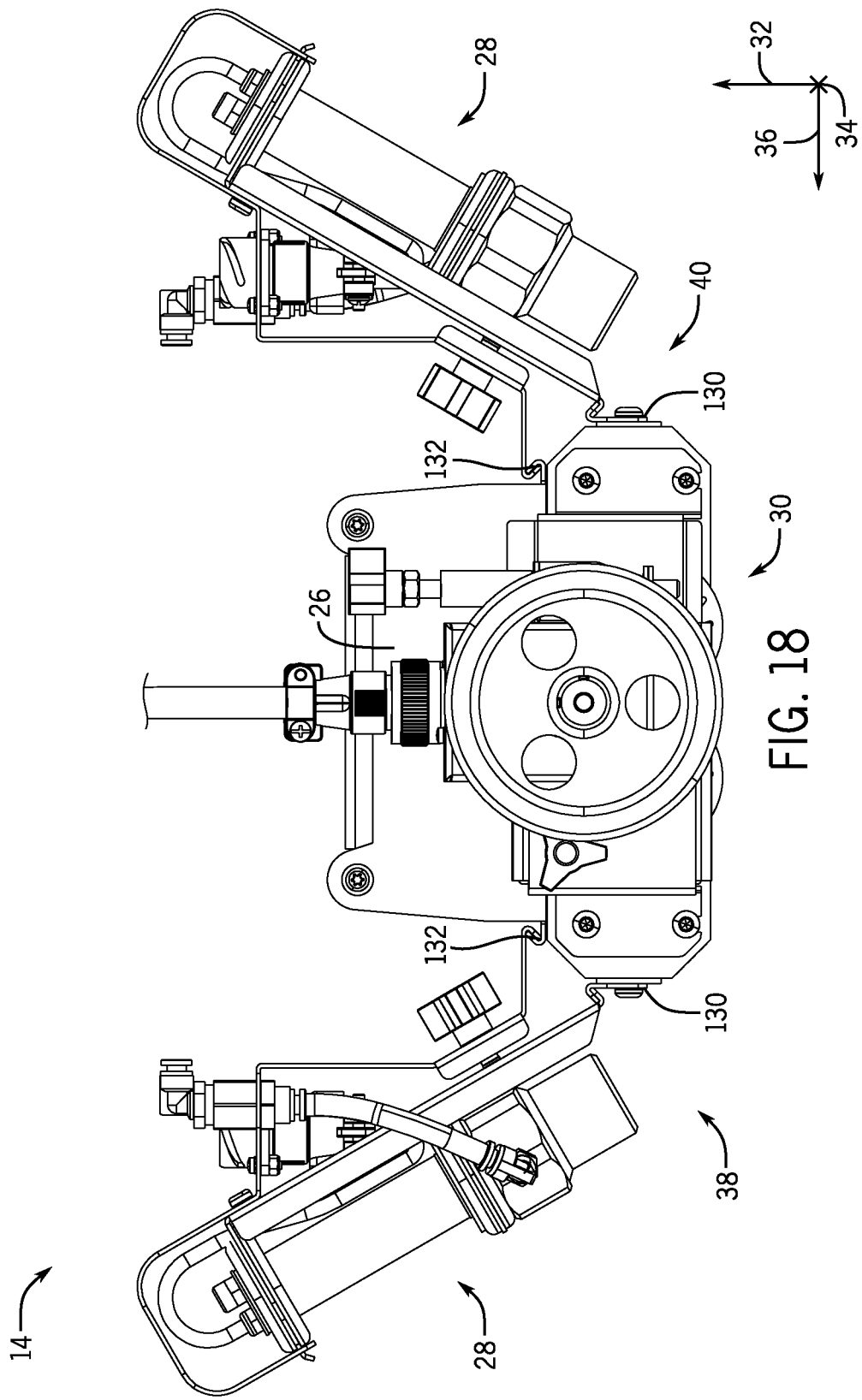
FIG. 18 is a side view of the induction heating head assembly having a first temperature sensor assembly attached to a front side of the induction heating head assembly and a second temperature sensor assembly attached to a back side of the induction heating head assembly in accordance with embodiments of the present disclosure.

Although certain embodiments include one temperature sensor assembly 28 attached to a first (i.e., front) side 38 of the induction heating head assembly 14, in other embodiments, more than one temperature sensor assembly 28 may be attached to the induction heating head assembly 14. For example, FIG. 18 is a side view of an embodiment of the induction heating head assembly 14 having a first temperature sensor assembly 28 attached to a first (i.e., front) side 38 of the induction heating head assembly 14 and a second temperature sensor assembly 28 attached to a second (i.e., back) side 40 of the induction heating head assembly 14. For example, in certain embodiments, instead of including the adjustable handle mounting assembly 84 attached on the back side 40 of the main housing 26, the induction heating head assembly 14 may include first and second mating brackets 130, 132 attached on the back side 40 of the main housing 26 that are substantially similar to the first and second mating brackets 130, 132 attached to the front side 38 of the main housing 26 (for example, as illustrated in FIG. 12). In such an embodiment, a temperature sensor assembly 28 may be coupled to the main housing 26 on either the front side 38 or the back side of the main housing 26, or a first temperature sensor assembly 28 may be coupled to the main housing 26 on the front side 38 of the main housing 26 and a second temperature sensor assembly 28 may be coupled to the main housing 26 on the back side 40 of the main housing 26. In other embodiments, the adjustable handle mounting assembly 84 may be detachable from the back side 40 of the main housing 26, and first and second mating brackets 130, 132 may be attached to the back side 40 of the main housing 26 to replace the adjustable handle mounting assembly 84. In such an embodiment, the back side 40 of the main housing 26 would include appropriate features for selectively attaching either the adjustable handle mounting assembly 84 or the first and second mating brackets 130, 132 to the back side 40 of the main housing 26. In certain embodiments where the adjustable handle mounting assembly 84 is removed from the main housing 26, movement of the induction heating head assembly 14 may be accomplished by imparting forces on other alternate features of the induction heating head assembly 14, for example, the crossbars 88 of the main housing 26.

In embodiments where the main housing 26 includes first and second mating brackets 130, 132 on both the front side 38 and the back side 40 of the main housing 26, and first and second temperature sensor assemblies 28 are attached to the first and second mating brackets 130, 132 on the front side 38 and the back side 40 of the main housing 26, respectively, the first and second temperature sensor assemblies 28 enable detection of temperatures from the workpiece 16 both in front of (i.e., leading) and behind (i.e., trailing) the induction heating generated by the induction heating head assembly 14.

It should be noted that while illustrated in the figures and described herein as being removably detachable from the induction heating head assembly 14, in other embodiments, the temperature sensor assembly 28 may instead be used completely separate from (i.e., not mounted to) the induction heating head assembly 14 during operation of the temperature sensor assembly 28 and the induction heating head assembly 14. For example, in one non-limiting example, the temperature sensor assembly 28 and the induction heating head assembly 14 may be attached to separate structures with the temperature sensor assembly 28 detecting the temperature of the workpiece 16 and the induction heating head assembly 14 separately providing induction heat to the workpiece 16.

Figure 19:
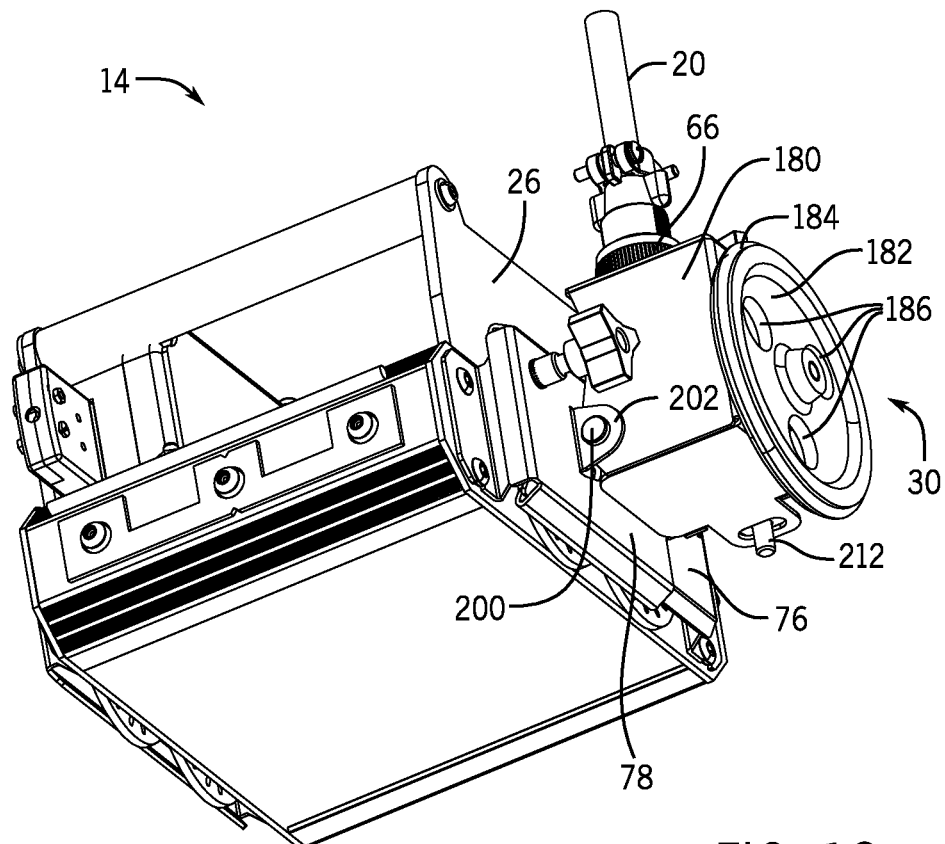
FIG. 19 is a front bottom perspective view of a travel sensor assembly and the main housing of the induction heating head assembly in accordance with embodiments of the present disclosure.
Figure 20:
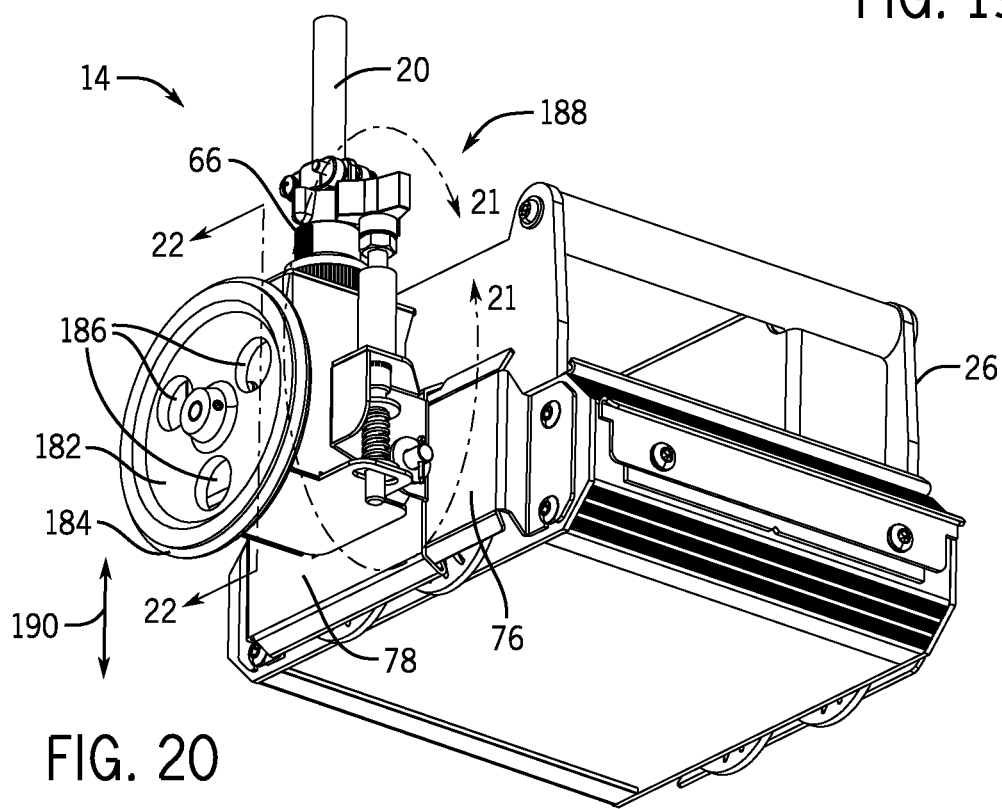
FIG. 20 is a back bottom perspective view of the travel sensor assembly and the main housing of the induction heating head assembly in accordance with embodiments of the present disclosure.

FIGS. 19 and 20 are bottom perspective views of the travel sensor assembly 30 and the main housing 26 of the induction heating head assembly 14, illustrating certain features relating to the travel sensor assembly 30. As described above with respect to FIGS. 4 and 5, the bracket 76 of the main housing 26 and the mating bracket 78 of the travel sensor assembly 30 enable the travel sensor assembly 30 to be removably detached from the main housing 26, and to enable a horizontal position of the travel sensor assembly 30 along the horizontal axis 36 to be adjusted.

As illustrated, in certain embodiments, the travel sensor assembly 30 includes a generally rectangular housing 180 within which components of the travel sensor assembly 30 may be disposed. As also illustrated, in certain embodiments, the travel sensor assembly 30 includes a detection wheel 182 coupled to the housing 180 and configured to rotate with respect to the housing 180. When in operation, the detection wheel 182 rolls along the surface of the workpiece 16 and at least partially enables the travel sensor assembly 30 to detect the position and/or movement (including direction of movement) of the travel sensor-assembly 30 and, thus, the induction heating head assembly 14 with respect to the workpiece 16. As illustrated, in certain embodiments, the detection wheel 182 includes a removable wear ring 184 that, for example, fits within a circumferential groove of the detection wheel 182. The wear ring 184 actually interfaces with the workpiece 16 and may be made of a relatively soft material, such as rubber, that may wear over time, but is removable and replaceable as needed. Other embodiments of the detection wheel 182 may not include a wear ring 184, but rather may include a knurled or smooth detection wheel 182 for directly interfacing with the workpiece 16.

Furthermore, in certain embodiments, the detection wheel 182 may include a plurality of openings 186 extending through the detection wheel 182. In certain embodiments, these openings 186 facilitate the detection of the position and/or movement (including direction of movement) of the travel sensor-assembly 30 and, thus, the induction heating head assembly 14 with respect to the workpiece 16. Although illustrated as including three relatively similar circular holes, in other embodiments, the openings 186 may take different forms, such as a plurality circular holes having differing diameters, a plurality of slots of various shapes, and so forth. In other embodiments, instead of including a plurality of openings 186 for facilitating detection of the position and/or movement (including direction of movement) of the travel sensor-assembly 30, in other embodiments, the detection wheel 182 may include a plurality of markings (e.g., on a face of the detection wheel 182) for facilitating detection of the position and/or movement (including direction of movement) of the travel sensor assembly 30. It should be noted that while illustrated in the figures and described herein as including the detection wheel 182 as a contacting surface that is used to determine a position and/or movement (including direction of movement) of the travel sensor-assembly 30 with respect to the workpiece 16, in other embodiments, other types of contacting travel sensor-assemblies 30 may be used. For example, as a non-limiting example, one or more brushes that contact the surface of the workpiece 16 may facilitate detection of the position and/or movement (including direction of movement). In other embodiments, the travel sensor-assembly 30 may utilize non-contacting detection means, such as an IR sensor, optical sensor, magnetic sensor, accelerometers and/or gyroscopes, and so forth. Furthermore, in certain embodiments, instead of including a separate detection wheel 182, the wheels 74 of the induction heating head assembly 14 may be used in place of the detection wheel 182 to enable the travel sensor assembly 30 to detect the position and/or movement (including direction of movement) of the travel sensor-assembly 30 with respect to the workpiece 16.

Figure 21:
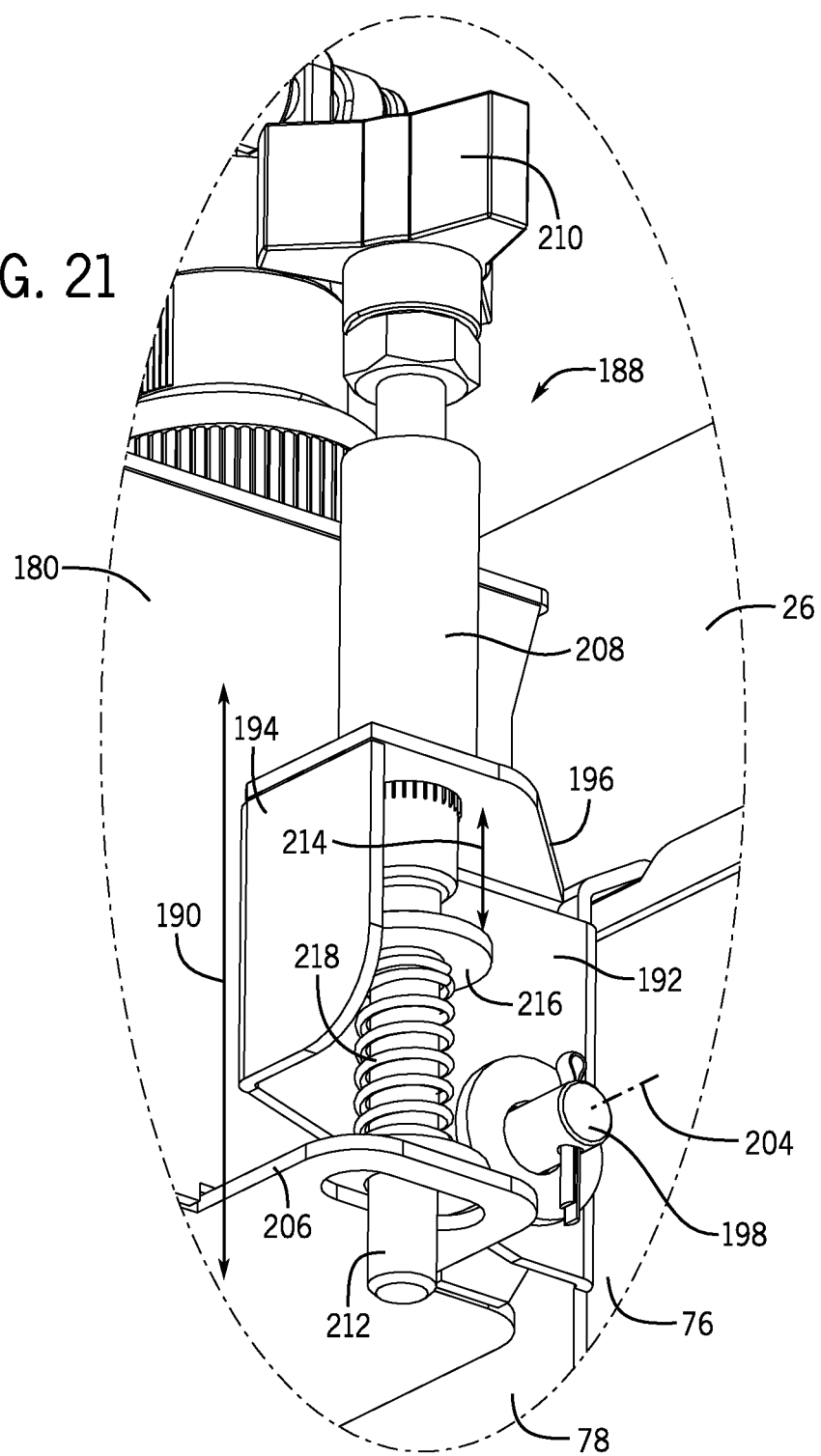
FIG. 21 is a zoomed in perspective view of a tensioning mechanism of the travel sensor assembly in accordance with embodiments of the present disclosure.

As illustrated in FIG. 20, in certain embodiments, a tensioning mechanism 188 of the travel sensor assembly 30 may be used to adjust a vertical position (as well as the force between the travel sensor assembly 30 and the workpiece 16) of the detection wheel 182 of the travel sensor assembly 30 with respect to the vertical axis 32, as illustrated by arrow 190. FIG. 21 is a zoomed in perspective view of the tensioning mechanism 188 of the travel sensor assembly 30. As illustrated, in certain embodiments, the tensioning mechanism 188 may be attached to the bracket 78 that is attached to the housing 180 of the travel sensor assembly 30. More specifically, a bracket section 192 of the bracket 78 may extend generally perpendicular to the main section of the bracket 78 and include two generally perpendicular bracket sections 194, 196. As illustrated, in certain embodiments, a pivot pin 198 may fit through the bracket section 192 of the bracket 78 and the housing 180 of the travel sensor assembly 30 to hold the housing 180 in a relatively fixed position with respect to an axis of the pivot pin 198. An opposite end 200 of the pivot pin 198 is illustrated in FIG. 19. More specifically, the pivot pin 198 extends all the way through the housing 180 of the travel sensor assembly 30 and through another bracket section 202 of the bracket 78 on an opposite side of the housing 180 from the bracket section 192.

Therefore, returning now to FIG. 21, the position of the housing 180 of the travel sensor assembly 30 remains fixed with respect to a central axis 204 of the pivot pin 198. However, the housing 180 of the travel sensor assembly 30 may be allowed to pivot about the central axis 204 of the pivot pin 198 to enable the detection wheel 182 to be moved closer to or farther away from the workpiece 16, as illustrated by arrow 190. More specifically, the side of the housing 180 on which the detection wheel 182 is disposed may be capable of moving closer to or farther away from the workpiece 16. In general, the bracket sections 192, 194, 196 of the bracket 78 of the travel sensor assembly 30 remain fixed in position with respect to the bracket 76 of the main housing 26 of the induction heating head assembly 14, while a bracket section 206 extending from the housing 180 of the travel sensor assembly 30 may be allowed move up or down with respect to the bracket 76.

As illustrated, in certain embodiments, the tensioning mechanism 188 may include a cylindrical body 208 having a knob 210 disposed at an axial end of the cylindrical body 208. As the knob 210 is tightened or loosened, a vertical position of an inner shaft 212 that extends through the cylindrical body 208 is adjusted, as illustrated by arrow 214. As such, a vertical position of a section 216 of the shaft 212, which has an outer diameter substantially larger than the normal outer diameter of the shaft 212, is also adjusted. A biasing member 218, such as a spring, is disposed radially about the shaft 212 between the section 216 of the shaft 212 and the bracket section 206 of the housing 180 of the travel sensor assembly 30. Therefore, as the knob 210 is tightened, the shaft 212 moves toward the bracket section 206 of the housing 180 and counteracts the upward force of the biasing member 218, thereby urging the bracket section 206 and, indeed, the housing 180 downward (i.e., toward the workpiece 16). Accordingly, the detection wheel 182 is similarly urged toward the workpiece 16. In contrast, as the knob 210 is loosened, the shaft 212 moves away from the bracket section 206 of the housing 180 and lessens the counteracting forces acting against the upward force of the biasing member 218, thereby urging the bracket section 206 and, indeed, the housing 180 to release upward (i.e., away from the workpiece 16). Accordingly, the detection wheel 182 is similarly urged away from the workpiece 16. The spring-loaded nature of the biasing member 218 is such that, regardless of the vertical position of the detection wheel 182 selected using the tensioning mechanism 188 of the travel sensor assembly 30, there exists a certain amount of "give" between the detection wheel 182 and the workpiece 16 such that undesirable jostling, vibrations, and so forth, may be sustained while maintaining normal operations.

Figure 22:
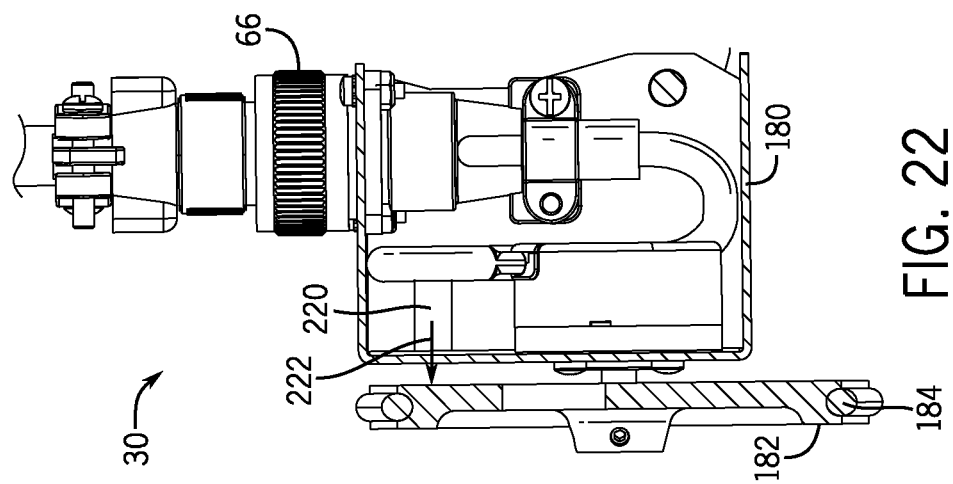
FIG. 22 is a partial cutaway side view of the travel sensor assembly including an optical sensor in accordance with embodiments of the present disclosure.

Any type of sensor may be used in the travel sensor assembly 30 to detect the position, movement, or direction of movement of the detection wheel 182 and the housing 180 of the travel sensor assembly 30, as well as the induction heating head assembly 14 as a whole, with respect to the workpiece 16. For example, as illustrated in FIG. 22, in certain embodiments, the travel sensor assembly 30 may include an optical sensor 220, such as an IR sensor, configured to detect the position, movement, or direction of movement of the detection wheel 182 and the housing 180 of the travel sensor assembly 30 by detecting light, converting the detected light into signals, and analyzing the signals. For example, in certain embodiments, the optical sensor 220 may be optically directed, as illustrated by arrow 222, from the housing 180 of the travel sensor assembly 30 toward an area on the detection wheel 182 through which the openings 186 (see FIG. 19, for example) pass as the detection wheel 182 rotates with respect to the housing 180. Accordingly, the light detected by the optical sensor 220 will change (e.g., pulse) as the detection wheel 182 rotates. The signals relating to these changes in detected light may be analyzed to determine rotational speed of the detection wheel 182 and, therefore, speed of the induction heating head assembly 14 with respect to the workpiece 16, and so forth. Other types of optical detection may be utilized by the travel sensor assembly 30. For example, in certain embodiments, the optical sensor 220 may be optically directed at the workpiece 16 such that light reflecting from the surface of the workpiece 16 is used to detection movement of the workpiece 16 relative to the optical sensor 220 (e.g., similar to a computer mouse) and, thus, the travel sensor assembly 30.

Figure 23:
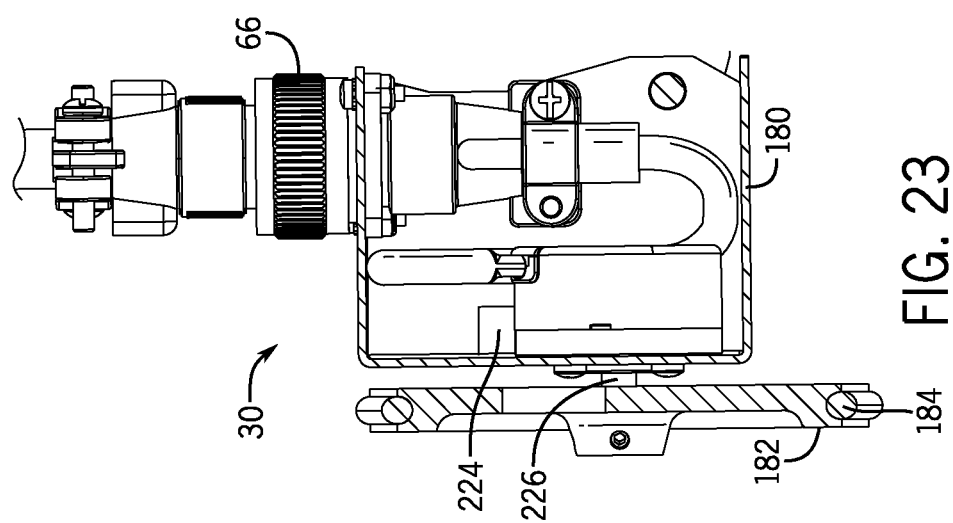
FIG. 23 is a partial cutaway side view of the travel sensor assembly including a tachometer in accordance with embodiments of the present disclosure.

In other embodiments, as illustrated in FIG. 23, the travel sensor assembly 30 may include a tachometer 224 disposed in the housing 180 of the travel sensor assembly 30. The tachometer 224 may be disposed proximate to a shaft 226 that is coupled to the detection wheel 182 and, as the detection wheel 182 rotates, the tachometer 224 may determine the rotational speed of the shaft 226 and, hence, the rotational speed of the detection wheel 182. The signals relating to this rotational speed may be analyzed to determine the speed and direction of the induction heating head assembly 14 relative to the workpiece 16, and so forth.

Figure 24:
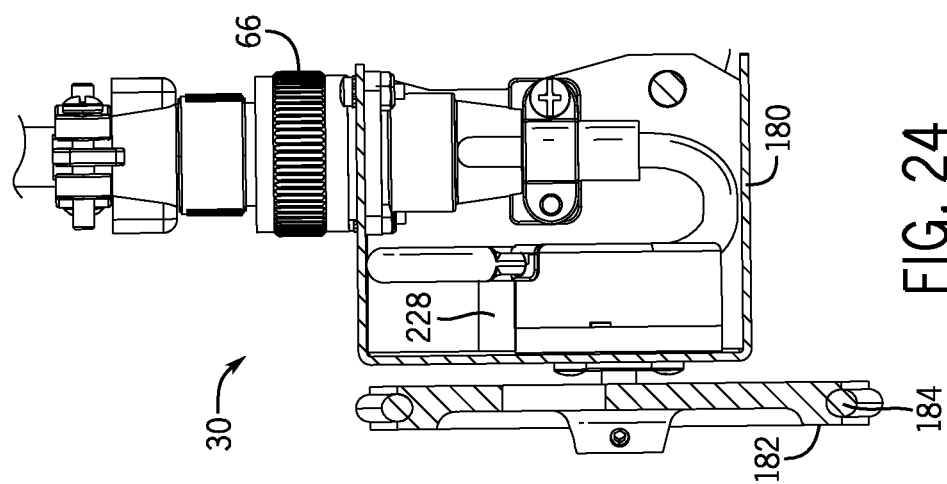
FIG. 24 is a partial cutaway side view of the travel sensor assembly including an accelerometer in accordance with embodiments of the present disclosure.

In still other embodiments, as illustrated in FIG. 24, the travel sensor assembly 30 may include an accelerometer 228 disposed in the housing 180 of the travel sensor assembly 30. The accelerometer 228 may detect the acceleration of the housing 180 with respect to multiple axes and, therefore, the acceleration of the induction heating head assembly 14 with respect to multiple axes. In certain embodiments, the accelerometer 228 may be used in conjunction with a gyroscope. The signals relating to these accelerations and/or gyroscopic information may be analyzed to determine the position and/or movement (including direction of movement) of the housing 180 of the travel sensor assembly 30 relative to the workpiece 16 in three dimensions and, therefore, the position and/or movement (including direction of movement) of the induction heating head assembly 14 relative to the workpiece 16 in three dimensions.

These exemplary types of sensors 220, 224, 228 used by the travel sensor assembly 30 are merely exemplary and not intended to be limiting. Any other sensor capable of detecting position and/or movement (including direction of movement) of the induction heating head assembly 14 may be used. Moreover, the feedback signals sent by the travel sensor assembly 30 to the power source 12 relating to position and/or movement (including direction of movement) of the induction heating head assembly 14 may be determined by the travel sensor assembly 30 based on signals generated by more than one type of sensor of the travel sensor assembly 30. For example, in certain embodiments, the travel sensor assembly 30 may include both an optical sensor 220 and an accelerometer 228, and the analysis may be based on both the signals generated by the optical sensor 220 and the signals generated by the accelerometer 228.

Figure 25:
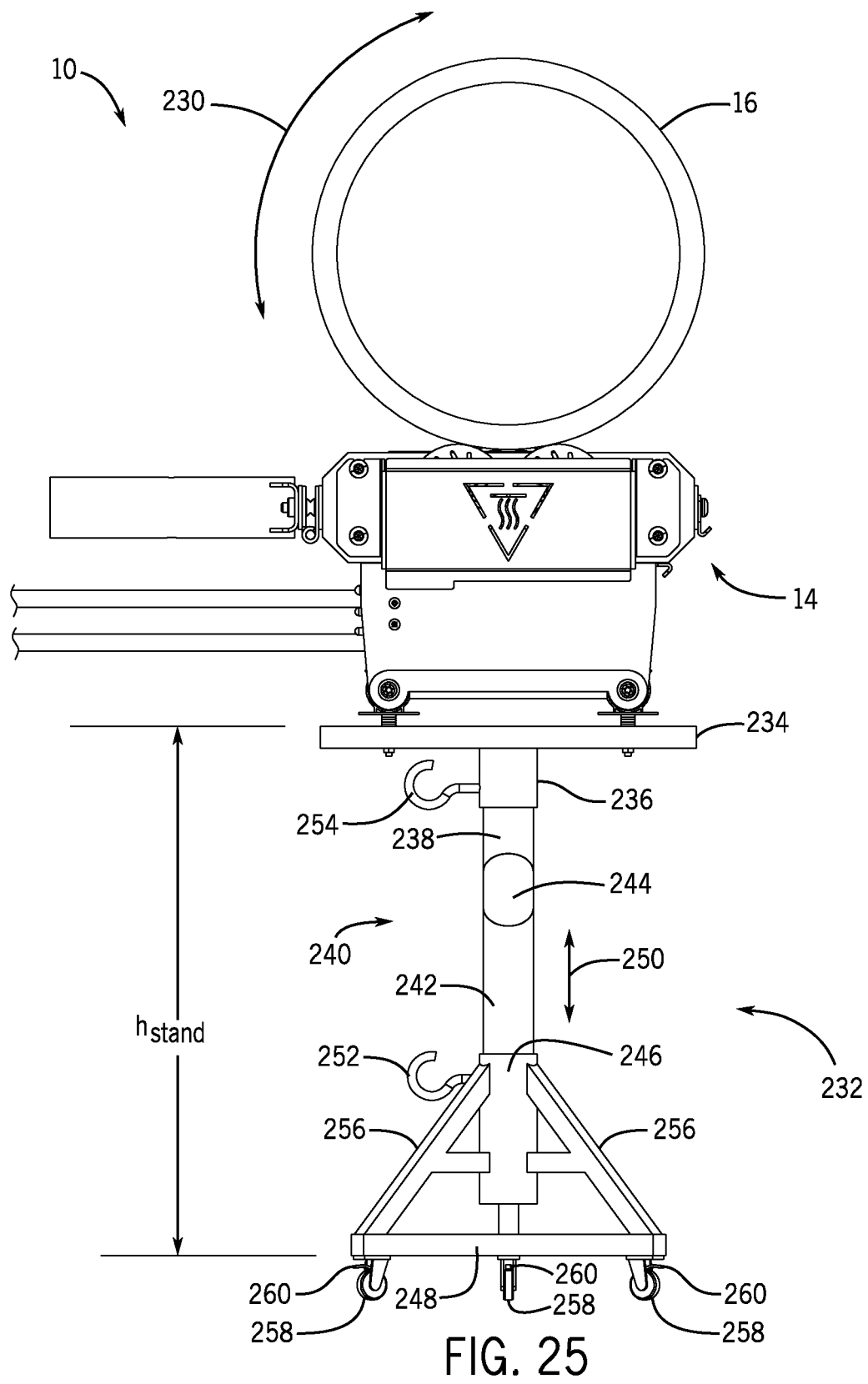
FIG. 25 is a side view of an inductor stand configured to hold the induction heating head assembly in a relatively fixed position in accordance with embodiments of the present disclosure.

As described herein, in certain embodiments, the induction heating head assembly 14 may be held in place (e.g., with respect to a support surface, such as the ground or floor) while the workpiece 16 is moved relative to the induction heating head assembly 14. For example, as illustrated in FIG. 25, in embodiments where the workpiece 16 is pipe, the induction heating head assembly 14 may be held in place while the pipe is rotated while holding the outer circumference of the pipe proximate the induction heating head assembly 14, as illustrated by arrow 230. As also illustrated in FIG. 25, to facilitate holding the induction heating head assembly 14 in a relatively fixed position with respect to a support structure, an inductor stand 232 (i.e., inductor support assembly) may be used. In certain embodiments, the inductor stand 232 may include a main inductor interface body 234, which may include an enclosure configured to attach to (e.g., be securely fixed to) the induction heating head assembly 14.

In certain embodiments, the main inductor interface body 234 includes a generally cylindrical neck section 236 that has an inner diameter that is slightly larger than an outer diameter of a first tube section 238 of an adjustable positioning assembly 240, such as the adjustable tube assembly illustrated in FIG. 25, such that the neck section 236 may mate with, and be fastened to, an axial end of the first tube section 238. In other words, the axial end of the first tube section 238 may be removeably inserted into and securely fixed to the neck section 236 of the main inductor interface body 234. As illustrated, in certain embodiments, the adjustable tube assembly 240 may include the first tube section 238 (i.e., a first support member), a second tube section 242 (i.e., a second support member), and a joint 244 between the first and second tube sections 238, 242 that enables angular adjustment with respect to the first and second tube sections 238, 242. For example, although illustrated in FIG. 25 as being disposed generally concentrically with each other, the joint 244 may enable one or both of the first and second tube sections 238, 242 to pivot with respect to a central axis of the joint 244, thereby adjusting an angle between axes of the first and second tube sections 238, 242.

As illustrated in FIG. 25, in certain embodiments, the second tube section 242 of the adjustable tube 240 may fit into a generally cylindrical base tube 246 of an inductor stand base 248, which functions as a relatively fixed support structure. The outer diameter of the second tube section 242 may be slightly smaller than an inner diameter of the generally cylindrical base tube 246, facilitating the second tube section 242 mating with, and fastening to, the base tube 246. In other words, the second tube section 242 may be removeably inserted into and securely fixed to the base tube 246. As will be appreciated, a height $h_{stand}$ between the main inductor interface body 234 and the inductor stand base 248 may be adjusted, as illustrated by arrow 250, by varying the extent to which the second tube section 242 is inserted into the base tube 246. Once a desired height $h_{stand}$ between the main inductor interface body 234 and the inductor stand base 248 is achieved, a fastening mechanism 252, such as the knob illustrated in FIG. 25 may be used to fasten the second tube section 242 to the base tube 246. It will be appreciated that a similar fastening mechanism 254 may be used to fasten the first tube section 238 to the neck section 236 of the main inductor interface body 234.

In certain embodiments, one or more support legs 256 may be used to provide additional stability to the inductor stand 232. Also, in certain embodiments, three or more casters 258 may be attached to the inductor stand base 248 to enable the inductor stand 232 to be moveable from location to location. Because it is desirable to maintain the induction heating head assembly 14 in a relatively fixed position, one or more of the casters 258 may include a floor lock 260 to enable the respective caster 258 to be locked into place once the inductor stand 232 has been moved to a desirable location.

Figure 26:
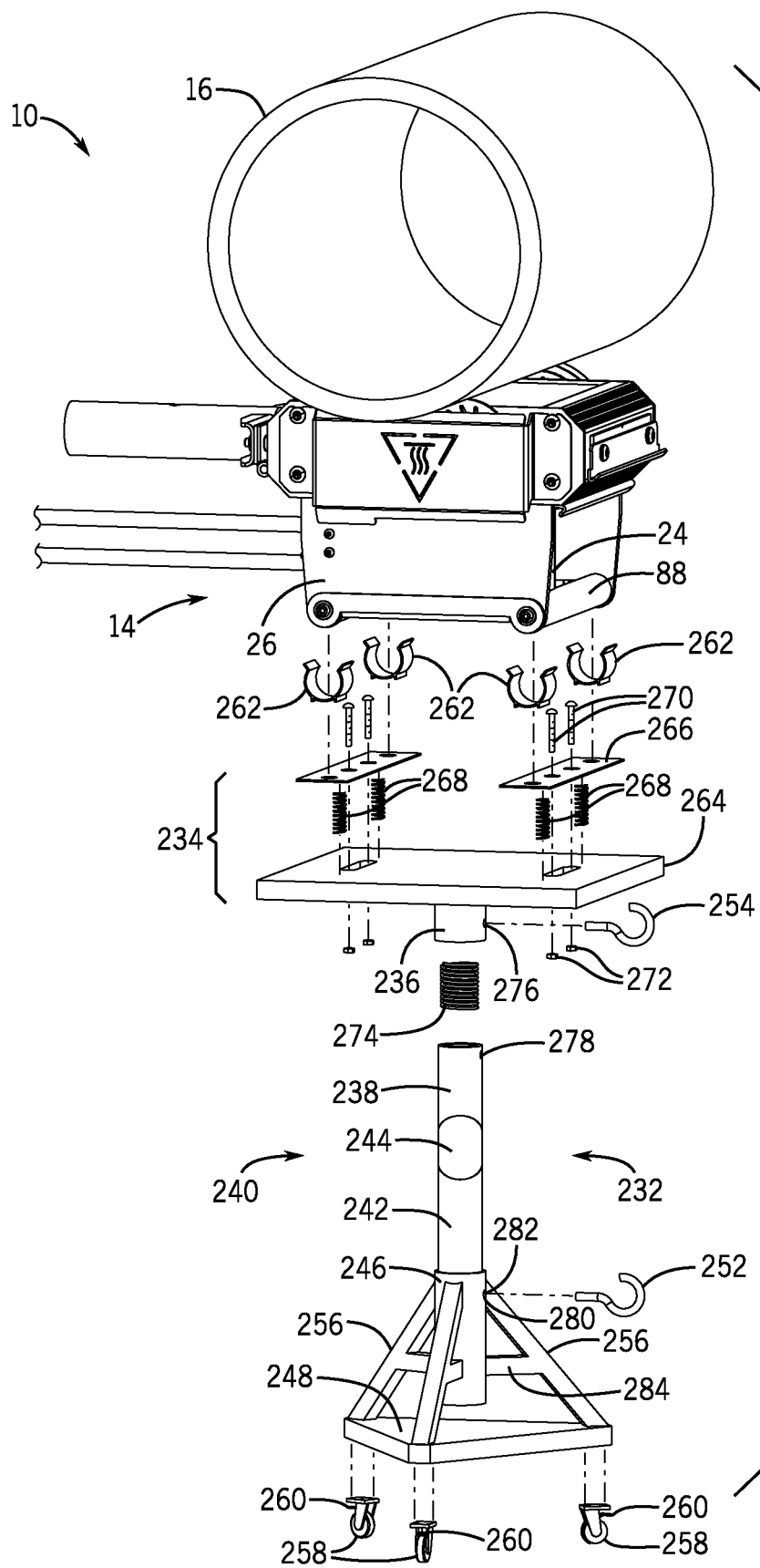
FIG. 26 is an exploded perspective view of the inductor stand of FIG. 25.

FIG. 26 is an exploded perspective view of an embodiment of the inductor stand 232 of FIG. 25. In certain embodiments, the main inductor interface body 234 of the inductor stand 232 may include coupling mechanisms 262, such as the snap-in mounts illustrated in FIG. 26, which are configured to couple the main inductor interface body 234 to the induction heating head assembly 14. More specifically, in the embodiment illustrated in FIG. 26, the snap-in mounts 262 are configured to couple with the crossbars 88 to attach the induction heating head assembly 14 to the main inductor interface body 234. In such an embodiment, the snap-in mounts 262 may include c-shaped bodies comprised of a material flexible enough to snap around the crossbars 88 yet rigid enough to hold the induction heating head assembly 14 fixed with respect to the main inductor interface body 234 once snapped around the crossbars 88. In certain embodiments, the main inductor interface body 234 may include four snap-in mounts 262 (e.g., two for attaching to each of the two crossbars 88 of the induction heating head assembly 14), however, any number of snap-in mounts 262, or other type of coupling mechanism, may be used. For example, in certain embodiments, the coupling mechanisms 262 may include clips, clamps, brackets that attach with or without tools, and so forth.

As illustrated in FIG. 26, in certain embodiments, the main inductor interface body 234 may include a generally rectangular base plate 264 attached to the neck section 236. One or more adjustable coupling strips 266 may be selectively attached to the base plate 264 depending on the number and orientation of the fastening mechanisms 262 that are desired for the particular induction heating head assembly 14. As illustrated, each of the coupling mechanisms 262 may be attached to one of the coupling strips 266. In certain embodiments, the coupling mechanisms 262 may be fixedly attached to the coupling strips 266, while in other embodiments, the coupling mechanisms 262 may be adjustably detachable from the coupling strips 266, enabling a greater degree of customization. In certain embodiments, springs 268 (i.e., biasing mechanisms) may be disposed between the base plate 264 and the coupling strips 266, thereby providing a certain degree of mobility (e.g., slight movement) between the base plate 264 and the coupling strips 266. In certain embodiments, the coupling strips 266 may be coupled to the base plate 264 using bolts 270 and associated nuts 272, or some other fastening mechanism.

As illustrated in FIG. 26, a spring 274 (i.e., biasing mechanism) may be disposed between the neck section 236 of the main inductor interface body 234 and the first tube section 238 of the adjustable tube assembly 240 to facilitate tensioning between the neck section 236 and the first tube section 238. As also illustrated, in certain embodiments, the fastening mechanism 254 may be fit through an opening 276 through the neck section 236 of the main inductor interface body 234 and into a screw hole 278 in the first tube section 238 of the adjustable tube assembly 240 to hold the first tube section 238 in a fixed position relative to the neck section 236. Similarly, in certain embodiments, the fastening mechanism 252 may be fit through an opening 280 through the base tube 246 and into a screw hole 282 in the second tube section 242 of the adjustable tube assembly 240 to hold the second tube section 242 in a fixed position relative to the base tube 246. As also illustrated, in certain embodiments, a crossbar 284 may be associated with one or more support leg 256 to provide even further stability to the support leg 256 with respect to the inductor stand base 248 and the base tube 246.

Figure 27:
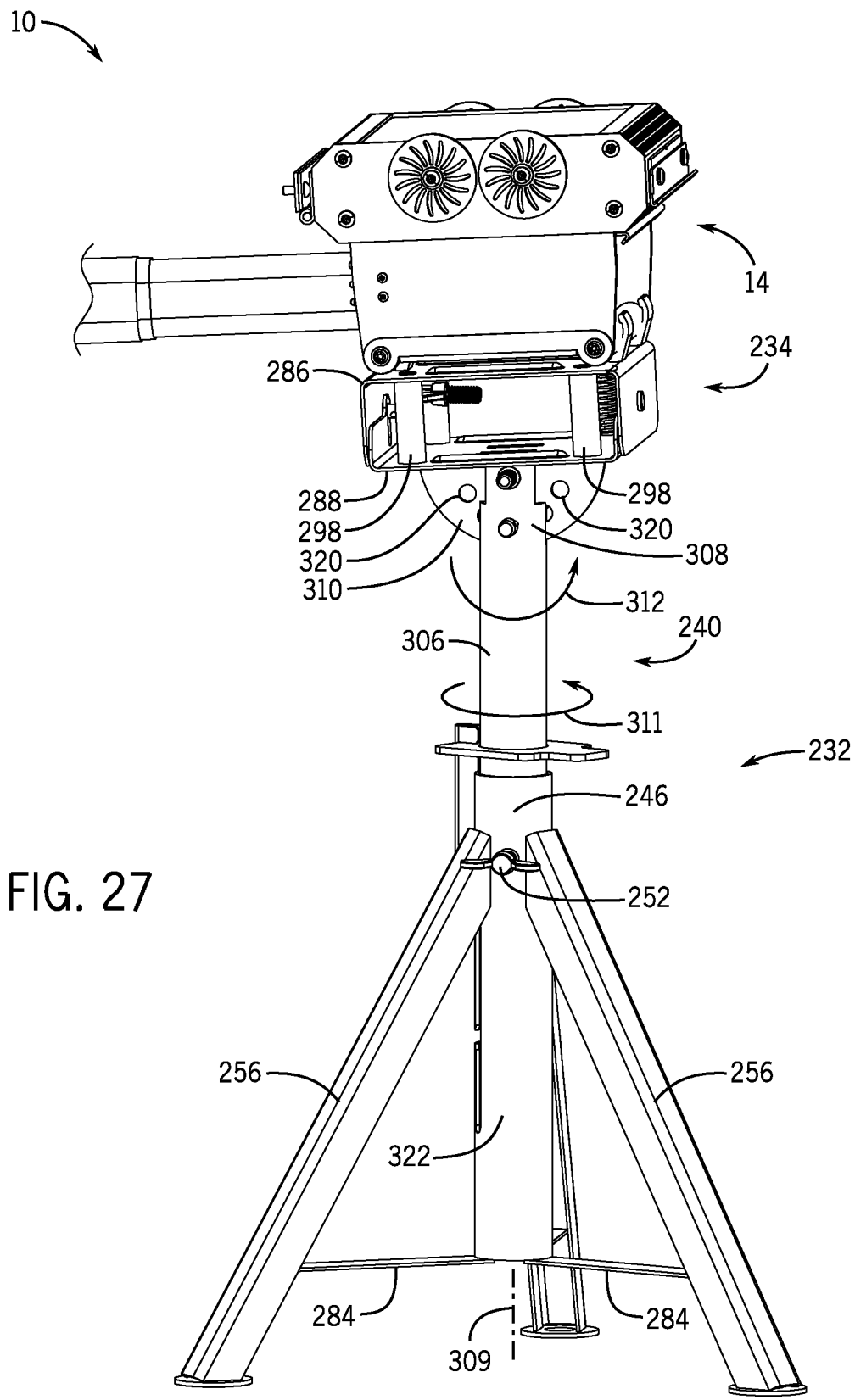
FIG. 27 is a side view of another inductor stand configured to hold the induction heating head assembly in a relatively fixed position in accordance with embodiments of the present disclosure.
Figure 28:
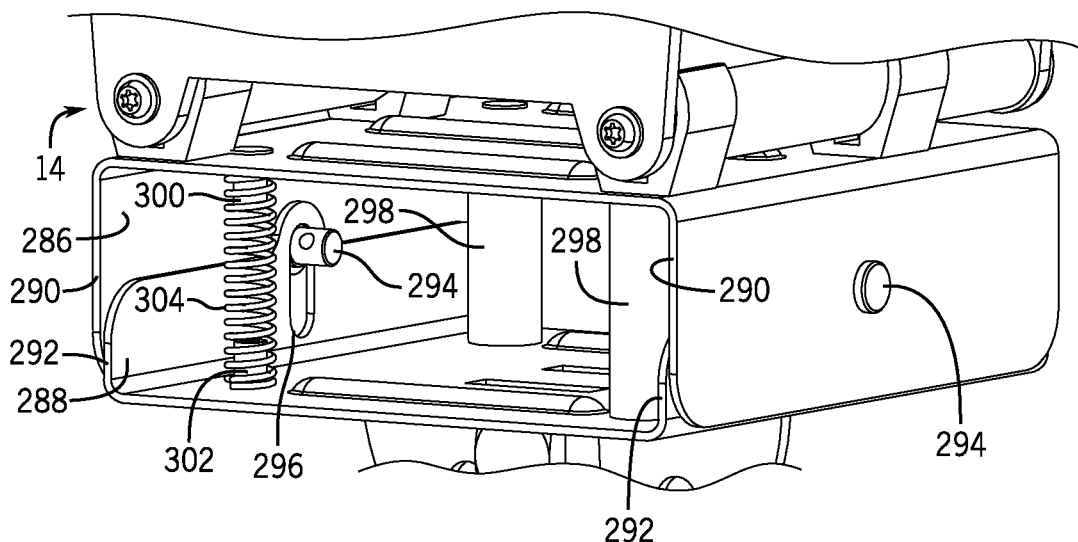
FIG. 28 is a partial perspective view of a main inductor interface body of the inductor stand of FIG. 27.

FIG. 27 is a perspective view of another embodiment of the inductor stand 232 that may be used to hold the induction heating head assembly 14 in a relatively fixed position. In the illustrated embodiment, the main inductor interface body 234 includes a top section 286 and a bottom section 288 that are configured to interface with each other and enable slight movement between the top section 286 and a bottom section 288 to mitigate adverse effects of vibrations, jostling, etc. More specifically, as illustrated in FIG. 28, in certain embodiments, the top and bottom sections 286, 288 of the main inductor interface body 234 may include respective side walls 290, 292 that are configured to slide slightly relative to each other. For example, in certain embodiments, alignment pins 294 may remain relatively fixed with respect to (and, indeed, may be attached to) one of the side walls 290, 292 (e.g., the side walls 290 of the top section 286 in the illustrated embodiment) while being able to slide relative to alignment slots 296 through the other of the adjacent side walls 290, 292 (e.g., through the side walls 292 of the bottom section 288 in the illustrated embodiment). Although illustrated as only having opposing side walls 290, 292, it will be appreciated that in other embodiments, the side walls 290, 292 may extend entirely around the main inductor interface body 234 (e.g., entirely isolating the internal components of the main inductor interface body 234 from the surrounding environment).

As illustrated in FIGS. 27 and 28, in certain embodiments, one or more sleeves 298 may be disposed between the top and bottom sections 286, 288 of the main inductor interface body 234. Although illustrated as including four sleeves 298 (e.g., near each of the four corners of the rectangular-shaped main inductor interface body 234), in other embodiments, any number of sleeves 298 may be used. For illustration purposes, one of the sleeves 298 has been removed to show how the sleeves 298 interact with the top and bottom sections 286, 288 of the main inductor interface body 234. In particular, as illustrated in FIG. 28, in certain embodiments, each of the sleeves 298 may interact with respective alignment pegs 300, 302 of the top and bottom sections 286, 288 of the main inductor interface body 234 to maintain alignment of the sleeves 298 between the top and bottom sections 286, 288. More specifically, in certain embodiments, the sleeves 298 may include hollow interiors such that walls of the sleeves 298 fit around the alignment pegs 300, 302. In addition, in certain embodiments, one or more of the sleeves 298 may include a spring 304 (i.e., biasing mechanism) disposed within the walls of the sleeves 298. In certain embodiments, the springs 304 may be slightly longer axially than the sleeves 298 such that the springs 304 may directly interact with the top and bottom sections 286, 288 of the main inductor interface body 234 to enable a certain degree of motion relative to the top and bottom sections 286, 288, thus accommodating for physical irregularities in the workpiece 16 as the induction heating head assembly 14 traverses the workpiece 16. It will be appreciated that the springs 304 also bias the induction heating head assembly 14 toward the workpiece 16. In certain embodiments, instead of springs 304, other types of biasing mechanisms may be used, such as counterweights, etc.

Returning now to FIG. 27, in certain embodiments, the adjustable tube assembly 240 may function slightly differently than the adjustable tube assembly 240 of the embodiment illustrated in FIGS. 25 and 26. More specifically, in certain embodiments, the adjustable tube assembly 240 may include a tube section 306 (i.e., support member) that is configured to fit into the base tube 246 of the inductor stand 232 (e.g., similar to the second tube section 242 of the adjustable tube assembly 240 of FIGS. 25 and 26) and that has an opposite axial end 308 that is configured to interact with (e.g., selectively engage) an angular alignment plate 310 that is attached to the bottom section 288 of the main inductor interface body 234 to facilitate angular re-positioning of the main inductor interface body 234 (and, thus, the induction heating head assembly 14) with respect to the inductor stand 232, as illustrated by arrow 312. In certain embodiments, the tube section 306 is configured to rotate about an axis 309 of the tube section 306 and the base tube 246, as illustrated by arrow 311. In particular, a slot and one or more mating grooves on an exterior surface of the tube section 306 and an interior surface of the base tube 246, respectively, may enable the tube section 306 to be selectively rotated between a plurality of fixed positions with respect to the base tube 246 to facilitate further customization of the positioning of the induction heating head assembly 14 with respect to the base tube 246. Alternatively, a groove and one or more mating slots on an exterior surface of the tube section 306 and an interior surface of the base tube 246, respectively, may be used to selectively position the tube section 306 with respect to the base tube 246.

Figure 29:
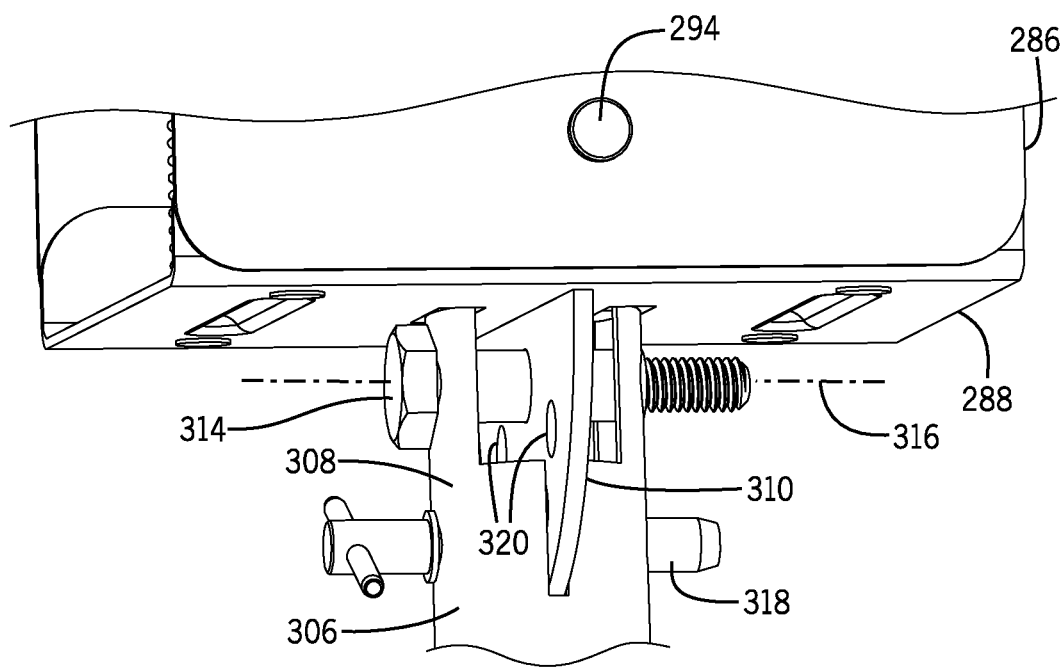
FIG. 29 is a partial cutaway perspective view of an angular alignment plate of the main inductor interface body and an adjustable tube assembly of the inductor stand of FIG. 27.

FIG. 29 is a partial cutaway perspective view illustrating how the axial end 308 of the tube section 306 of the adjustable tube assembly 240 interacts with the angular alignment plate 310 of the main inductor interface body 234. It will be appreciated that part of the exterior surface of the axial end 308 of the tube section 306 has been removed for illustration purposes. As illustrated, in certain embodiments, a first (e.g., fixed alignment) pin 314 may extend through both the axial end 308 of the tube section 306 and the angular alignment plate 310 of the main inductor interface body 234 to hold the tube section 306 and the angular alignment plate 310 relatively fixed with respect to each other along an axis 316 of the alignment pin 314. However, a second (e.g., adjustable alignment) pin 318 may enable adjustment of an angular orientation of the angular alignment plate 310 (and, thus, the main inductor interface body 234 and the induction heating head assembly 14) with respect to the tube section 306 (and, thus, the inductor stand 232). In particular, in certain embodiments, the semi-circular angular alignment plate 310 may include a plurality of openings 320 through which the adjustable alignment pin 318 may be selectively inserted to adjust the angular orientation of the angular alignment plate 310 with respect to the tube section 306. As such, the openings 320 function as a first alignment feature and the adjustable alignment pin functions as a second alignment feature. In other embodiments, other types of alignment features may be used, such as slots, friction plates, and so forth.

Returning now to FIG. 27, as illustrated, in certain embodiments, the inductor stand 232 may not include an inductor stand base 248 such as the embodiment illustrated in FIGS. 25 and 26. Rather, in certain embodiments, the base tube 246 may include an elongated body 322 that is attached to the plurality of support legs 256 with a plurality of respective crossbars 284 that provide additional support between the base tube 246 and the support legs 256. Although illustrated in FIG. 27 as not including casters 258 and floor locks 260 associated with the support legs 256, it will be appreciated that in certain embodiments, the support legs 256 may indeed be associated with respective casters 258 and, in certain embodiments, floor locks 260. Furthermore, in certain embodiments, the adjustable tube assembly 240 may not be attached to an inductor stand base, as illustrated in FIGS. 25-27. Rather, in certain embodiments, the adjustable tube assembly 240 may instead be attached to an alternate support structure, such as an arm or beam that remains in a relatively fixed position. Furthermore, in certain embodiments, the adjustable tube assembly 240 may be attached to a relatively fixed support structure, such as a gantry system, that is capable of movement, but that is configured to hold the adjustable tube assembly 240 in a fixed position when desired.

It should be noted that, although described herein as enabling adjustment of both a height of the main inductor interface body 234 (and, thus, the induction heating head assembly 14) from a relatively fixed support structure, such as the inductor stand base, as well as an angular orientation of the main inductor interface body 234 (and, thus, the induction heating head assembly 14) with respect to the relatively fixed support structure, in other embodiments, only the height of the main inductor interface body 234 from the relatively fixed support structure or the angular orientation of the main inductor interface body 234 with respect to the relatively fixed support structure may be adjustable. For example, in certain embodiments, the inductor stand 232 may not include either of the common joint 244 between the first and second tube sections 238, 242 (see, e.g., FIG. 26) or the angular alignment plate 310 (see, e.g., FIG. 27) and, thus, may not be configured to adjust the angular orientation of the main inductor interface body 234 with respect to the relatively fixed support structure. Furthermore, in other embodiments, the tube sections 238, 242, 306 (see, e.g., FIGS. 26 and 27) of the adjustable tube assembly 240 may not be configured to translate into and out of the base tube 246 and, thus, may not be configured to adjust the height of the main inductor interface body 234 from the relatively fixed support structure. In still other embodiments, neither the height of the main inductor interface body 234 from the relatively fixed support structure nor the angular orientation of the main inductor interface body 234 with respect to the relatively fixed support structure may be adjustable. It will be understand that, even in such embodiments, the biasing members (e.g., elements 304 illustrated in FIG. 28) and other components of the inductor stand 232 may enable slight movement of the main inductor interface body 234 with respect to the inductor stand 232. As such, physical irregularities in the workpiece 16 may be accommodated more easily due to these components. Furthermore, these components enable the main inductor interface body 234 (and, thus, the induction heating head assembly 14) to be biased against the workpiece 16.

Figure 30:
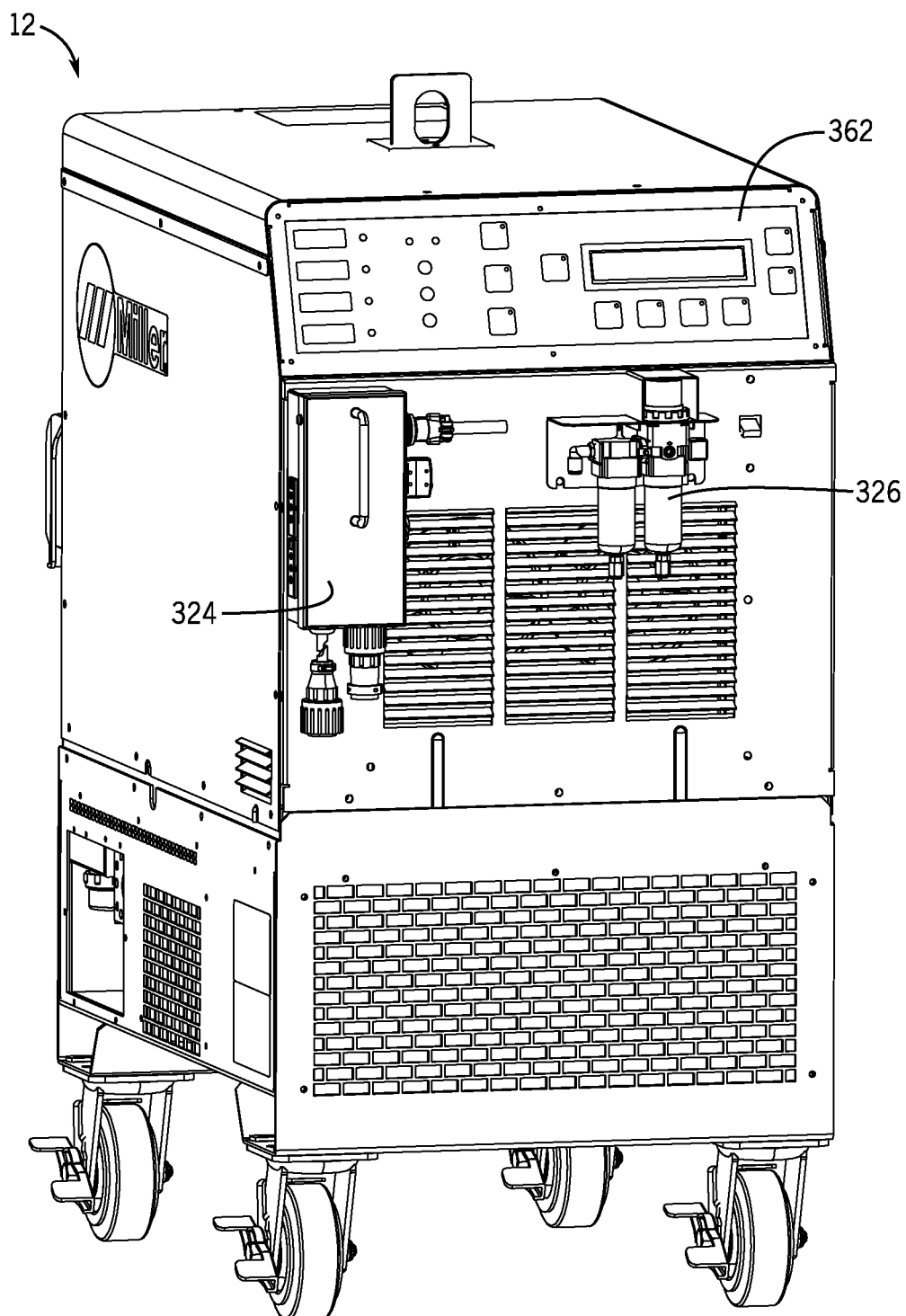
FIG. 30 is a perspective view of the power source including a removable connection box and a removable air filter assembly in accordance with embodiments of the present disclosure.

FIG. 30 is a perspective view of an exemplary embodiment of the power source 12 that is configured to operate with the induction heating head assembly 14, the temperature sensor assembly or assemblies 28, and/or the travel sensor assembly 30 as described herein. As illustrated, in certain embodiments, a removable connection box 324 and/or a removable air filter assembly 326 may be removably coupled (e.g., in separate housings) to the power source 12 to enable the connections that facilitate the power source 12 operating with the induction heating head assembly 14, the temperature sensor assembly or assemblies 28, and/or the travel sensor assembly 30.

FIGS. 31 and 32 are zoomed in perspective views of the connection box 324 and the air filter assembly 326 of FIG. 30. As illustrated in FIG. 31, in certain embodiments, the connection box 324 includes a travel sensor connection 328 that may receive (e.g., travel feedback) signals from the travel sensor assembly 30 (e.g., via the cable 20 illustrated in FIG. 1). In certain embodiments, the connection box 324 also includes an output connection 330 that may transmit signals from the connection box 324 to other connectors on the power source 12 or to a system (e.g., a robotic positioning system for controlling movement of the induction heating head assembly 14 or controlling movement of the workpiece 16 relative to the induction heating head assembly 14, an external processing device, and so forth) separate from the power source 12. In addition, in certain embodiments, the connection box 324 includes first and second auxiliary electrical lead connection blocks 332, 334 for connecting to auxiliary electrical leads, for example, thermocouple leads and other sensor leads. In addition, in certain embodiments, the connection box 324 may include some or all of the control circuitry described as being part of the power source with respect to FIG. 2. For example, in certain embodiments, the connection box 324 may include the controller circuitry 50, which controls the power conversion circuitry 46, 48, 52, among other things, to adjust the induction heating power output 54 provided by the power source 12.

Furthermore, as illustrated in FIG. 32, in certain embodiments, the connection box 324 includes first and second temperature sensor connections 336, 338 that may receive (e.g., temperature feedback) signals from first and second temperature sensor assemblies 28 (e.g., via the cable 18 illustrated in FIG. 1 and similar cables). In certain embodiments, more than two temperature sensor connections 336, 338 may be used. As illustrated, only one cable 18 connecting a temperature sensor assembly 28 is connected to the connection box 324 via the first temperature sensor connection 336; however, a second temperature sensor assembly 28 may also be connected via the second temperature sensor connection 338. In addition, in certain embodiments, the connection box 324 may include first and second temperature lead connection blocks 340, 342 for connecting to electrical leads, for example, thermocouple leads conveying signals related to temperatures internal to one or more induction heating head assemblies 14. As illustrated, only one temperature lead connection block 340 is being utilized; however, the second temperature lead connection block 342 may also be utilized to receive temperature signals from a second induction heating head assembly 14.

As illustrated in FIGS. 31 and 32, in certain embodiments, the air filter assembly 326 includes an oil separator 344 and/or a water separator 346 for removing oil and/or water from shop air that is received by the power source 12 via a separate connection (not shown). The oil and water may be discharged via an oil outlet 348 and a water outlet 350, respectively. In certain embodiments, the air filter assembly 326 also includes an air regulator for regulating the flow of air through the air filter assembly 326. The processed air (e.g., after removal of the oil and/or water) is delivered to the temperature sensor assembly 28 (e.g., via an air cable to the air cable connector 70 of the temperature sensor assembly 28) through an air outlet 352. In instances where more than one temperature sensor assembly 28 is used, a splitter (not shown) may be used to split the flow of processed air for delivery to the multiple temperature sensor assemblies 28.

Figures 33A, 34:
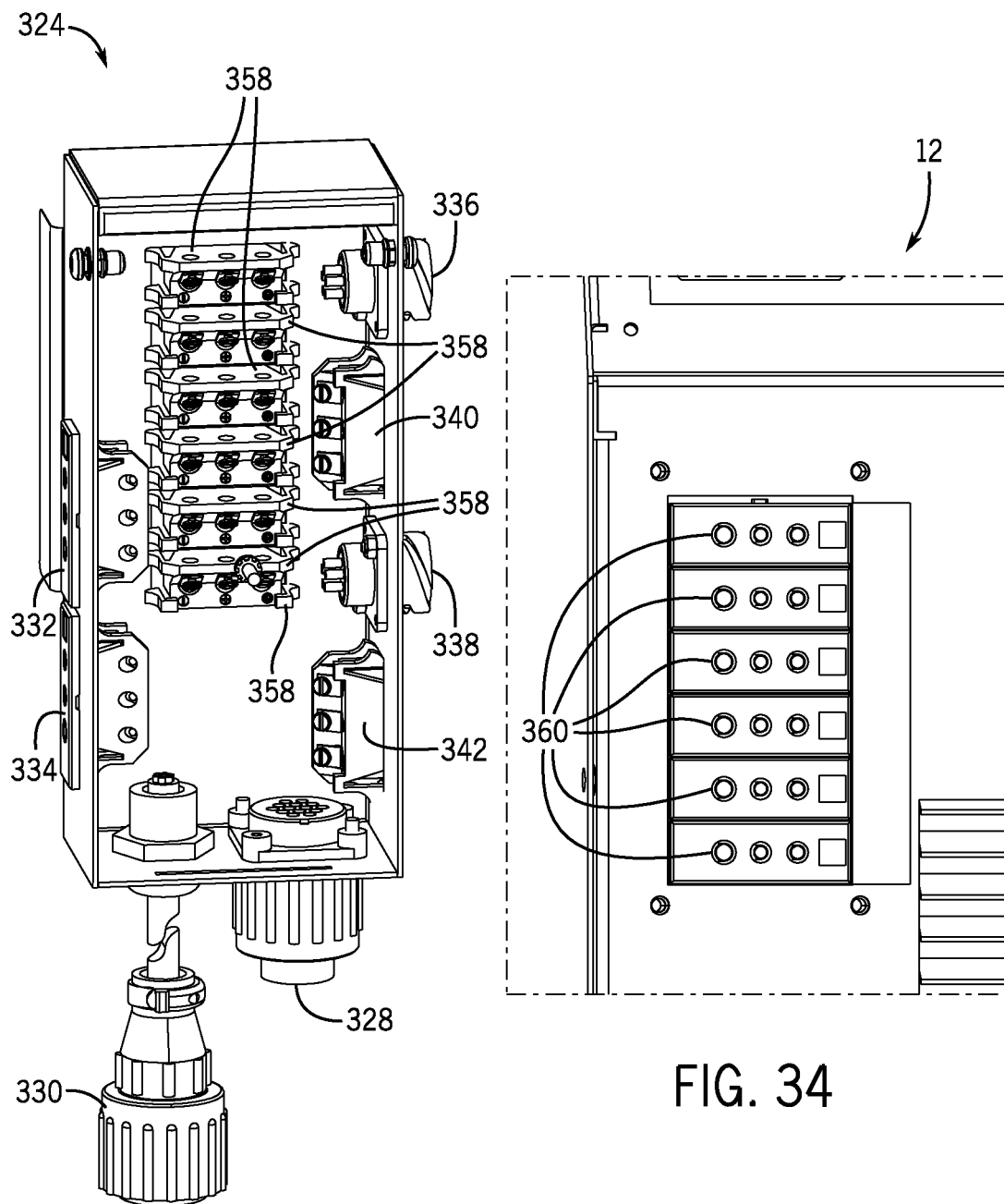
FIG. 33A is a perspective view of the removable connection box with an access door of the connection box removed for illustration purposes in accordance with embodiments of the present disclosure.
FIG. 34 is a partial perspective view of the power source of FIG. 30, illustrating connection blocks to which the removable connection box may be communicatively coupled.
Figure 33B:
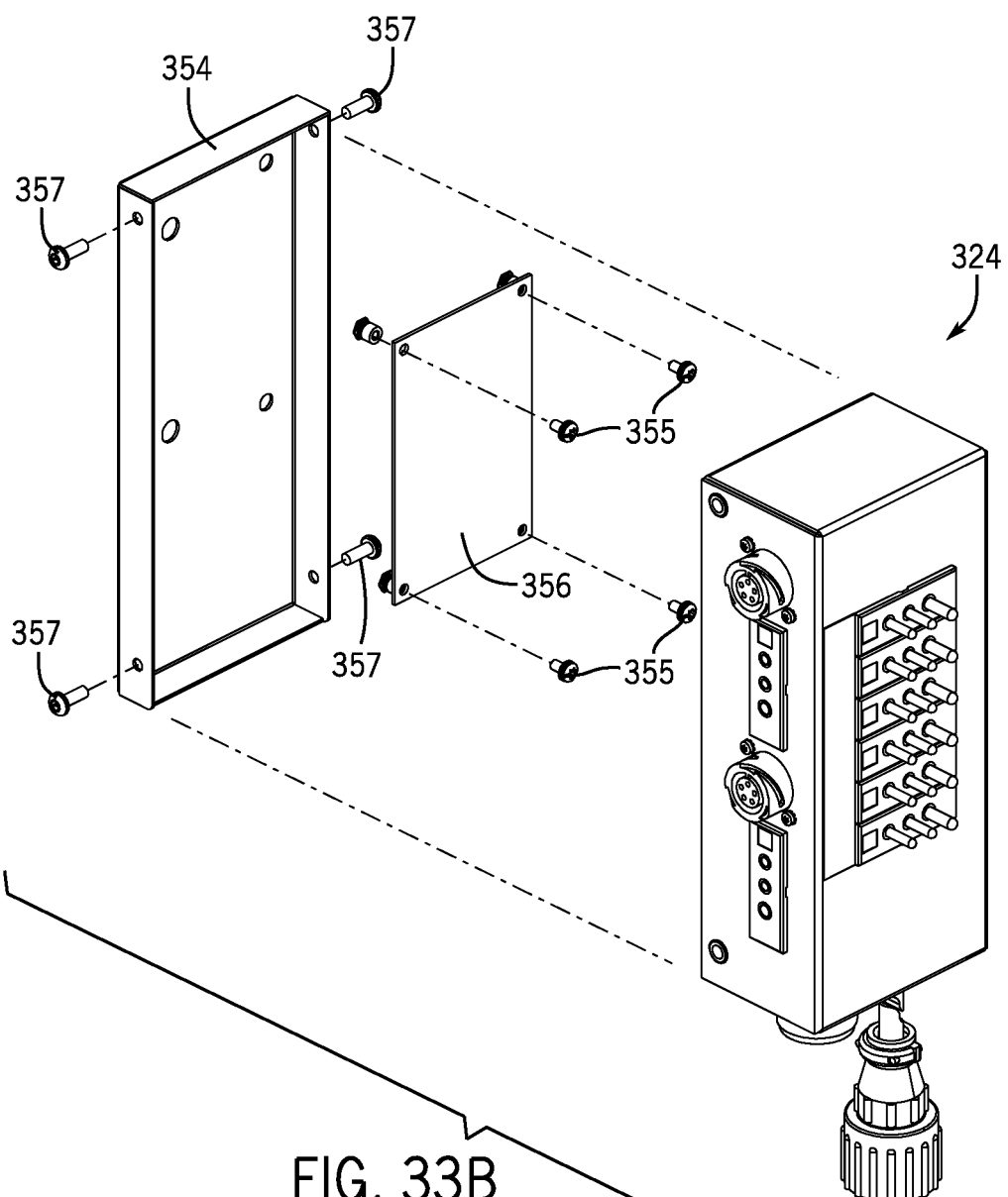
FIG. 33B is an exploded perspective view of the connection box in accordance with embodiments of the present disclosure.

FIG. 33A is a perspective view of the connection box 324 with an access door 354 of the connection box 324 removed for illustration purposes. In addition, FIG. 33B is an exploded perspective view of the connection box 324, which illustrates how a circuit board 356 is mounted inside the access door 354 (e.g., attached to the access door 354 via a plurality of fastening mechanisms 355, such as screws, in certain embodiments). As illustrated, in certain embodiments, a plurality of fastening mechanisms 357, such as screws, may also be used to fasten the access door 354 to the connection box 324 (e.g., instead of, or in addition to, including an access door 354 that may be opened via hinges, and so forth). The circuit board 356 includes circuitry configured to receive input signals from the travel sensor connection 328, the first and second auxiliary electrical lead connection blocks 332, 334, the first and second temperature sensor connections 336, 338, and the first and second temperature lead connection blocks 340, 342, to perform certain signal processing on at least some of the input signals, and to transmit output signals via the output connection 330 and a plurality of connection blocks 358 on a back side (e.g., a side opposite the access door 354) of the connection box 324. It will be appreciated that the circuit board 356 is communicatively coupled (e.g., via wiring and/or other electrical connections) to the travel sensor connection 328, the first and second auxiliary electrical lead connection blocks 332, 334, the first and second temperature sensor connections 336, 338, the first and second temperature lead connection blocks 340, 342, the output connection 330, the plurality of connection blocks 358, and so forth.

The plurality of connection blocks 358 are configured to communicatively couple to a matching plurality of connection blocks 360 disposed on an exterior of the power source 12 (as illustrated in FIG. 34). It will be appreciated that the plurality of connection blocks 360 of the power source 12 are, in turn, communicatively coupled to the controller circuitry 50 (see FIG. 2) of the power source 12 to enable the controller circuitry 50 to adjust the output power 54 supplied to the induction heating head assembly 14 based on the signals received and processed by the connection box 324. In the illustrated embodiment, the connection box 324 includes six connection blocks 358 for connecting to six mating connection blocks 360 on the power source 12; however, different numbers of connection blocks 358, 360 may be utilized.

As illustrated, in certain embodiments, the first and second temperature sensor connections 336, 338 and the first and second temperature lead connection blocks 340, 342 are disposed on a first lateral side of a housing of the connection box 324, the first and second auxiliary electrical lead connection blocks 332, 334 are disposed on a second lateral side of the housing of the connection box 324 opposite the first lateral side, the travel sensor connection 328 and the output connection 330 are disposed on a third lateral side of the housing of the connection box 324, and the plurality of connection blocks 358 are disposed on a back side of the housing of the connection box 324. However, the locations of all of these connections 328, 330, 336, 338 and connection blocks 332, 334, 340, 342 may vary between embodiments.

In certain embodiments, the six connection blocks 358 are configured to output signals corresponding to the input signals received by the connection box 324 via the first and second auxiliary electrical lead connection blocks 332, 334, the first and second temperature sensor connections 336, 338, and the first and second temperature lead connection blocks 340, 342. In such an embodiment, the input signals received via the first and second auxiliary electrical lead connection blocks 332, 334 may simply be passed through by the circuitry 356 of the connection box 324 to two corresponding connection blocks 358. Similarly, the input signals received via the first and second temperature lead connection blocks 340, 342 may also be passed through by the circuitry 356 of the connection box 324 to two corresponding connection blocks 358. However, the circuitry 356 of the connection box 324 may perform certain processing of the input signals received from the first and second temperature sensor connections 336, 338 before transmitting the processed signals as output signals to the power source 12 via two corresponding connection blocks 358. Similarly, in certain embodiments, the circuitry 356 of the connection box 324 may perform certain processing of the input signals received from the travel sensor connection 328 before transmitting the processed signals as output signals via the output connection 330.

For example, in certain embodiments, the circuitry of the circuit board 356 may be configured to receive the input (e.g., temperature feedback) signals via the first and second temperature sensor connections 336, 338 and process these input signals to generate output signals that may be properly interpreted by the controller circuitry 50 (see FIG. 2) of the power source 12. For example, the power source 12 may expect to receive signals relating to temperature readings in a Type K thermocouple range (or other type of thermocouple range, such as Type T), which may be on the order of microvolts and microamps, whereas the temperature sensor assemblies 28 transmit signals on the order of 4-20 milliamps, for example. As such, the circuitry of the circuit board 356 may scale the input signals received via the first and second temperature sensor connections 336, 338 from the 4-20 milliamp scale to a lower amperage or voltage range that may properly be interpreted by the controller circuitry 50 of the power source 12. In addition, in certain embodiments, the circuitry of the circuit board 356 may add an offset to the input signals received via the first and second temperature sensor connections 336, 338 to compensate for an offset that is implemented by the controller circuitry 50 of the power source 12. In certain embodiments, the internal temperature of the connection box 324 may be detected (e.g., using a temperature sensor connected to the connection box 324 via the auxiliary electrical lead connection blocks 332, 334 in certain embodiments) and used in the determination of an appropriate offset. In other embodiments, the temperature may be measured using a chip on the circuit board 356, and an appropriate offset may be determined based on this measured temperature. Therefore, the circuitry of the circuit board 356 converts the input (e.g., temperature feedback) signals received via the first and second temperature sensor connections 336, 338 to appropriate output signals for use by the controller circuitry 50 of the power source 12 (e.g., to mimic a thermocouple). In addition, in certain embodiments, the circuit board 356 may perform local calculations on the input (e.g., temperature feedback) signals received via the first and second temperature sensor connections 336, 338, filter the input (e.g., temperature feedback) signals received via the first and second temperature sensor connections 336, 338, and so forth.

Furthermore, in certain embodiments, the circuitry of the circuit board 356 may similarly convert (e.g., scale, offset, and so forth) the input (e.g., travel feedback) signals received via the travel sensor connection 328 to appropriate output signals for use by the controller circuitry 50 of the power source 12. In addition, in certain embodiments, the circuit board 356 may perform local calculations on the input (e.g., travel feedback) signals received via the travel sensor connection 328, filter the input (e.g., travel feedback) signals received via the travel sensor connection 328, and so forth.

In addition, as illustrated in FIGS. 31 and 32, in certain embodiments, the connection box 324 may include one or more indicators 361 for indicating temperatures corresponding to the input signals receive via the first and second temperature sensor connections 336, 338, respectively. In certain embodiments, the indicators 361 may be light emitting diodes configured to illuminate various colors corresponding to certain temperature ranges (e.g., red if the corresponding temperature is above a maximum temperature threshold or below a minimum temperature threshold, green if the corresponding temperature is within an acceptable temperature range, and so forth).

It will be appreciated that the connection box 324 may be particularly useful for retrofitting older power sources with the capability to function with the travel sensor assembly 28 and/or the travel sensor assembly 30. In particular, the circuit board 356 of the connection box 324 may perform all of the conversions necessary to present the older power sources with the types of signals it expects. Furthermore, different embodiments of the connection box 324 may be particularly well suited for use with certain types of power sources (e.g., that have particular types of connections).

In certain embodiments, instead of being disposed in a connection box 324 having all of the physical connections described herein, the circuit board 356 may be used as a separate component that may reside in numerous places (e.g., within the power source 12, within a separate enclosure having none of the connections of the connection box 324, within the induction heating head assembly 14 (e.g., within the cable strain relief cover 24), and so forth), and may include wireless communication circuitry configured to send and receive signals wirelessly to and from wireless communication circuitry of the induction heating head assembly 14, the temperature sensor assembly 28, the travel sensor assembly 30, the power source 12, and so forth. In other embodiments, the circuit board 356 may still be enclosed within the connection box 324, however, certain of the connections may not be disposed on the enclosure of the connection box 324, but rather may be replaced by the wireless communication circuitry of the circuit board 356. In one non-limiting example, the connection box 324 may not include the first and second temperature sensor connections 336, 338, and the circuit board 356 may receive input (e.g., temperature feedback) signals from first and second temperature sensor assemblies 28 wirelessly via its wireless communication circuitry. In another non-limiting example, the connection box 324 may include all of the input connections but none of the output connections, and the circuit board 356 may instead transmit output signals to the power source 12 wirelessly via its wireless communication circuitry.

As described herein, the temperature sensor assembly 28 provides feedback signals relating to temperature of the workpiece 16 to the controller circuitry 50 of the power source 12 and the travel sensor assembly 30 provides feedback signals relating to position and/or movement of the travel sensor assembly 30 with respect to the workpiece 16 to the controller circuitry 50. The controller circuitry 50 uses the feedback signals from the temperature sensor assembly 28 and the travel sensor assembly 30 to modify the output power 54 provided to the induction heating head assembly 14 for the purpose of providing induction heat to the workpiece 16. Returning to FIG. 2, the controller circuitry 50 of the power source 12 may include instructions for modifying (e.g., adjusting) the output power 54 provided to the induction heating head assembly 14 for the purpose of induction heating the workpiece 16 based at least in part on the feedback signals received from the temperature sensor assembly 28 and/or the travel sensor assembly 30.

In certain embodiments, modification (e.g., adjustment) of the output power 54 is dependent upon the feedback provided by the travel sensor assembly 30, although in other embodiments, the controller circuitry 50 may be capable of controlling the output power 54 with or without being communicatively coupled to the travel sensor assembly 30. In certain embodiments, the output power 54 may be reduced (e.g., throttled), or even eliminated, when the travel sensor assembly 30 detects little or no movement of the travel sensor assembly 30 relative to the workpiece 16. In particular, the instructions stored in the controller circuitry 50 may include instructions for reducing, or even eliminating, the output power 54 when a feedback signal is sent from the travel sensor assembly 30 and received by the controller circuitry 50 that indicates that little or no movement of the travel sensor assembly 30 relative to the workpiece 16 has been detected by the travel sensor assembly 30 for a given period of time. Furthermore, in certain embodiments, the output power 54 may be reduced, or even eliminated, when the travel sensor assembly 30 is not communicatively coupled to the controller circuitry 50 (e.g., via the cable 20 illustrated in FIG. 1). In particular, the instructions stored in the controller circuitry 50 may include instructions for reducing, or even eliminating, the output power 54 when a feedback signal is not received from the travel sensor assembly 30 for a given period of time.

In certain embodiments, modification (e.g., adjustment) of the output power 54 may be based at least in part on a speed (e.g., velocity) of the travel sensor assembly 30 with respect to the workpiece 16, or vice versa. As such, the instructions stored in the controller circuitry 50 may include instructions for modifying the output power 54 based at least in part on the feedback signals received from the travel sensor assembly 30 when the feedback signals include data indicative of the speed of the travel sensor assembly 30 with respect to the workpiece 16, or vice versa. In other embodiments, modification (e.g., adjustment) of the output power 54 may be based at least in part on a direction of travel of the travel sensor assembly 30 with respect to the workpiece 16, or vice versa. As such, the instructions stored in the controller circuitry 50 may include instructions for modifying the output power 54 based at least in part on the feedback signals received from the travel sensor assembly 30 when the feedback signals include data indicative of the direction of travel of the travel sensor assembly 30 with respect to the workpiece 16, or vice versa. The speed (e.g., velocity) and direction of travel of the travel sensor assembly 30 relative to the workpiece 16 are merely exemplary, and not intended to be limiting, of the types of parameters relating to position and/or movement (including direction of movement) of the travel sensor assembly 30 relative to the workpiece 16 that may be used by the controller circuitry 50 to modify the output power 54. Data relating to other parameters, such as absolute position of the travel sensor assembly 30 relative to the workpiece 16, acceleration of the travel sensor assembly 30 relative to the workpiece 16, orientation differences of the travel sensor assembly 30 relative to the workpiece 16, and so forth, may be received from the travel sensor assembly 30 by the controller circuitry 50, and used by the controller circuitry 50 to control the output power 54 of the power source 12 that is delivered to the induction heating head assembly 14.

Figure 35:
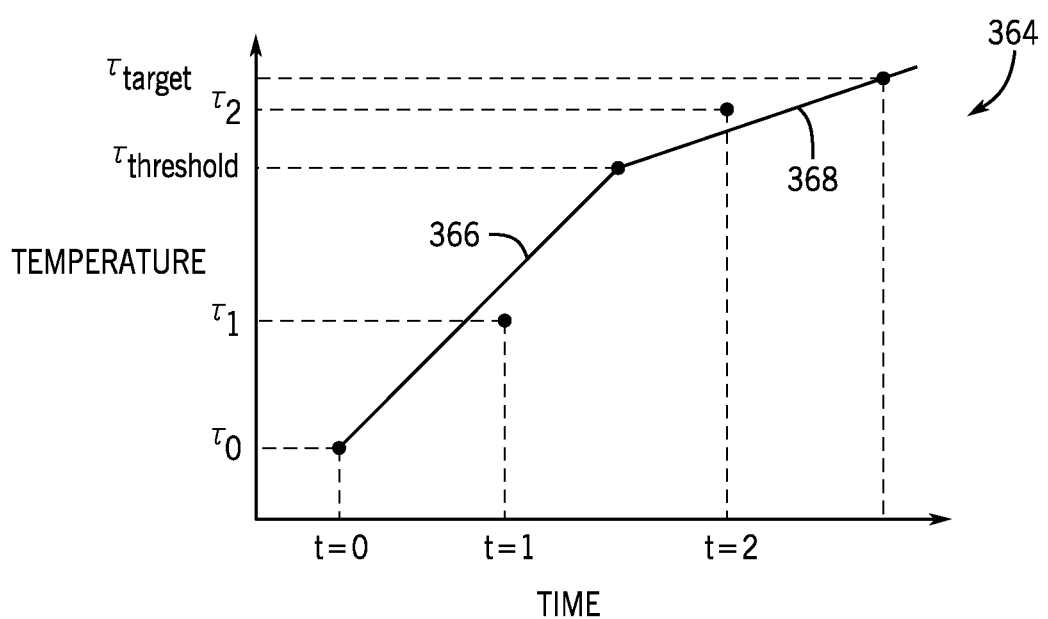
FIG. 35 is a graph of a temperature ramp that controller circuitry of the power source may utilize while controlling output power from the power source in accordance with embodiments of the present disclosure.

In certain embodiments, the controller circuitry 50 may receive the feedback signals from the temperature sensor assembly 28 and interpret the temperature readings provided via the feedback signals to find the best one (e.g., compare the readings to other temperature readings to determine correlation, etc.). In general, when the controller circuitry 50 is connected to the temperature sensor assembly 28, the controller circuitry 50 controls the output power 54 of the power source 12 based at least in part on the feedback signals received from the temperature sensor assembly 28. In particular, in certain embodiments, the controller circuitry 50 may follow a temperature ramp to reach a setpoint temperature of the workpiece 16 that may, for example, be set by a user via the control panel 362 of the power source 12. For example, FIG. 35 is a graph of an exemplary temperature ramp 364 that the controller circuitry 50 may utilize while controlling the output power 54 delivered by the power source 12. As illustrated, in certain embodiments, the temperature ramp 364 may be a relatively linear two-stage ramp from an initial temperature $\tau_0$ to a target temperature $\tau_{target}$. More specifically, a first temperature ramp stage 366 may be followed until a temperature threshold $\tau_{threshold}$ (e.g., a set percentage of the target temperature $\tau_{target}$) is reached, at which point a second, more gradual temperature ramp stage 368 may be followed to minimize the possibility of overshooting the target temperature $\tau_{target}$. However, in other embodiments, other types of temperature ramps (e.g., relatively asymptotic, and so forth) may be utilized by the controller circuitry 50. It will be appreciated that, while following the temperature ramp 364, if a given temperature reading $\tau_1$ falls below its expected value for a given time (e.g., time 1) on the temperature ramp 364, the controller circuitry 50 may increase the output power 54, whereas if a given temperature reading $\tau_2$ falls above its expected value for a given time (e.g., time 2) on the temperature ramp 364, the controller circuitry 50 may decrease the output power 54. In certain embodiments, the controller circuitry 50 may use closed loop control to reach the target temperature $\tau_{target}$.

As such, the controller circuitry 50 may control the output power 54 based at least in part on travel speed and/or direction of travel of the workpiece 16 relative to the induction heating head assembly 14 (as detected by the travel sensor assembly 30). As a non-limiting example of such control, as the travel speed increases, the output power 54 may be increased, and as the travel speed decreases, the output power 54 may be decreased. In addition, in certain embodiments, the controller circuitry 50 may control the output power 54 based at least in part on the temperature(s) of the workpiece 16 (as detected by the temperature sensor assembly 28 or multiple temperature sensor assemblies 28), for example, according to the temperature ramp 364 illustrated in FIG. 35. In addition, in certain embodiments, the controller circuitry 50 may control the output power 54 based at least in part on the amount of time the workpiece 16 has been heated. It will be appreciated that the controller circuitry 50 may control the output power 54 based at least in part on parameters relating to the output power 54 (e.g., previous or current output parameters relating to the power, amperage frequency, duty cycle, and so forth, of the output power 54). The operating parameters described herein as being used by the controller circuitry 50 to modify the control of the output power 54 are merely exemplary and not intended to be limiting. In certain embodiments, data relating to any and all of these operating parameters may be indicated via a control panel 362 (e.g., on a display) of the power source 12. In addition, in certain embodiments, the induction heating head assembly 14 may also include a means (e.g., control panel and/or display) for indicating data relating to these operating parameters.

In certain embodiments, the controller circuitry 50 may determine characteristics of the workpiece 16 based at least in part on the input signals received from the temperature sensor assembly or assemblies 28, the travel sensor assembly 30, the induction heating head assembly 14, and so forth, including but not limited to travel speed and/or direction of travel of the workpiece 16 relative to the travel sensor assembly 30, temperature(s) of the workpiece 16, heating time of the workpiece 16, previous output power 54, current output power 54, and so forth.

In certain embodiments, control of the output power 54 in general may be based at least in part on operating parameters entered by a user via the control panel 362 of the power source 12 including, but not limited to, dimensions of the workpiece 16, material of the workpiece 16, and so forth. In addition, in certain embodiments, control of the output power 54 in general may be based at least in part on data gathered from the heating process (e.g., from the induction heating head assembly 14) including, but not limited to, voltage of the output power 54, current of the output power 54, frequency of the output power 54, power factor, primary current, current measured within the power source 12, coolant temperature, an internal temperature of the induction heating head assembly 14, and so forth. In certain embodiments, control of the output power 54 in general may be based at least in part on user heating preferences that may, for example, be entered via the control panel 362 of the power source 12 including, but not limited to, desired temperature ramp speed, acceptable temperature overshoot, preference for gentle vs. aggressive heating, and so forth. As a non-limiting example, if a user wishes to heat a pipe very carefully, and does not care how long it takes, the user could set the induction heating mode to "gentle" and/or could set an acceptable temperature overshoot of zero and/or could set the temperature ramp speed to "slow."

In certain embodiments, the controller circuitry 50 of the power source 12 is configured to display the data (e.g., temperature, heat input, and so forth) detected by the temperature sensor assembly or assemblies 28 and/or the data (travel speed, direction of travel, and so forth) detected by the travel sensor assembly 30 via the control panel 362 of the power source 12. In addition, in certain embodiments, the connection box 324 may include a display, and the circuitry of the circuit board 356 of the connection box 324 may be configured to display the data (e.g., temperature, heat input, and so forth) detected by the temperature sensor assembly or assemblies 28 and/or the data (travel speed, direction of travel, and so forth) detected by the travel sensor assembly 30 via such display. Furthermore, in certain embodiments, the controller circuitry 50 of the power source 12 is configured to store the data (e.g., temperature, heat input, and so forth) detected by the temperature sensor assembly or assemblies 28 and/or the data (travel speed, direction of travel, and so forth) detected by the travel sensor assembly 30 in the memory 60. In addition, in certain embodiments, the connection box 324 may include a non-transitory memory medium similar to the memory 60 of the controller circuitry 50, and the circuitry of the circuit board 356 of the connection box 324 may be configured to store the data (e.g., temperature, heat input, and so forth) detected by the temperature sensor assembly or assemblies 28 and/or the data (travel speed, direction of travel, and so forth) detected by the travel sensor assembly 30 in such a memory medium. Moreover, in certain embodiments, the data (e.g., temperature, heat input, and so forth) detected by the temperature sensor assembly or assemblies 28 and/or the data (travel speed, direction of travel, and so forth) detected by the travel sensor assembly 30 may be stored in a remote location from the power source 12 and/or the connection box 324, for example, via cloud storage or a server connected to a network to which the power source 12 and/or the connection box 324 are communicatively connected.

In certain embodiments, the controller circuitry 50 of the power source 12 may be configured to automatically detect (e.g., without input from a human operator) whether the temperature sensor assembly or assemblies 28, the travel sensor assembly 30, and/or the induction heating head assembly 14 are connected (e.g., communicatively coupled) to the controller circuitry 50 (e.g., either directly or via the connection box 324), and to automatically modify (e.g., without input from a human operator) operation (i.e., adjust control of operating modes, modify a control algorithm, adjust certain operating parameters, and so forth) of the power source 12 based on the determination (e.g., which devices are detected as being communicatively coupled to the control circuitry 50, what particular types of the devices (e.g., between temperature sensor assemblies 28 configured to detect temperatures at certain wavelengths relating to certain emissivities, between travel sensor assemblies 30 that use particular types of sensors, and so forth) are communicatively coupled to the control circuitry 50, and so forth). As a non-limiting example, the controller circuitry 50 may automatically switch to an "induction heating head mode" when the induction heating head assembly 14 is detected as being connected to the power source 12.

In addition, the controller circuitry 50 described herein is configured to function in various modes, depending on what devices are communicatively coupled to the controller circuitry 50. In certain embodiments, the controller circuitry 50 may control the power source 12 only when the induction heating head assembly 14 is communicatively coupled to the controller circuitry 50. However, the controller circuitry 50 may control the power source 12 when a temperature sensor assembly 28 is communicatively coupled to the controller circuitry 50 but a travel sensor assembly 30 is not communicatively coupled to the controller circuitry 50, when a travel sensor assembly 30 is communicatively coupled to the controller circuitry 50 but a temperature sensor assembly 28 is not communicatively coupled to the controller circuitry 50, when both a temperature sensor assembly 28 and a travel sensor assembly 30 are communicatively coupled to the controller circuitry 50, and so forth.

In addition, although described herein as being configured to send feedback signals to the controller circuitry 50 for the purpose of controlling the power source 12, in certain embodiments, the temperature sensor assembly and/or the travel sensor assembly 30 described herein may, in addition to or alternatively, be configured to indicate information relating to the detected parameter (e.g., temperature of the workpiece 16 for the temperature sensor assembly 28 and position, movement, or direction of movement of the induction heating head assembly 14 relative to the workpiece 16 for the travel sensor assembly 30) on the respective device (e.g., via LEDS, a display, and so forth), to log the information relating to the detected parameter (e.g., store locally in memory or transmit to a separate storage device or cloud for storage), perform a local calculation based at least in part on the information relating to the detected parameter, and so forth.

Returning now to FIG. 2, in certain embodiments, the controller circuitry 50 of the power source 12 may be configured to send (e.g., either through a wired connection or wirelessly) instructions to a robotic positioning system 370 that is configured to control movement of the induction heating head assembly 14 relative to the workpiece 16 or to control movement of the workpiece 16 relative to the induction heating head assembly 14 based at least in part on the signals received from the temperature sensor assembly or assemblies 28, the travel sensor assembly 30, the induction heating head assembly 14, and/or the user preferences set by the user via the control panel 362 of the power source 12, and/or any and all other information received by the controller circuitry 50. However, in other embodiments, the control techniques described herein may also be implemented when the induction heating head assembly 14 is being held by a human operator. As also illustrated in FIG. 2, in certain embodiments, the output power 54 provided to the induction heating head assembly 14 may be at least partially controlled using a remote control 372, which may communicate with the controller circuitry 50 of the power source 12 either through a wired connection or wirelessly.

In addition, although described herein as including an induction heating head assembly 14, it will be appreciated that the temperature sensor assembly 28, the travel sensor assembly 30, the controller circuitry 50, the connection box 324, the inductor stand 232, the control techniques, and so forth, described herein may function substantially similarly when other types of workpiece heating devices are used. For example, in certain embodiments, instead of an induction heating head assembly 14, the workpiece heating device may be an infrared heating device configured to generate infrared heat on the workpiece 16. Indeed, any workpiece heating device capable of generating contacting or non-contacting localized heating of workpieces for fabrication may benefit from the systems and methods described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An induction heating control system comprising:
    an induction heating head configured to move relative to a workpiece during a heating operation;
    an adjustable bracket;
    a travel sensor removably attached to the induction heating head and configured to detect a position, movement, or direction of movement of the induction heating head relative to the workpiece during the heating operation;
    a temperature sensor assembly attached to the induction heating head via the adjustable bracket, such that the temperature sensor assembly moves relative to the workpiece as the induction heating head moves relative to the workpiece during the heating operation, the temperature sensor assembly configured to detect a temperature of the workpiece based on radiation in a first wavelength range that corresponds to a particular surface emissivity of the workpiece material, the temperature sensor assembly comprising:
        an upper air cup configured to receive air via a connector; and
        a lower air cup connected to the upper air cup and configured to receive the air from the upper air cup and exhaust the air from the lower air cup to direct an airflow through the temperature sensor assembly; and
    a control circuitry configured to:
        control an output power of a power source configured to deliver the output power to the induction heating head configured to generate induction heat using the output power and to direct the generated induction heat to the workpiece; and
        adjust the output power based at least in part on a first signal received from the temperature sensor assembly, wherein the signal is representative of a temperature of the workpiece, and wherein the signal received from the temperature sensor assembly is usable by the control circuitry to adjust the output power without compensating for a surface emissivity of the workpiece, and a second signal received from the travel sensor representative of the position, movement, or direction of movement of the induction heating head relative to the workpiece.

2. The induction heating control system of claim 1, wherein the temperature sensor assembly is a first temperature sensor assembly and the signal is a first signal representative of a first temperature of the workpiece, and the control circuitry is configured to adjust the output power based at least in part on the first signal and a second signal received from a second temperature sensor assembly, wherein the second signal is representative of a second temperature of the workpiece.

3. The induction heating control system of claim 1, wherein the control circuitry is configured to automatically detect whether the temperature sensor assembly is communicatively coupled to the control circuitry, and to automatically adjust the output power based upon the detection of the temperature sensor assembly.

4. The induction heating control system of claim 1, comprising a non-transitory memory medium, wherein the control circuitry is configured to store data relating to the temperature of the workpiece in the non-transitory memory medium.

5. The induction heating control system of claim 1, wherein the control circuitry is configured to utilize a temperature ramp in determining how to adjust the output power.

6. The induction heating control system of claim 1, wherein the control circuitry is configured to utilize closed loop control to reach a target temperature for the workpiece.

7. The induction heating control system of claim 1, wherein the control circuitry is configured to adjust the output power based at least in part on user inputs selected by a user.

8. The induction heating control system of claim 1, wherein the control circuitry is configured to adjust the output power based at least in part on current or previous parameters of the output power.

9. The induction heating control system of claim 1, wherein the control circuitry is configured to adjust the output power based at least in part on data collected from the induction heating head.

10. The induction heating control system of claim 1, wherein the control circuitry is configured to send instructions to a robotic positioning system configured to control movement of the induction heating head or movement of the workpiece relative to the induction heating head based at least in part on the signal.

11. The induction heating control system of claim 1, wherein the signal is a first signal, and the control circuitry is configured to adjust the output power based at least in part on the first signal and a second signal received from a travel sensor assembly, wherein the second signal is representative of a position, movement, or direction of movement of the workpiece relative to the travel sensor assembly.

12. The induction heating control system of claim 1, wherein the position of the temperature sensor assembly relative to the induction heating head is adjustable via adjusting the adjustable bracket.

13. The induction heating control system of claim 1, wherein a distance between the temperature sensor assembly and the workpiece is adjustable via adjusting the adjustable bracket.

14. The induction heating control system of claim 1, wherein the temperature sensor assembly comprises a temperature sensor assembly body positioned at an angle relative to the induction heating head, and wherein the angle is adjustable via adjusting the adjustable bracket.

15. The induction heating control system of claim 1, further comprising a second temperature sensor assembly configured to be attached to the induction heating head via the adjustable bracket, and wherein the control circuitry is configured to adjust the output power based at least in part on a second signal received from the temperature sensor assembly, wherein the second signal is representative of a second temperature of the workpiece.

16. An induction heating control system comprising:
a first temperature sensor assembly configured to be attached to an induction heating head via a first adjustable bracket such that the first temperature sensor assembly moves relative to a workpiece as the induction heating head moves relative to the workpiece, the first temperature sensor assembly comprising:
a first temperature sensor configured to output a first signal based on radiation in a first wavelength range corresponding to at least a first surface emissivity of a first location on the workpiece, wherein the first location corresponds to a first workpiece material;
an upper air cup configured to receive air via a connector; and
a lower air cup connected to the upper air cup and configured to receive the air from the upper air cup and exhaust the air from the lower air cup to direct an airflow through the temperature sensor assembly;
a second temperature sensor assembly configured to be attached to the induction heating head via a second adjustable bracket such that the second temperature sensor assembly moves relative to the workpiece as the induction heating head moves relative to the workpiece, the second temperature sensor assembly comprising a second temperature sensor configured to output a second signal based on radiation in a second wavelength range corresponding to at least a second surface emissivity of a second location on the workpiece, wherein the second location corresponds to a second workpiece material;
a travel sensor configured to be removably attached to the induction heating head and to detect a position, movement, or direction of movement of the induction heating head relative to the workpiece; and
a control circuitry configured to:
control an output power of a power source configured to deliver the output power to the induction heating head configured to generate induction heat using the output power and to direct the generated induction heat to the workpiece; and
adjust the output power based at least in part on:
the first signal output by the first temperature sensor assembly or the second signal output by the second temperature sensor assembly without compensating for the first surface emissivity or the second surface emissivity; and
a third signal received from the travel sensor representative of the position, movement, or direction of movement of the induction heating head relative to the workpiece.

17. The induction heating control system of claim 16, wherein the first temperature sensor assembly and the second temperature sensor assembly are physically interchangeable on the induction heating head.

18. The induction heating control system of claim 16, wherein the control circuitry is configured to receive an input identifying which of the first temperature sensor assembly or the second temperature sensor assembly is to be used to adjust the output power.

19. The induction heating control system of claim 1, wherein the temperature sensor assembly is configured to detect temperatures at wavelengths between 2.0 micrometers and 2.4 micrometers.

20. The induction heating control system of claim 1, wherein the temperature sensor assembly is configured to detect the temperature of the workpiece based on the radiation in the first wavelength range that corresponds to the surface emissivity of one of a plurality of surface preparations of the workpiece material.

21. An induction heating control system, comprising:

an induction heating head configured to move relative to a workpiece during a heating operation;

an adjustable bracket;

a temperature sensor assembly attached to the induction heating head via the adjustable bracket, such that the temperature sensor assembly moves relative to the workpiece as the induction heating head moves relative to the workpiece during the heating operation, the temperature sensor assembly configured to detect a temperature of the workpiece based on radiation in a first wavelength range, the temperature sensor assembly comprising:

an upper air cup configured to receive air via a connector; and a lower air cup connected to the upper air cup and configured to receive the air from the upper air cup and exhaust the air from the lower air cup to direct an airflow through the temperature sensor assembly; and a control circuitry configured to:

control an output power of a power source configured to deliver the output power to the induction heating head configured to generate induction heat using the output power and to direct the generated induction heat to the workpiece; and adjust the output power based at least in part on a first signal received from the temperature sensor assembly, wherein the signal is representative of a temperature of the workpiece.

\* \* \* \* \*